US007415433B2

(12) United States Patent
Huneault

(10) Patent No.: US 7,415,433 B2
(45) Date of Patent: Aug. 19, 2008

(54) METHOD AND APPARATUS FOR THE TOPOGRAPHICAL MAPPING OF INVESTMENT RISK, SAFETY AND EFFICIENCY

(76) Inventor: Paul Huneault, 5040, ave, Charlemagne, Montréal (Québec) (CA) H1X 3P3

(*) Notice: Subject to any disclaimer, the term of this patent is extended or adjusted under 35 U.S.C. 154(b) by 1165 days.

(21) Appl. No.: 10/633,301

(22) Filed: Aug. 4, 2003

(65) Prior Publication Data

US 2005/0033678 A1    Feb. 10, 2005

(51) Int. Cl.
*G06Q 40/00* (2006.01)
(52) U.S. Cl. ....................................................... 705/36
(58) Field of Classification Search .................... 705/36
See application file for complete search history.

(56) References Cited

U.S. PATENT DOCUMENTS

| | | | |
|---|---|---|---|
| 5,799,287 A | 8/1998 | Dembo |
| 5,884,287 A | 3/1999 | Edesess |
| 5,999,918 A | 12/1999 | Williams et al. |
| 6,003,018 A | 12/1999 | Michaud et al. |
| 6,012,044 A | 1/2000 | Maggioncalda et al. |
| 6,018,722 A | 1/2000 | Ray et al. |
| 6,078,903 A | 6/2000 | Kealhofer |
| 6,275,814 B1 | 8/2001 | Giansante |
| 6,282,520 B1 | 8/2001 | Schirripa |
| 6,317,726 B1 | 11/2001 | O'Shaughnessy |
| 6,405,179 B1 | 6/2002 | Rebane |

FOREIGN PATENT DOCUMENTS

CA       2 358 959       5/2001

WO       WO 01/39005 A2     5/2001

OTHER PUBLICATIONS

Hallerbach, Winfried & Spronk, Jaap. A Multidimensional Framework for Financial-Economic Decisions. Journal of Multi-Criteria Decision Analysis. May/Jun. 2002. vol. 11. Issu. 3. pp. 111-124.*

(Continued)

*Primary Examiner*—James Kramer
*Assistant Examiner*—Jason Borlinghaus

(57) ABSTRACT

A method and a system for evaluating at least one of a risk, safety and efficiency property of a portfolio belonging to a class of one of a probability density and a probability distribution, for a given time frame are provided. The method comprises: obtaining portfolio pricing data over said given time frame; obtaining at least one benchmark $X_b$; with respect to investment returns, fitting one of a stochastic investment class over said given time frame in relation to said benchmark $X_b$ by obtaining a location parameter a, a scale parameter b and other corresponding shape parameters; and an empirical investment class over said given time frame in relation to said benchmark $X_b$; determining a mean return value $X_m$ and a standard deviation $\sigma_x$ using said class; graphically illustrating said portfolio in relation to said benchmark $X_b$ using said return value $X_m$ and said standard deviation $\sigma_x$ on an investment chart; determining for said portfolio by using properties of said class a solution to $(X_m-X_b)=[(E_S-X_b)\cdot\alpha]+[(E_P-X_b)\cdot\gamma]=I'_S+I'_P$; graphically illustrating at least one said component of said expression $(X_m-X_b)$, in the form of a topographical map on said investment chart using said benchmark $X_b$.

12 Claims, 21 Drawing Sheets

OTHER PUBLICATIONS

H. M. Markowitz, Portfolio Selection, Journal of Finance, vol. 7, No. 1, 1952, pp. 77-91.

G.C. Pflug, How to measure risk?, Modeling and Decisions in Economics: Essays in Honor of Franz Ferschl, Physica-Verlag, 1999.

D. Nawrocki, A Brief History of Downside Risk Measures, Journal of Investing, vol. 8, No. 3, Fall 1999, pp. 9-25.

V. S. Bawa, Optimal Rules for Ordering Uncertain Prospects, Journal of Financial Economics, vol. 2, No. 1, 1975, pp. 95-121.

P. C. Fishburn, Mean-Risk Analysis with Risk Associated with Below Target Returns, American Economic Review, vol. 67, No. 2, 1977, pp. 116-126.

Basle, Basle Committee on Banking Supervision, Amendment to the Capital Accord to Incorporate Market Risks, Federal Reserve System, 1996.

J. Engel and M. Gizycki, Conservatism, Accuracy and Efficiency: Comparing Value-at-Risk Models, Working paper 2, Policy Development and Research, Australian Prudential Regulation Authority, Reserve Bank of Australia, Mar. 1999.

D. Hendricks, Evaluation of Value-at-Risk Models using Historical Data, Federal Reserve Bank of New York Economic Policy Reveiw, Apr. 1996.

D. Hendricks and B. Hirtle, Bank Capital Requirements for Market Risk: the Internal Models Approach, Federal Reserve Bank of New York Economic Policy Review, Dec. 1997.

I.N. Khindanova and S.T. Rachev, Value-at-Risk: Recent Advances, Handbook on Analytic-Computational Methods in Applied Mathematics, CRC Press, 2000.

P. Artzner, F. Delbaen, J.-M. Eber and D. Heath, Coherent Measures of Risk, Mathematical Finance, vol. 9, No. 3, 1999, pp. 203-228.

P. Artzner, Application of Coherent Risk Measures to Capital Requirements in Insurance, North American Actuarial Journal, vol. 3, No. 2, 1999, pp. 11-25.

F. Black and M. Scholes, The Pricing of Options and Corporate Liabilities, Journal of Political Economy, vol. 81, No. 3, May/Jun. 1973, pp. 637-654.

C. Acerbi and D. Tasche, On the Coherence of Expected Shortfall, Journal of Banking and Finance, vol. 26, No. 7, Jul. 2002, pp. 1487-1503.

P. Embrechts, S.I. Resnick and G. Samorodnitsky, Extreme Value Theory as a Risk Management Tool, North American Actuarial Journal, vol. 3, No. 2, Apr. 1999, pp. 30-41.

A. Sen, Poverty: an Ordinal Approach to Measurement, Econometrica, vol. 44, No. 2, Mar. 1976, pp. 219-231.

F. Eggers, A. Pfingsten and S. Rieso, Three Dimensions of Shortfall Risk: Transformation and Extension of Sen's Poverty Index, 9th Symposium on Finance, Banking and Insurance, Universität Karlsruhe (TH), Germany, Dec. 2002.

P. Albrecht, Shortfall Returns and Shortfall Risk, Proceedings AFIR, Colloquium of the International Actuarial Association, Orlando, 1994, pp. 87-110.

H. Levy and H.M. Markowitz, Approximating Expected Utility by a Function of Mean and Variance, American Economic Review, vol. 69, No. 3, 1979, pp. 308-317.

J.-P. Bouchaud and M. Potters, Basic Notions in Probability, Chapter 1 in Theory of Financial Risks: From Statistical Physics to Risk Management, Cambridge University Press, Oct. 2000, 232pp.

A.D. Roy, Safety First and the Holding of Assests, Econometrica, vol. 20, No. 3, 1952, pp. 431-449.

W.F. Sharpe, Mutual Fund Performance, Journal of Business, vol. 39, No. 1, 1966, pp. 119-138.

W.F. Sharpe, The Sharpe Ratio, The Journal of Portfolio Management, Fall, 1994, pp. 49-58.

R.H. Thaler, A. Tversky, D. Kahneman and A. Schwartz, The Effect of Myopia and Loss Aversion on Risk Taking: an Experimental Test, The Quarterly Journal of Economics, May 1997, pp. 647-661.

S. Benartzi and R.H. Thaler, Risk Aversion or Myopia ? Choices in Repeated Gambles and Retirement Investments, Management Science, vol. 45, No. 3, Mar. 1999, pp. 364-381.

E.J. Elton and M.J. Gruber. Option Pricing Theory, Chapter 22 in Modern Portfolio Theory and Investment Analysis, Fifth Edition, John Wiley & Sons, 715, pp. 1995.

W.H. Press, B.P. Flannery, S.A. Teukolsky and W.T. Vetterling, Numerical Recipes, The Art of Scientific Computing, Cambridge University Press, 818 pp. 1986.

* cited by examiner

METHOD AND APPARATUS FOR THE TOPOGRAPHICAL MAPPING OF INVESTMENT RISK, SAFETY AND EFFICIENCY

FIELD OF THE INVENTION

The invention relates to investment risk evaluation. More specifically, it relates to mapping and illustrating investment risk, safety and efficiency.

BACKGROUND OF THE INVENTION

Much of the modern art of investing relates to the evaluation of the appropriate trade-off of risk against return in the constitution of portfolios for investors. The problem is not simple. The investor provides unique combinations of investment goals and objectives, as well as risk perceptions that all naturally fluctuate over time based on past experiences and future expectations. Portfolios are typically baskets of instruments chosen from a universally diversified supermarket of investments. And, whereas return is easily quantified, much of the number crunching of modern portfolio theory now deals with the quantification of risk.

Risk refers to the uncertainty of the financial outcome of an investment portfolio following a given investment period. The value of the portfolio will fluctuate against a headwind of events that can never be foreknown, justifying modeling it as a random variable in a stochastic process. The uncertainty is practically nil, however, for certain offerings of assets such as short-term (30 days) treasury bills, yields of which are guaranteed by the taxation powers of government and their ability to expand the monetary float. Risk is thus better viewed in the context of a riskless benchmark: investors choose to invest in risky assets, and be subjected to their random fluctuations, on the condition they yield a risk premium, i.e. an incremental gain relative to the benchmark. Performance of the risky asset itself can also be benchmarked to its fluctuations: the greater the fluctuations, the greater the expected risk premium for a risk-adverse investor.

Early on, in formulating the expected returns-variance of returns rule leading to the constitution of efficient portfolios along an efficient frontier, H. M. Markowitz (see "Portfolio Selection", Journal of Finance, March 1952, pp. 77-91) dealt with this uncertainty by suggesting that "if the term risk was replaced by variance of return (or standard deviation of return), little change in apparent meaning would result." Unfortunately, some 50 years later, this suggestion has been popularized to the extent that risk has mostly become synonymous with variance or standard deviation, or volatility of return as measured by either, usually without the slightest reference to the original context of optimal efficient frontier. The work of H. M. Markowitz (see "Portfolio Selection", Journal of Finance, March 1952, pp. 77-91) is classified as a linear/quadratic as well as an expectation/dispersion risk measure by G. C. Pflug (see "How to measure risk ?", Modeling and Decisions in Economics: Essays in Honor of Franz Ferschl, Physica-Verlag, 1999). U.S. Pat. Nos. 6,003,018, 6,275,814 and 6,282,520 are centered on the concept of efficient frontier.

The paradox that volatility can also induce safe beneficial gains, not only risky detrimental losses, has led others to consider as more appropriate a class restricted to downside risk measures (see "A Brief History of Downside Risk Measures", by David Nawrocki, Journal of Investing, Vol. 8, No. 3, Fall 1999, pp. 9-25), most notably the below-mean semi-variance, the below-target semi-variance (SVt), and the Lower Partial Moment (LPM), the latter due to Vijay S. Bawa (see "Optimal Rules for Ordering Uncertain Prospects", Journal of Financial Economics, Vol. 2, No. 1, 1975, pp. 95-121) and Peter C. Fishburn (see "Mean-Risk Analysis with Risk Associated with Below Target Returns", American Economic Review, Vol. 67, No. 2, 1977, pp. 116-126). Therein, the SVt, an expectation/dispersion risk measure (see "How to measure risk?", G. C. Pflug, Modeling and Decisions in Economics: Essays in Honor of Franz Ferschl, Physica-Verlag, 1999), is shown to be a subclass of LPM. The LPM is related to the notion of moments of a probability density function in general. For a random variable x occurring with a probability density $P(x)$, the $n_{th}$ moment about a point or target t over the full range of x is the weighted sum or integral, for discrete or continuous functions $P(x)$, respectively, of the difference $(x-t)^n$, the weights corresponding to the probability $P(x)$. The LPM notion restricts the range of x to values below the target t while expanding the range of the exponent n from integer to real values a. The LPM then qualifies below-target risk in terms of the so-called risk tolerance parameter a. The LPM for (a=0) corresponds to the below-target probability, or the probability of loss given the target establishes the threshold in the profit and loss probability density and cumulative distribution functions. The LPM for (a=1) is the unconditional expected loss, whereas the LPM for (a=2) is the SVt. Basing risk tolerance on the lower partial moments of a stochastic distribution then bridges over to the field of ranking portfolios based on stochastic dominance and the values of their $n_{th}$ moment over a range of x (see "Stochastic Dominance: Investment Decision Making under Uncertainty", H. Levy, Kluwer Academic Publishers, Boston, Mass., 392 pp. 1998).

A widespread downside risk measure is the value-at-risk measure $V@R_\alpha$. $V@R_\alpha$ has gained regulatory status in defining minimum capital reserves or standards in relation to banks' market risk exposure, or risk of loss from adverse movements in the market values of assets, liabilities or off-balance-sheet positions (see "Basle Committee on Banking Supervision", Basle, Amendment to the Capital Accord to Incorporate Market Risks, Federal Reserve System, 1996; "Conservatism, Accuracy and Efficiency: Comparing Value-at-Risk Models", J. Engel and M. Gizycki, Working paper 2, Policy Development and Research, Australian Prudential Regulation Authority, Reserve Bank of Australia, March 1999; "Evaluation of Value-at-Risk Models Using Historical Data", D. Hendricks, Federal Reserve Bank of New York Economic Policy Review, April 1996; "Bank Capital Requirements for Market Risk: the Internal Models Approach", D. Hendricks and B. Hirtle, Federal Reserve Bank of New York Economic Policy Review, December 1997; and "Value-at-Risk: Recent Advances", I. N. Khindanova and S. T. Rachev, Handbook on Analytic-Computational Methods in Applied Mathematics, CRC Press, 2000). $V@R_\alpha$ is also generously called upon in evaluating the performance of corporate pension plans, and has been built into the framework of many commercial software risk packages. $V@R_\alpha$ corresponds to the measure on the downside of the applied probability density function that is exceeded further on the downside only by a given very small probability of occurrences a, typically 1% or 5%. $V@R_\alpha$ is classified as an inverse-linear risk measure as it is linear in the inverse distribution function or quintile function α (see "How to measure risk?", G. C. Pflug, Modeling and Decisions in Economics: Essays in Honor of Franz Ferschl, Physica-Verlag, 1999). Application of $V@R_\alpha$ to typical portfolios generally results in the highlighting of exceptionally high negative returns (losses). Surprisingly, no benchmark is set explicitly in $V@R_\alpha$ analysis: an implicit benchmark, one which relates to capital preservation, is the threshold between positive and negative performance, or 0% return. However, in the case of exceptional portfolios of such good expected return and low volatility that provide positive $V@R_\alpha$ measures, what exactly is at risk is no longer clear.

The controversy over $V@R_\alpha$ (and other risk measures) erupted following the fundamental work of P. Artzner, F. Delbaen, J.-M. Eber and D. Heath (see "Thinking Coherently", Risk 10, November 1997, pp. 68-71 and "Coherent Measures of Risk", Mathematical Finance, Vol. 9, July 1999, pp. 203-228) and P. Artzner (see "Application of Coherent Risk Measures to Capital Requirements in Insurance", North American Actuarial Journal, Vol. 3, No. 2, pp. 11-25, 1999). They first distinguish between acceptable and unacceptable risk: a position has unacceptable risk if its future value is unacceptable. A measure of risk of an unacceptable position is then the minimum extra capital that, invested in a reference prudent instrument such as default-free treasury bills, makes the future value of the modified position become acceptable. Risk is thereby described by a real single number or quantity (in effect, the result of mapping of risk functions into the domain of real numbers). In reality, this single number may correspond to the pure insurance premium to be paid out to a secondary market for insurance liabilities or, if such a market does not exist, to the contribution to a reserve built up by the investor to compensate for unacceptable future values. This notion of risk is then consistent with that of the riskless hedge corresponding to the pricing of options for securing investment portfolios, as developed by F. Black and M. Scholes (see "The Pricing of Options and Corporate Liabilities", Journal of Political Economy, Vol. 81, No. 3, May/June 1973, pp. 637-654). U.S. Pat. No. 5,799,287 discusses a computer based method intended to optimize the trade-off between this risk cost and residual profit. P. Artzner, F. Delbaen, J.-M. Eber and D. Heath (see "Thinking Coherently", Risk 10, November 1997, pp. 68-71 and "Coherent Measures of Risk", Mathematical Finance, Vol. 9, July 1999, pp. 203-228) continue by setting out four axioms (or self-evident truths that require no proof) that define coherent risk measures. A risk measure satisfying translation invariance, subadditivity, positive homogeneity and monotonicity is called coherent. $V@R_\alpha$ is shown to violate subadditivity: the $V@R_\alpha$ of position 3 obtained from the combination of positions 1 and 2 may be superior to the sum of the $V@R_\alpha$ measures for positions 1 and 2 taken alone. Diversification seemingly leads to an increase in risk, which is incoherent. $V@R_\alpha$ would then dangerously promote concentration, not diversification. A risk measure based simply on a linear combination of the expected return and the variance, standard deviation or semi-variance is also shown to be incoherent.

An important section of the financial community, rightly preoccupied with coherence, has moved quickly to fill the void perceived to be left by $V@R_\alpha$ in promoting worthier risk measures. A measure that has come to the forefront is the Expected Shortfall (or shortfall expectation) at a specified level $\alpha$, i.e. $E_{S\alpha}$, with ($0 \leq \alpha \leq 1$) corresponding to a probability of loss as set out by the profit and loss probability density function. $E_{S\alpha}$ is then the mathematical transcript of the concept "average loss in the worst $100\alpha\%$ cases" (see "On the Coherence of Expected Shortfall", Journal of Banking and Finance, C. Acerbi and D. Tasche, Vol. 26, No. 7, July 2002, pp. 1487-1503). Other similar measures are the Worst Conditional Expectation WCE (see "Thinking Coherently", P. Artzner, F. Delbaen, J.-M. Eber and D. Heath, Risk 10, November 1997, pp. 68-71 and "Coherent Measures of Risk", Mathematical Finance, Vol. 9, July 1999, pp. 203-228), the Tail Conditional Expectation TCE (or conditional tail expectation CTE or Tail V@R), the Conditional Value-at-Risk CV@R, the $\alpha$-tail mean and the Mean Excess Loss MEL (see "Extreme Value Theory as a Risk Management Tool", P. Embrechts, S. I. Resnick and G. Samorodnitsky, North American Actuarial Journal, Vol. 3, No. 2, April 1999, pp. 30-41). All these measures strive essentially to define the same concept but discrepancies may arise in the case of discrete, or mixtures of discrete and continuous probability density functions, if a same quintile a is applicable to more than one threshold, i.e. $\{P[X \leq x] = \alpha\}$ for more than one x. For continuous probability density functions, these measures converge to the same value (see "On the Coherence of Expected Shortfall", C. Acerbi and D. Tasche, Journal of Banking and Finance, Vol. 26, No. 7, July 2002, pp. 1487-1503).

The acceptance of Expected Shortfall also signifies a convergence between actuaries, statisticians and financial analysts. It is a natural and coherent estimator of risk in a portfolio. To be precise, it refers here to the conditional expected shortfall, i.e. the expected shortfall or most probable shortfall in the event of a shortfall. In that it is preoccupied with measuring the magnitude, severity or intensity of loss given that a loss has occurred, it is a fundamental complement to the measure of frequency or probability of loss. This juxtaposition was also correctly transposed in A. Sen (see "Poverty: an Ordinal Approach to Measurement", Econometrica, Vol. 44, No. 2, March 1976, pp. 219-231) as pointed out in F. Eggers, A. Pfingsten and S. Rieso (see "Three Dimensions of Shortfall Risk: Transformation and Extension of Sen's Poverty Index", 9th Symposium on Finance, Banking and Insurance, Universität Karlsruhe (TH), Germany, December 2002).

Various combinations of frequency and severity of investment losses can arise affecting the overall portrayal and classification of risk. Table 15 suggests one such classification based on insurance industry practice. Table 15 is an illustration of the Insurance industry classification of risk based on frequency and severity of loss.

TABLE 15

Insurance industry classification of risk based on frequency and severity of loss

| | | Frequency Of Loss | |
|---|---|---|---|
| | | Low | High |
| Severity Of Loss | Low | Negligible | Important To Very Important |
| | High | Important To Very Important | Critical |

U.S. Pat. Nos. 5,884,287, 5,999,918 and 6,012,044 fundamentally rely on point calculations of the probability of loss in providing financial advice.

For those with absolute risk aversion, the only possible solution is risk avoidance attained by investing solely in guaranteed investment products and, ultimately, short term treasury bills.

For those willing to take on elements of risk in their quest for greater returns, risk should be consciously controlled by first establishing rational perspectives with regards to allowable risk levels pertaining to frequency and severity. Continuous monitoring is required to insure these perspectives are met and maintained.

SUMMARY OF THE INVENTION

Accordingly, an object of the present invention is to enhance investment decision making by maximizing information content based on the structural properties of probability densities relative to risk, safety and efficiency in relation to a standard portfolio setting.

A system and method for the topographical mapping of investment risk, safety and efficiency are described. Safety is the opposite of risk: a position leading to an increase in risk leads to a decrease in safety, and conversely. Measures of risk and safety characterizing the opposite profit and loss tail ends of stochastic probability densities or distributions of investments are adopted. Efficiency relates to the ability to produce a desired effect with a minimum of expense, and can be expressed as a ratio of output to input. Efficiency ratios are considered for investing. Mapping, as applied to the concepts of risk, safety and efficiency, refers to the distillation of mathematical functions into real numbers to obtain proper measures. Topography relates to the plotting of a given measure along isometrics, or contours of equal value, in an appropriate reference system. The tasks of mapping and topography are preferably computer-based.

A financial information and treatment system targeting investments in general is described. The components of the system are the universe of investment products in general, financial historical data or financial projections for these products, a computer system to input and treat this data as well as output reports relevant to investment decision making, and a user of the system to satisfy utility, be it personal, public, corporate, institutional, etc.

Typical investment products are, without limiting completeness, stocks, bonds, treasury bills, guaranteed income products, income trust units, derivatives, mutual funds and combinations or groups of at least one of these products thereof forming portfolios.

Essential financial data are sequential investment returns attributed to a reference, base or unit time period. Fluctuations in returns, or volatility, can generally be described by variance and standard deviation $\sigma$. Returns fluctuate about a mean return $R_m$. Data in the form of returns and volatility may pertain to historical or projected future performance, and may be established independently or obtained from a third party.

The output of the system consists in reports to be visualized on screen or in printed format. Results are mostly tuned to graphical presentation but obviously can be summarized in textual or tabular format. User feedback may be prompted and directed to focus on preferred investment choices.

A principal aspect of the invention consists in establishing background topographical maps of various investment properties pertaining to risk, safety or efficiency, against which basic investment data can simply be set and evaluated. The preferred reference system for plotting the data is basic to portfolio theory and shows mean return measures $R_m$ or combinations thereof plotted against volatility measures, most notably standard deviation $\alpha$. This reference system is shown later to form a subset of a general reference system by which the location parameter of the probability density function is plotted, along the ordinate, against the scale parameter of the probability density function, thereby forming the abscissa. The invention applies preferably and foremost to the general reference system. Mapping results from translating or distilling notions of risk, safety and efficiency into real numbers to obtain proper measures. As no single measure is thought to apply exclusively to any notion, various measures are considered. Topography relates to the plotting of a given measure along isometrics, or contour lines of equal value, in the appropriate reference system.

A second aspect of the invention concerns the choice of basic investment properties to be mapped out along contour lines. They are in general related to what are herein termed the structural properties of the profit and loss probability density functions, derived or assigned by statistical treatment of the financial data. Profit and loss is first determined relative to a benchmark or target return $R_b$ which may differ from 0% as, for example, in the case of the riskless return. Thereafter, the structural properties of probability of loss $\alpha$, probability of profit $\gamma$, Expected Shortfall $E_S$, Expected Profit $E_P$, insurance against a shortfall $I_S$ and insurance against a profit $I_P$ are preferred components of the invention.

Investment properties in the form of combinations are also of interest. In relation to efficiency, as discussed previously, various ratios of desired effects to related expenses are plausible based on the aforementioned structural properties $R_m$, $R_b$, $\sigma$, $\alpha$, $\gamma$, $E_S$, $E_P$, $I_S$ and $I_P$. Measures of desired effects can be taken, for example, as the differential or risk premium $(R_m - R_b)$, the probability of profit $\gamma$, the Expected Profit $E_P$ or the insurance against a profit $I_P$, whereas measures of related expenses can be taken, for example, as the volatility $\sigma$, the probability of loss $\alpha$, the Expected Shortfall $E_S$, and the insurance against a shortfall $I_S$. A well established measure of efficiency is the Sharpe Ratio $S_r$ of expression (2), i.e. the ratio of $(R_m - R_b)$ against Car.

A third aspect of the invention then consists of topographically mapping out, along isometric contour lines of constant value, plausible efficiency ratios in an appropriate reference framework. In particular, without limiting possible combinations or alternatives, the following efficiency ratios are considered: $E_1$ efficiency as the ratio of the probability of profit $\gamma$ to the probability of loss $\alpha$, $E_2$ efficiency as the ratio of the Expected Profit $E_P$ to the Expected Shortfall $E_S$, $E_3$ efficiency as the ratio of the insurance against a profit $I_P$ to the insurance against a shortfall $I_S$, and $E_4$ efficiency as the ratio of the risk premium $(R_m - R_b)$ to the probability of loss $\alpha$.

A fourth aspect of the invention consists in establishing complementary orthogonal trajectories to the base contour lines. These orthogonal trajectories form by superposition an orthogonal net or web. Along these trajectories, the gradient in whatever property is being topographically mapped is maximized locally. Imagining for a moment a given property map, and an arbitrary position on this map, an orthogonal trajectory passing through this position provides the path and the solution for optimally increasing or decreasing the said property locally depending on the direction taken. Trajectories are easy to visualize as they are strictly confined between neighbors. This aspect of the invention then consists of mapping out orthogonal trajectories to the base contour lines that in effect maximize locally the gradients in the basic investment property being mapped out.

For probability densities that depend on more than the two shape parameters defining location, such as mean return $R_m$, and scale, such as volatility $\sigma$, the other shape parameters must be specified concurrently to properly qualify the topographical mapping.

For independent and identically distributed probability densities (iid), there exists a factor $S_{C1}$ relative to translation of the location parameter values, and a second $S_{C2}$ relative to the expansion of the scale parameter values controlling fluctuations about the location parameter, that direct mapping of the probability density applicable to one period events into a probability density good for multiple period events. Inverse operations are feasible in going from a given base period to another period fractional in value.

A fifth aspect of the invention is then the time resealing of the basic reference framework in order to properly account for the mapping of multiple or fractional period events for independent and identically distributed probability densities. The previously discussed topographical mapping will hold for multiple period events if the reference framework of the form [Location parameter versus Scale parameter] is generalized to [{Location parameter* $S_{C1}$} versus {Scale parameter*$S_{C2}$}]. An independent time resealing is also obtained by generalizing the reference framework to [Location parameter versus {Scale parameter* $S_{C3}$}] with $S_{C3}$ the ratio of $S_{C2}/S_{C1}$.

A sixth aspect of the invention is the illustration of the mappings in 2D or 3D. Color coding or grey scale density encoding or other artifice can be established in lieu of or in parallel to the contour lines.

To complement established topographical maps with orthogonal trajectories, a seventh aspect of the invention is to promote or enhance investment decision making through the offering of various evaluation tools that prompt or allow for user feedback relative to acceptable or unacceptable measures of various highlighted investment properties, or combinations thereof, with or without differential weighting. Such tools concern, for example, and without limiting completeness, ordering, filtering and definition of inclusion or exclusion zones.

The topographical mapping of investment properties and related orthogonal trajectories is preferably accomplished by a computer based product. Depending on the probability density, the tasks performed by the computer product may vary. For a wide class of probability densities, the preferred implementation is a semi-analytic approach whereby analytical developments are combined with computer based numerical methods to directly arrive at contour lines and orthogonal trajectories. Otherwise, a second (fallback) approach consists in directing the computer to first generate a grid of punctual solutions for the properties to be mapped in the reference framework followed by numerical interpolation between the grid values to establish isometric contour lines.

A system and method for the topographical mapping of investment risk, safety and efficiency are described. Safety is the opposite of risk: a position leading to an increase in risk leads to a decrease in safety, and conversely. Measures of risk and safety characterizing the opposite profit and loss tail ends of stochastic probability densities or distributions of investments are adopted. Efficiency relates to the ability to produce a desired effect with a minimum of expense, and can be expressed as a ratio of output to input. Efficiency ratios are considered for investing. Mapping, as applied to the concepts of risk, safety and efficiency, refers to the distillation of mathematical functions into real numbers to obtain proper measures. Topography relates to the plotting of a given measure along isometrics, or contours of equal value, in an appropriate reference system. The tasks of mapping and topography are preferably computer-based.

A method and a system for evaluating at least one of a risk, safety and efficiency property of a portfolio belonging to a class of one of a probability density and a probability distribution, for a given time frame are provided. The method comprises obtaining portfolio pricing data over said given time frame; obtaining at least one benchmark $X_b$; with respect to investment returns, fitting one of a stochastic investment class over said given time frame in relation to said benchmark $X_b$ by obtaining a location parameter a, a scale parameter b and other corresponding shape parameters; and an empirical investment class over said given time frame in relation to said benchmark $X_b$; determining a mean return value $X_m$ and a standard deviation $\sigma_x$ using said class; graphically illustrating said portfolio in relation to said benchmark $X_b$ using said return value $X_m$ and said standard deviation $\sigma_x$ on an investment chart; determining for said portfolio by using properties of said class a solution to $(X_m-X_b)=[(E_S-X_b)\cdot\alpha]+[(E_P-X_b)\cdot\gamma]=I'_S+I'_P$; graphically illustrating at least one said component of said expression $(X_m-X_b)$, in the form of a topographical map on said investment chart using said benchmark $X_b$.

According to a first broad aspect of the invention, there is provided a method for evaluating at least one of a risk, safety and efficiency property of a portfolio belonging to a class of one of a probability density and a probability distribution, for a given time frame. The method comprises: obtaining portfolio pricing data over said given time frame; obtaining at least one benchmark $X_b$ having benchmark profit, benchmark loss and benchmark return values; with respect to investment returns, fitting one of a stochastic investment class over said given time frame in relation to said benchmark $X_b$ by obtaining a location parameter a, a scale parameter b and other corresponding shape parameters; and an empirical investment class over said given time frame in relation to said benchmark $X_b$; determining a mean return value $X_m$ and a standard deviation $\sigma_x$ using said class; graphically illustrating said portfolio in relation to said benchmark $X_b$ using said return value $X_m$ and said standard deviation $\sigma_x$ on an investment chart; determining for said portfolio by using properties of said class a solution to $(X_m-X_b)=[(E_S-X_b)\cdot\alpha]+[(E_P-X_b)\cdot\gamma]=I'_P+I'_P$ With $I'_S=[(E_S-X_b)\cdot\alpha]$ and $I'_P=[(E_P-X_b)\cdot\gamma]$, wherein $(E_S X_b)$ is a component of $(X_m-X_b)$ and $I'_S$ representing an Expected Shortfall, $(E_P-X_b)$ is a component of $(X_m-X_b)$ and $I'_P$ representing an Expected Profit, $\gamma$ is a component of $(X_m-X_b)$ and $I'_P$ representing a probability of profit, $\alpha$ a is a component of $(X_m-X_b)$ and $I'_S$ representing a probability of loss, $I'_S$ is a component of $(X_m-X_b)$ representing an insurance against an Expected Shortfall and $I'_P$ is a component of $(X_m-X_b)$ representing an insurance against an Expected Profit; graphically illustrating at least one said component of said expression $(X_m-X_b)$, in the form of a topographical map on said investment chart using said benchmark $X_b$; whereby said portfolio can be evaluated in terms of at least one of risk, safety and efficiency.

According to a second broad aspect of the invention, there is provided an apparatus for evaluating at least one of a risk, safety and efficiency property of a portfolio belonging to a class of one of a probability density and a probability distribution, for a given time frame. The system comprises: a portfolio pricing database over said given time frame; a benchmark identifier for obtaining at least one benchmark $X_b$ having benchmark profit, benchmark loss and benchmark return values; with respect to investment returns, a class fitter for fitting one of a stochastic investment class over said given time frame in relation to said benchmark $X_b$ by obtaining a location parameter a, a scale parameter b and other corresponding shape parameters; and an empirical investment class over said given time frame in relation to said benchmark $X_b$; a parameter calculator for determining a mean return value $X_m$ and a standard deviation $\sigma_x$ using said class; an illustrator for graphically illustrating said portfolio in relation to said benchmark $X_b$ using said return value $X_m$ and said standard deviation $\sigma_x$ on an investment chart; a component determiner for determining for said portfolio by using properties of said class a solution to $(X_m-X_b)=[(E_S-X_b)\cdot\alpha]+[(E_P-X_b)\cdot\gamma]=I'_S+I'_P$ with $I'_S=[(E_S-X_b)\cdot\alpha]$ and $I'_P=[(E_P-X_b)\cdot\gamma]$, wherein $(E_S-X_b)$ is a component of $(X_m-X_b)$ and $I'_P$ representing an Expected Shortfall, $\gamma$ is a component of $(X_m-X_b)$ and I'$_P$ representing a probability of profit, α is a component of $(X_m-X_b)$ and I'$_S$ representing a probability of loss, I'$_S$ is a component of $(X_m-X_b)$ representing an insurance against an Expected Shortfall and I'$_P$ is a component of $(X_m-X_b)$ representing an insurance against an Expected Profit; said illustrator for graphically illustrating at least one said component of said expression $(X_m-X_b)$, in the form of a topographical map on said investment chart using said benchmark $X_b$; whereby said portfolio can be evaluated in terms of at least one of risk, safety and efficiency.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
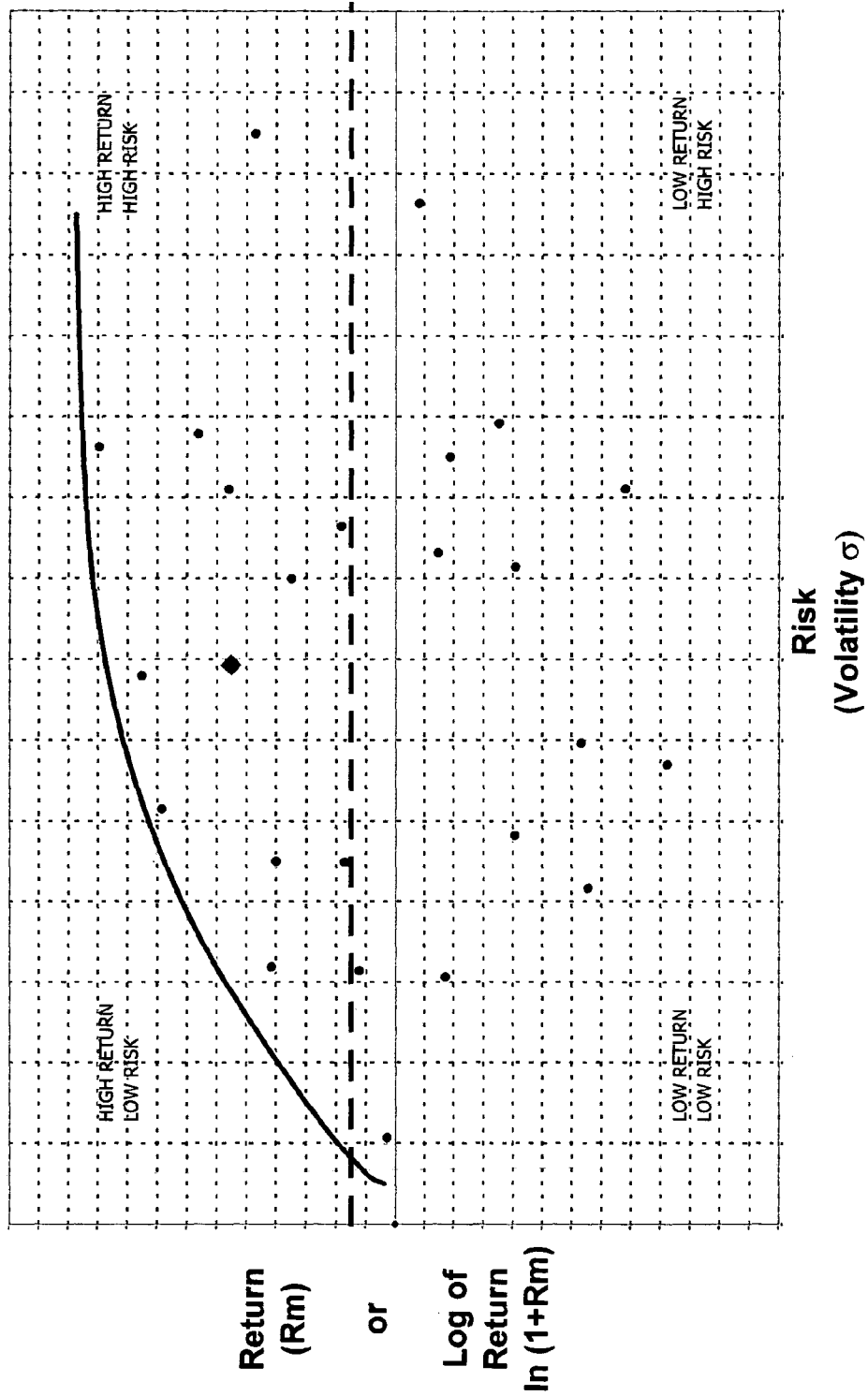
FIG. 1 is an illustration of the prior art "Risk-Return" report.

In controlling risk, it is important to distinguish between risk prevention and reduction. Risk prevention is attained by restricting the probability of loss, and translates into satisfying an allowable frequency of loss criteria. In turn, risk reduction refers to restricting the severity of loss, and similarly entails satisfying an allowable severity of loss criteria. The concept of insurance combines these notions in the form of a product:

$$\text{Insurance} = (\text{probability of loss or shortfall}) \times \quad (1)$$
$$(\text{expected loss in the event of a loss or shortfall}) =$$
$$(\text{probability of loss or shortfall}) \times$$
$$(\text{conditional expected loss or shortfall})$$

The term "shortfall" also naturally conjures up a reference to an implicit benchmark, that defining the threshold between profit and loss. By applying a profit and loss threshold to a continuous probability density function that has been drawn out graphically for convenience, the density function can be separated into two distinct profit and loss sections for analysis. The measure of the probability of loss then corresponds to the area of the loss section, whereas the measure of Expected Shortfall coincides with the value of the loss that passes through the centroid of the loss section (center of gravity of the loss section if the latter is taken as a homogeneous plate). The Expected Shortfall can be taken as the precise value of the loss passing through the centroid of the loss section or equivalently, as the difference between the latter and the benchmark value. Just as the determination of centroids relies on the concept of moments about an axis, the Expected Shortfall is related to the concept of Lower Partial Moment LPM for (a=1) discussed previously. Conversely, returning to the sectioned density function, the measure of the probability of profit corresponds to the area of the profit section, whereas the measure of Expected Profit coincides with the value of the profit that passes through the centroid of the profit section. Similarly, Expected Profit can be taken as the precise value of the profit passing through the centroid or as the difference between the latter and the benchmark value.

Historically, the aforementioned properties of the profit section have been given scarce and inadequate attention in relation to risk evaluation. This reflects the very conservative approach that has traditionally been applied. According to axiom C in P. Artzner (see "Application of Coherent Risk Measures to Capital Requirements in Insurance", North American Actuarial Journal, Vol. 3, No. 2, pp. 11-25, 1999.), conservatism is reflected in a risk measure if it depends only on possible states with a negative final value; states with a positive value are irrelevant. In fact, these very strict attitudes form the basis of the insurance industry: the avoidance of a loss carries no intrinsic value. A similar transposition to the investment process can hardly be justified except for infinitely risk-adverse investors. It must be noted that axiom C was rightly omitted from the definition of a coherent risk measure. P. Albrecht (see "Shortfall Returns and Shortfall Risk", Proceedings AFIR, Colloquium of the International Actuarial Association, Orlando, pp. 87-110, 1994) exceptionally introduces the notion of Expected Profit (termed excess expectation) in his discussion of shortfall risks.

It will be determined hereafter that rational portfolio selection cannot be based on risk evaluation alone: to section the profit and loss density function only to discard the profit section and retain the loss section for analysis is irrational. Presumably, the expected return lies in the profit section. Regardless, a relationship exists that binds the properties of each section (area and centroid) to those of the whole. This relationship also bridges the arts of investing and insuring in highlighting the value and role of insurance upon which rational investment decisions can be based.

The choice of an appropriate probability density function characterizing profit and loss is especially important in analyzing risk. A concentration or lack of diversification in investment positions typically leads to a probability density function that is non-Normal, skewed and with fat tails: the distribution lacks symmetry and the occurrence of extreme events is rare but plausible and worrisome. Applicable density functions are of the extreme value type, namely Weibull, Gumbel, Frechet and Generalized Pareto (see "Extreme Value Theory as a Risk Management Tool", P. Embrechts, S. I. Resnick and G. Samorodnitsky, North American Actuarial Journal, Vol. 3, No. 2, April 1999, pp. 30-41). The main aim of the analysis is then to curve-fit a tail end of the density to the larger risky data in order to properly forecast extreme events. The problem is akin to determining the design load of a large dam of limited lifespan for a flooding event thought to occur only once every ten thousand years, even though no one may ever witness such an event. Empirical distributions can also be established based on historical data. For properly diversified portfolios, those qualified by a lack of concentration that prudent investors generally strive for, the underlying probability density will be closer to Normal, with better symmetry, and with profit and loss tail ends of relatively limited magnitude, i.e. mostly constrained then to $\pm 3\sigma$ (standard deviation) about the mean (see "Approximating Expected Utility by a Function of Mean and Variance", H. Levy and H. M. Markowitz, American Economic Review, Vol. 69, No. 3, 1979, pp. 308-317). The Normal probability density serves as the foundation of the efficient frontier concept of H. M. Markowitz (see "Portfolio Selection", Journal of Finance, March 1952, pp. 77-91) and the option pricing evaluation theory of F. Black and M. Scholes (see "The Pricing of Options and Corporate Liabilities", Journal of Political Economy, Vol. 81, No. 3, May/June 1973, pp. 637-654). The Cauchy density can be called upon to model fat tailed symmetrical distributions even though it presents problems of convergence, its variance and standard deviation being infinite. The system and method comprising the invention admits mostly without restriction a very wide class of probability densities or distributions.

The extreme value densities noted above, as well as the symmetrical Normal and Cauchy densities, are applied under the simplifying IID assumption of independent and identically distributed profit and loss events. Two distributions encompassing a different number of events are identically distributed if they are of the same general shape and, more precisely, if scaling factors exist allowing mapping of one distribution into the other (see "Basic Notions in Probability", J.-P. Bouchaud and M. Potters, Chapter 1 in Theory of Financial Risks: From Statistical Physics to Risk Management, Cambridge University Press, October, 2000, 232 pp.). A first scaling factor is applied to the translation of the mean expected values and a second, to the dilation or expansion of the fluctuations about the mean. In finance, return events are pinned to time. Thus, the distribution of events on a reference time scale (week, month, year, multi-year) remains stable and does not vary on another time scale provided that proper resealing factors are taken into account. For the Normal density, the dilation of the fluctuations on time scale S is a factor $\sqrt{S}$ larger than those on the unit (reference) time scale whereas mean values on S are S times larger than the unit scale (for simple not compound returns). For example, if monthly data is to be extrapolated or compared to yearly data based on a Normal density, then (S=12), and mean yearly data should be 12 times greater than mean monthly data whereas yearly data should fluctuate $\sqrt{12}$ or 3.5 times more than monthly data. Inverse operations are obviously feasible in going from longer time periods of, say, year, to shorter ones, say, month. J.-P. Bouchaud and M. Potters (see "Basic Notions in Probability", Chapter 1 in Theory of Financial Risks: From Statistical Physics to Risk Management, Cambridge University Press, October, 2000, 232 pp.) discuss scaling factors for other distributions. The difference in the scaling factors relative to the translation and dilation of profit and loss probability distributions, and in particular for the Normal density, is determinate in controlling the evolution of risk measurements for multi-period events, as will be played out later. If the underlying probability densities might vary based on portfolio diversification levels, the IID assumption may become highly strained and must be applied cautiously in passing from one diversification level to another significantly different.

The notion of efficiency is central in portfolio selection. Efficiency relates to the ability to produce a desired effect with a minimum of expense, and can be expressed as a ratio of output to input, i.e. desired effect to expense incurred. Along the efficient frontier of H. M. Markowitz (see "Portfolio Selection", Journal of Finance, March 1952, pp. 77-91), portfolios are established that maximize return for a given level of variability (variance or standard deviation) or minimize variability for a given level of return. In both cases, a reward-to-variability ratio is maximized or optimized. A. D. Roy (see "Safety First and the Holding of Assets", Econometrica, Vol. 20, No. 3, pp. 431-449, 1952) was the first to explicitly propose such a ratio as a basis for portfolio selection. The same ratio was later recommended for evaluating the performance of mutual funds, and now is widely stated as a general measure of efficiency (see "Mutual Fund Performance", W. F. Sharpe, Journal of Business, Vol. 39, No. 1, pp. 119-138, 1966 and "The Sharpe Ratio", The Journal of Portfolio Management, Fall, pp. 49-58, 1994). Explicitly, the Sharpe ratio $S_r$ is defined as $$S_r = \frac{(R_m - R_b)}{\sigma} \qquad (2)$$

where $R_m$ is the investment return, $R_b$ is the benchmark return and $\alpha$ is the standard deviation of the differential $(R_m-R_b)$, all with respect to one-period returns. The benchmark usually taken is the riskless security. Additional efficiencies are examined hereafter by considering other plausible ratios of desired effects to related expenses.

FIG. 1 presents a common risk-return report for a limited set of portfolios. Shown are mean returns and standard deviation of returns based on single or reference period events. Data is typically annualized to yearly performance. Mean returns are usually expressed as compound returns as opposed to simple returns. The data may reflect actual historical performance of real portfolios over a certain significant time frame, estimated performance based on the simulation of fictitious portfolios, or projected performance of potential future portfolios. Risk is commonly associated with volatility a thereby explaining the nomenclature assigned to the four quadrants as of "High Return-Low Risk", "High Return-High Risk", "Low Return-High Risk" and "Low Return-Low Risk". The invention will show this nomenclature to be highly misleading. The dotted horizontal line in FIG. 1 is the reference return of a benchmark. A benchmark return must be realistic and feasible. Benchmarks in the form of indexed portfolios, for example, are useful for relative performance evaluation. The benchmark of choice for risk analysis in absolute terms is that of the riskless asset of short-term treasury bills with negligible (taken practically as zero) volatility. Also shown in FIG. 1 is a parabolic upper envelope delimiting an efficient frontier (see "Portfolio Selection", by H. M. Markowitz, Journal of Finance, March 1952, pp. 77-91) based on state-of-the-art calculations. Portfolios exist along this frontier as different combinations of potential investments, suitable to rational investors intent on maximizing wealth based on personal perceptions and tolerance to risk. As no actual risk measure other than a is usually associated with this frontier to guide the risk sensitive investor in his choice, other devices have been provided by portfolio theory. One such device is the point of tangency between the efficient frontier and a line originating along the ordinate at the riskless asset: such a portfolio maximizes safety in the sense it minimizes the probability of loss (see "Safety First and the Holding of Assets", A. D. Roy, Econometrica, Vol. 20, No. 3, pp. 431-449, 1952). Other devices come in the form of a specified family of so-called utility functions: only one such function singularly intersects the efficient frontier providing a point of tangency. The problem then rests on defining an appropriate set of utility functions for a particular investor. Another feasible device, in principle, is the evaluation of the cost of options (see "The Pricing of Options and Corporate Liabilities", F. Black and M. Scholes, Journal of Political Economy, Vol. 81, No. 3, May/June 1973, pp. 637-654) for all portfolios resting along the efficient frontier in order to constitute riskless hedges based on the properties of the riskless asset: the trade-off between option pricing, risk tolerance and portfolio performance would then trigger portfolio selection.

FIG. 1 is scarce in information content that promotes rational decision making. Other than the efficient frontier, FIG. 1 is essentially void of information, the connotation being that the efficient frontier ultimately fulfills any possible request for information. Further, FIG. 1 is notable in that an efficient frontier has at least been established: many common risk-return reports are based only on the ability to plot the basic investment data without further treatment (scatter plot). Finally, these reports consistently point to a same reality: efficient portfolios are highly exceptional. Instead, the investment universe is continuously littered with portfolios that are highly inefficient, providing at times highly volatile performance well below benchmark returns. The present invention is dedicated to enhancing investment decision making by maximizing information content based on the structural properties of probability densities relative to risk, safety and efficiency in relation to a standard portfolio setting such as FIG. 1.

Structural Properties of Probability Densities and Basic Definitions

Consider the continuous probability density f(x) of a random variable x which may possibly be defined piecewise throughout its range. The probability that x takes on a value in the range [a, b] is then $$P[a \leq x \leq b] = \int_a^b f(x)dx \tag{3}$$

The probability density is also normalized in order that the probability of occurrence of x throughout its whole possible range be 100%, or $$P[-\infty < x < +\infty] = \int_{-\infty}^{+\infty} f(x)dx = 1 \tag{4}$$

Consider that the random variable x is itself a function of investment return R, or $$x=x(R) \tag{5}$$

Depending on the choice of the probability density, relationships of the form [x(R)=R] or [x(R)=ln(1+R)] may be amply sufficient in adequately modeling the variability of investment returns R over various investment horizons (with ln standing for natural logarithm).

The mean of x is denoted $x_m$ and coincides with that value of x passing through the centroid of the whole probability density, $$x_m = \int_{-\infty}^{+\infty} x \cdot f(x)dx \tag{6}$$

The median of x is defined as the value $x_{med}$ that satisfies $$\int_{-\infty}^{x_{med}} f(x)dx = 1/2 \tag{7}$$

The mode of x is defined as the value of x that maximizes the density f(x) globally.

For symmetrical probability densities, the values of the mean, median and mode of x coincide. The mean, median and mode are also termed location parameters in that they effectively locate the central portion of the probability density.

Volatility in the form of standard deviation $\sigma_x$ is defined as $$\sigma_x = \sqrt{\int_{-\infty}^{+\infty}(x-x_m)^2 \cdot f(x)dx} \tag{8}$$

The standard deviation $\sigma_x$ is also termed a scale parameter in that it effectively measures the magnitude of the fluctuations of the variable x about its mean.

Let $x_b$ denote a benchmark defining a threshold between profit and loss. Then the loss section of the probability density corresponds to values of x lesser than $x_b$, and the probability of loss α is given by $$\alpha = \int_{-\infty}^{x_b} f(x)dx \tag{9}$$

Similarly, the profit section of the probability density corresponds to values of x greater than $x_b$, and the probability of profit γ is given by $$\gamma = \int_{x_b}^{+\infty} f(x)dx \tag{10}$$

From expression (4), we also recognize $$\alpha+\gamma=1 \tag{11}$$

The Expected Shortfall $E_S$ corresponds to the conditional expected loss, or expected loss given that a loss has occurred, and to that value of x coinciding with the centroid of the loss section, $$E_S = \frac{\int_{-\infty}^{X_b} x \cdot f(x)dx}{\alpha} \quad (12)$$

The Expected Profit $E_P$ corresponds to the conditional expected profit, or expected profit given that a profit has occurred, and to that value of x passing through the centroid of the profit section, $$E_P = \frac{\int_{X_b}^{+\infty} x \cdot f(x)dx}{\gamma} \quad (13)$$

Figure 2:
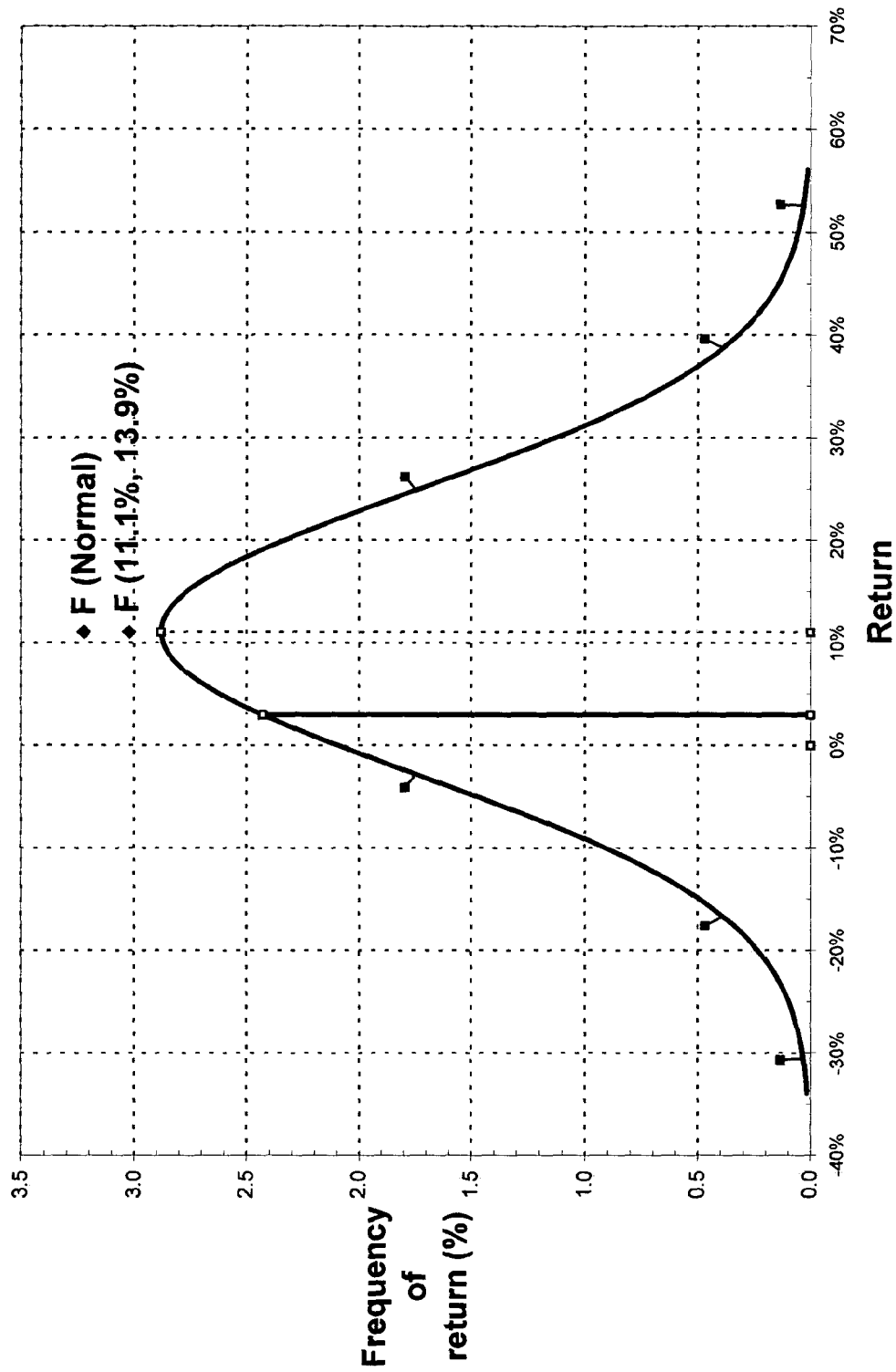
FIG. 2 is an illustration of the profit and loss sections of an investment relative to a benchmark based on its probability density.
Figure 3:
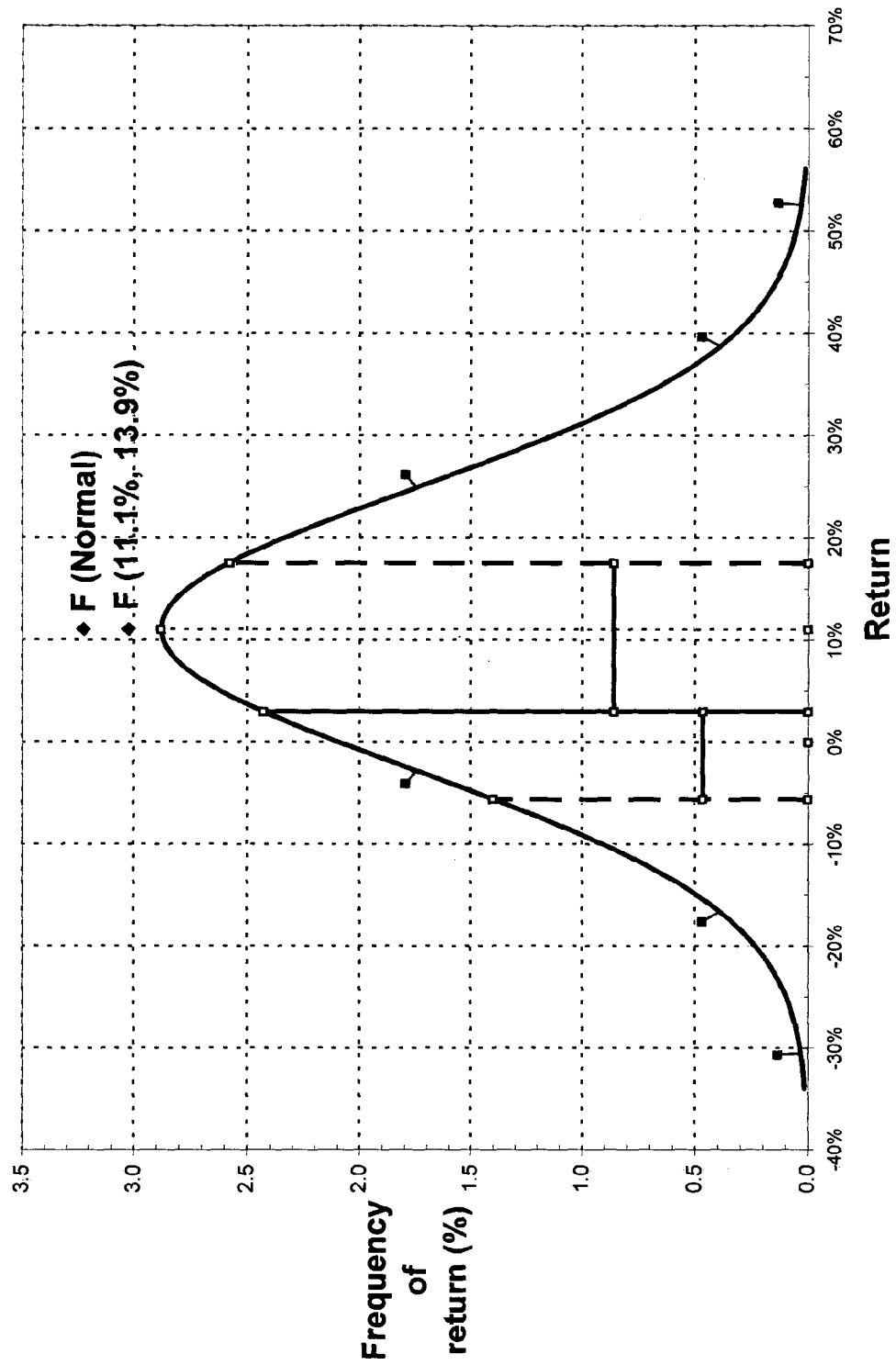
FIG. 3 is an illustration of the centroids of the profit and loss sections of an investment corresponding to the expected shortfall and expected profit.

FIGS. 2 and 3 may be useful in recapitulating the preceding. FIG. 2 is the assumed profit and loss probability density for investment F highlighted in FIG. 1. For illustration purposes, the probability density is taken as Normal, with the variable x corresponding directly to returns R, that is [x(R) =R], and with the pinning of the curve corresponding to multiples of volatility σ about the mean.

The mean return $R_m$ is ($R_m$=11.1%) and the standard deviation, (σ=13.9%). More generally, the mean return $R_m$ corresponds to the return passing through the centroid of the whole probability density. The area beneath the whole of the probability density sums to 1 or 100%.

The benchmark delimiting profit and loss is taken as $R_b$ ($R_b$=3%). Returns R lesser than the benchmark $R_b$ define a loss and the loss section, and returns greater, a profit and the profit section. The area beneath the probability density corresponding to the loss section is the probability of loss α. The area beneath the probability density forming the profit section is the probability of profit γ.

FIG. 3 positions the Expected Shortfall $E_S$ relative to the benchmark $R_b$ as the expected loss given that a loss has occurred, and similarly, the Expected Profit $E_P$ relative to $R_b$ as the expected profit given that a profit has occurred. $E_S$ and $E_P$ correspond to the returns passing through the centroids of the loss and profit sections, respectively, or, equivalently, to their difference, in relation to the fixed benchmark.

The Additional Properties of Insurance Against a Loss or a Profit

From the basic concept of insurance expressed in relation (1), the insurance against a loss or shortfall can be written as $$I_S = E_S \cdot \alpha \quad (14)$$

with the stated components defined in expressions (9) and (12). The insurance against a profit, from possibly selling short, for example, can similarly be written $$I_P = E_P \cdot \gamma \quad (15)$$

with components defined in expressions (10) and (13). Alternately, by accounting for these components, the insurance amounts $I_S$ and $I_P$ can be rewritten as $$I_S = \int_{-\infty}^{X_b} x \cdot f(x)dx \quad (16)$$

$$I_P = \int_{X_b}^{-\infty} x \cdot f(x)dx \quad (17)$$

$I_S$ and $I_P$ are thus seen to correspond to the unconditional expected loss and the unconditional expected profit, respectively.

Binding Relationships between the Aforementioned Properties

Based on the properties of centroids and the first moments of areas relative to any axis, here taken conveniently as the benchmark $x_b$, the properties of the profit and loss sections are related to the whole of the probability density as follows:

$$(x_m-x_b) \cdot (100\%) = [(E_S-x_b) \cdot \alpha] + [(E_P-x_b) \cdot \gamma] \quad (18a)$$

$$(x_m-x_b) = [(E_S-x_b) \cdot \alpha] + [(E_P-x_b) \cdot \gamma] \quad (18b)$$

Equations (18b) and (11) combine to provide $$x_m = (E_S \cdot \alpha) + (E_P \cdot \gamma) \quad (19)$$

which can easily be verified by inspection of expressions (6), (9), (10), (12) and (13). For a class of probability densities, the preferred embodiment of the invention illustrates the components and solutions to expressions (18b) and (19) graphically, in the form of topographical maps. The latter are fundamental equations of investing developed for the preferred embodiment of the invention. The mean $x_m$ can thereby be decomposed into the weighted sum of the Expected Shortfall $E_S$ and the Expected Profit $E_P$, with the weights corresponding respectively to the probabilities of loss and profit. Expression (19) properly establishes the dichotomy that every investor must face and overcome: to every investment corresponds an Expected Profit but also an Expected Shortfall. Expression (19) thus unequivocally states that investing is risky, and neatly packages essentials of risk education and elements of risk perception. Certain investors faced with even the slightest chance of a loss α, and corresponding value of Expected Shortfall $E_S$, will forego investing in volatile assets and seek instead the haven of treasury bills or guaranteed investment certificates. Their risk aversion leaves them blind to an optimistic interpretation of expression (19) to the effect that Expected Profit $E_P$ can probably eventually overcome Expected Shortfall $E_S$ in the forging of satisfactory mean returns $x_m$. This trait of investing has further been gauged in behavioral studies by asking investors to set appropriate levels of Expected Profit $E_P$ to Expected Shortfall $E_S$ in order for them to take on an investment proposal if the probabilities of profit γ and loss a are presumed equal at 50% (see "The Effect of Myopia and Loss Aversion on Risk Taking: an Experimental Test", R. H. Thaler, A. Tversky, D. Kahneman and A. Schwartz, The Quarterly Journal of Economics, May 1997, pp. 647-661; "Risk Aversion or Myopia? Choices in Repeated Gambles and Retirement Investments", S. Benartzi and R. H. Thaler, Management Science, Vol. 45, No. 3, March 1999, pp. 364-381). The average risk aversion coefficient thus obtained varies with the investment horizon but is of the order of −2 to −2.5 in the short-term, i.e. $E_P$ must be 2 to 2.5 times greater than $E_S$ in order to satisfy investor apprehension. Based on expression (19), this points to a probability density highly skewed to the profit section with Expected Profit $E_P$ values 3 to 4 times greater than mean returns $x_m$. U.S. Pat. No. 6,045, 179 discusses a computer based method to quantify investor risk aversion.

Inserting expressions (14) and (15) into (19), we now arrive at an exceptional relationship that bridges the arts of investing and insuring.

$$x_m = I_S + I_P \quad (20)$$

Expression (20) states that the mean return of an investment is equal to the sum of its applicable insurance against a loss and insurance against a profit. The preferred embodiment of the invention also illustrates for a class of probability densities, the components and solutions to expression (20) in the form of topographical maps. If we preserve instead the form of expression (18b), we can also write equivalently $$(x_m - x_b) = I'_S + I'_P \tag{21}$$

with $$I'_S = (E_S - x_b)\alpha \tag{22}$$

$$I'_P = (E_P - x_b)\gamma \tag{23}$$

Thus $I'_S$ and $I'_P$ only differ from their counterparts $I_S$ and $I_P$ of expressions (14) and (15) by fractional amounts of the benchmark $x_b$, i.e.

$$I'_S = I_S - (\alpha \cdot x_b) \tag{24}$$

$$I'_P = I_P - (\gamma \cdot x_b) \tag{25}$$

Generalization of the Probability Densities in Terms of Shape Parameters

Wide classes of probability densities are expressible in terms of shape parameters. Let a denote the location parameter positioning the central portion of the probability density, b, the scale parameter controlling the expansion or compression of the probability density about the location parameter, and c, v and w be other shape parameters that vary or play on the shape of the distribution.

Consider Z, a normalized random variable obtained from the transformation of the random variable x in terms of the location parameter a and the scale parameter b, X is defined in expression (5) as a function of the investment returns R, $$Z = \frac{x-a}{b} = \frac{x(R)-a}{b} \tag{26}$$

Then $$x(R) = (Z \cdot b) + a \tag{27}$$

and, in terms of differentials, $$dx = b \cdot dZ \tag{28}$$

$$dx = \frac{d[x(R)]}{dR} \cdot dR \tag{29}$$

$$dR = \frac{b \cdot dZ}{\left[\frac{d[x(R)]}{dR}\right]} \tag{30}$$

For example, if $[x(R)=R]$, then $$\frac{d[x(R)]}{dR} = 1 \tag{31a}$$

$$dx = b \cdot dZ \tag{31b}$$

$$dx = dR \tag{31c}$$

$$dR = b \cdot dZ \tag{31d}$$

Also, if $[x(R) = \ln(1+R)]$, then $$\frac{d[x(R)]}{dR} = \frac{1}{(1+R)} \tag{32a}$$

$$dx = b \cdot dZ \tag{32b}$$

$$dx = \frac{dR}{(1+R)} \tag{32c}$$

$$dR = (1+R) \cdot b \cdot dZ \tag{32d}$$

In no matter what framework, we then have equivalently $$\int_{x1}^{x2} f(x) \cdot dx = \int_{Z1}^{Z2} f(Z) \cdot dZ = \int_{R1}^{R2} f(R) \cdot dR \tag{33}$$

Table 16 presents a series of continuous probability densities that are defined in terms of location parameter a, scale parameter b and shape parameters c, v and w. Table 16 comprises Tables 16a to 16q. Table 16 is not meant to be complete as other densities, including possible user definable densities, are not discussed. The invention applies to all densities shown in Table 16 and others not listed but definable in terms of shape parameters. The probability densities are given in equivalent forms of f(x) or f(Z) based on the transformations just noted. The corresponding mean values, $x_m$ or $Z_m$, and standard deviation values, $\sigma_x$ and $\sigma_Z$, are also noted in both frameworks. In relation to investing, certain probability densities may be deemed more appropriate than others based on the choice of investments making up the portfolio, while others may be very rarely called upon, if ever. The invention does not discriminate on this basis and leaves the choice of the appropriate probability density to the user. In Table 16, reference is made to the Beta and Gamma functions with the Beta function given as $$B(v, w) = \int_0^1 t^{v-1} \cdot (1-t)^{w-1} dt \tag{34}$$

and the Gamma function as $$\Gamma(c) = \int_0^\infty t^{c-1} \cdot e^{-t} dt \tag{35}$$

If n is an integer, then $$\Gamma(n) = (n-1)! \tag{36}$$

Consistent relationships with regards to mean and standard deviation values are to be found in Table 16 in the form of $$x_m = (Z_m \cdot b) + a \tag{37}$$

$$\sigma_x = \sigma_z \cdot b \tag{38}$$

which also follow from inserting expression (27) into the definitions (6) and (8). The quantity $\sigma_z$ varies but equals a constant depending on the probability density (Table 16).

Based on expression (38), the standard deviation $\sigma_x$ is then directly proportional to the scale parameter b of a given probability density. For certain probability densities such as the Cauchy, expression (38) may not exist: all considerations must then be maintained in terms of the scale parameter b.

TABLE 16a

Cauchy (Lorentz)
(b > 0, b Is The Half Width At Half Maximum)

| | | |
|---|---|---|
| Range Of Non Zero Density | $-\infty < x < +\infty$ | $-\infty < Z < +\infty$ |
| Density | $f(x) = \frac{1}{\pi b}\left[1 + \left(\frac{x-a}{b}\right)^2\right]^{-1}$ | $f(Z) = \frac{1}{\pi}[1 + Z^2]^{-1}$ |
| Mean | $x_m = a$ | $Z_m = 0$ |
| Standard Deviation | Does Not Exist. | Does Not Exist. |

TABLE 16b

Cosine

| | | |
|---|---|---|
| Range Of Non Zero Density | $x_{min} \leq x \leq x_{max}$ | $Z_{min} \leq Z \leq Z_{max}$ |
| Density | $f(x) = \frac{1}{2b}\cos\left(\frac{x-a}{b}\right)$ | $f(Z) = \frac{1}{2}\cos(Z)$ |
| Mean | $x_m = \frac{X_{min} + X_{max}}{2} = a$ | $Z_m = 0$ |
| Standard Deviation | $\sigma_x = \frac{b}{2}\sqrt{\pi^2 - 8}$ $b = \frac{X_{max} - X_{min}}{\pi}$ | $\sigma_z = \frac{1}{2}\sqrt{\pi^2 - 8}$ |

TABLE 16c

Erlang
(Equivalent To Gamma For (a = 0))(b > 0)(c a positive integer)

| | | |
|---|---|---|
| Range Of Non Zero Density | $x \geq 0$ | $Z \geq 0$ |
| Density | $f(x) = \frac{\left(\frac{x}{b}\right)^{c-1}\exp\left[-\left(\frac{x}{b}\right)\right]}{b(c-1)!}$ | $f(Z) = \frac{Z^{c-1}\exp[-Z]}{(c-1)!}$ |
| Mean | $x_m = bc$ | $Z_m = c$ |
| Standard Deviation | $\sigma_x = b\sqrt{c}$ | $\sigma_z = \sqrt{c}$ |

TABLE 16d

Exponential
(b > 0)

| | | |
|---|---|---|
| Range Of Non Zero Density | $x \geq a$ | $Z \geq 0$ |
| Density | $f(x) = \frac{1}{b}\exp\left[-\left(\frac{x-a}{b}\right)\right]$ | $f(Z) = \exp[-Z]$ |
| Mean | $x_m = a + b$ | $Z_m = 1$ |
| Standard Deviation | $\sigma_x = b$ | $\sigma_z = 1$ |

TABLE 16e

Extreme Value
(b > 0)

| | | |
|---|---|---|
| Range Of Non Zero Density | $-\infty < x < +\infty$ | $-\infty < Z < +\infty$ |
| Density | $f(x) = \frac{1}{b}\exp\left(\frac{x-a}{b}\right)\exp\left[-\exp\left(\frac{x-a}{b}\right)\right]$ | $f(Z) = \exp(Z)\exp[-\exp(Z)]$ |
| Mean | $x_m = a - b \cdot \gamma_E$ $\gamma_E \equiv$ Euler's constant $\approx 0.57721$ | $Z_m = -\gamma_E$ |
| Standard Deviation | $\sigma_x = \frac{b\pi}{\sqrt{6}}$ | $\sigma_z = \frac{\pi}{\sqrt{6}}$ |

TABLE 16f

Gamma
(b > 0)(c > 0)

| | | |
|---|---|---|
| Range Of Non Zero Density | $x > a$ | $Z > 0$ |
| Density | $f(x) = \frac{1}{b\Gamma(c)}\left(\frac{x-a}{b}\right)^{c-1}\exp\left[-\left(\frac{x-a}{b}\right)\right]$ | $f(Z) = \frac{1}{\Gamma(c)}(Z)^{c-1}\exp[-Z]$ |
| Mean | $x_m = a + bc$ | $Z_m = c$ |

TABLE 16f-continued

Gamma
($b > 0$)($c > 0$)

| | | |
|---|---|---|
| Standard Deviation | $\sigma_x = b\sqrt{c}$ | $\sigma_z = \sqrt{c}$ |

TABLE 16g

Laplace
($b > 0$)

| | | |
|---|---|---|
| Range Of Non Zero Density | $-\infty < x < +\infty$ | $-\infty < Z < +\infty$ |
| Density | $f(x) = \dfrac{1}{2b}\exp\left[-\dfrac{|x-a|}{b}\right]$ | $f(Z) = \dfrac{1}{2}\exp[-|Z|]$ |
| Mean | $x_m = a$ | $Z_m = 0$ |
| Standard Deviation | $\sigma_x = b\sqrt{2}$ | $\sigma_z = \sqrt{2}$ |

TABLE 16h

Logarithmic
($a = X_{min}$)($b = X_{max} - X_{min}$)

| | | |
|---|---|---|
| Range Of Non Zero Density | $x_{min} \leq x \leq x_{max}$ | $Z_{min} \leq Z \leq Z_{max}$ |
| Density | $f(x) = -\dfrac{1}{b}\ln\left(\dfrac{x-a}{b}\right)$ | $f(Z) = -\ln(Z)$ |
| Mean | $x_m = a + \dfrac{b}{4}$ | $Z_m = \dfrac{1}{4}$ |
| Standard Deviation | $\sigma_x = \dfrac{b\sqrt{7}}{12}$ | $\sigma_z = \dfrac{\sqrt{7}}{12}$ |

TABLE 16i

Logistic
($b > 0$)

| | | |
|---|---|---|
| Range Of Non Zero Density | $-\infty < x < +\infty$ | $-\infty < Z < +\infty$ |
| Density | $f(x) = \dfrac{1}{b}\dfrac{\exp[(x-a)/b]}{[1+\exp[(x-a)/b]]^2}$ | $f(Z) = \dfrac{\exp(Z)}{[1+\exp(Z)]^2}$ |
| Mean | $x_m = a$ | $Z_m = 0$ |
| Standard Deviation | $\sigma_x = \dfrac{b\pi}{\sqrt{3}}$ | $\sigma_z = \dfrac{\pi}{\sqrt{3}}$ |

TABLE 16j

Normal
($b > 0$)

| | | |
|---|---|---|
| Range Of Non Zero Density | $-\infty < x < +\infty$ | $-\infty < Z < +\infty$ |
| Density | $f(x) = \dfrac{1}{b\sqrt{2\pi}}\exp\left[-\dfrac{(x-a)^2}{2b^2}\right]$ | $f(Z) = \dfrac{1}{\sqrt{2\pi}}\exp\left[-\dfrac{Z^2}{2}\right]$ |
| Mean | $x_m = a$ | $Z_m = 0$ |
| Standard Deviation | $\sigma_x = b$ | $\sigma_z = 1$ |

TABLE 16k

Log Normal
($b > 0$)

| | | |
|---|---|---|
| Range Of Non Zero Density | $y > a_1$ | See Normal for $-\infty < [x = \ln(y - a_1)] < +\infty$ |
| Density | $f(y) = \dfrac{1}{b(y-a_1)\sqrt{2\pi}}\exp\left[-\dfrac{(\ln(y-a_1)-a)^2}{2b^2}\right]$ | $f(x) = \dfrac{1}{b\sqrt{2\pi}}\exp\left[-\dfrac{(x-a)^2}{2b^2}\right]$ |
| Mean | $y_m = a_1 + \exp\left(a + \dfrac{b^2}{2}\right)$ | $x_m = a$ |
| Standard Deviation | $\sigma_y = \sqrt{\exp(2a+b^2)[\exp(b^2)-1]}$ | $\sigma_z = b$ |

TABLE 16l

Parabolic

| | | |
|---|---|---|
| Range Of Non Zero Density | $x_{min} \leq x \leq x_{max}$ | $Z_{min} \leq Z \leq Z_{max}$ |
| Density | $f(x) = \frac{3}{4b}\left[1 - \left(\frac{x-a}{b}\right)^2\right]$ | $f(Z) = \frac{3}{4}[1 - Z^2]$ |
| Mean | $x_m = \frac{Xmin + Xmax}{2} = a$ | $Z_m = 0$ |
| Standard Deviation | $\sigma_x = \frac{Xmax - Xmin}{2\sqrt{5}} = \frac{b}{\sqrt{5}}$ | $\sigma_z = \frac{1}{\sqrt{5}}$ |

TABLE 16m

Pearson's Type 5
$(a = 0)(b > 0)(c > 0)$

| | | |
|---|---|---|
| Range Of Non Zero Density | $x > 0$ | $Z > 0$ |
| Density | $f(x) = \frac{1}{b}\left(\frac{b}{x}\right)^{c+1}\frac{\exp[-(b/x)]}{\Gamma(c)}$ | $f(Z) = \left(\frac{1}{Z}\right)^{c+1}\frac{\exp[-(1/Z)]}{\Gamma(c)}$ |
| Mean | $x_m = \frac{b}{c-1}, c > 1$ | $Z_m = \frac{1}{c-1}$ |

TABLE 16m-continued

Pearson's Type 5
$(a = 0)(b > 0)(c > 0)$

| | | |
|---|---|---|
| Standard Deviation | $\sigma_x = \frac{b}{(c-1)\sqrt{c-2}}, c > 2$ | $\sigma_z = \frac{1}{(c-1)\sqrt{c-2}}$ |

TABLE 16n

Pearson's Type 6
$(a = 0)(b > 0)(v > 0)(w > 0)$

| | | |
|---|---|---|
| Range Of Non Zero Density | $x > 0$ | $Z > 0$ |
| Density | $f(x) = \frac{1}{b}\frac{(x/b)^{v-1}}{B(v, w)(1 + (x/b))^{v+w}}$ | $f(Z) = \frac{Z^{v-1}}{B(v, w)(1 + Z)^{v+w}}$ |
| Mean | $x_m = \frac{bv}{w-1}, w > 1$ | $Z_m = \frac{v}{w-1}$ |
| Standard Deviation | $\sigma_x = \frac{b}{w-1}\sqrt{\frac{v(v+w-1)}{w-2}}, w > 2$ | $\sigma_z = \frac{1}{w-1}\sqrt{\frac{v(v+w-1)}{w-2}}$ |

TABLE 16o

Weibull (Rayleigh If $(c = 2)$)
$(b > 0)(c > 0)$

| | | |
|---|---|---|
| Range Of Non Zero Density | $x > a$ | $Z > 0$ |
| Density | $f(x) = \frac{c}{b}\left(\frac{x-a}{b}\right)^{c-1}\exp\left[-\left(\frac{x-a}{b}\right)^c\right]$ | $f(Z) = cZ^{c-1}\exp[-(Z)^c]$ |
| Mean | $x_m = a + b\Gamma[(c+1)/c]$ | $Z_m = \Gamma[(c+1)/c]$ |
| Standard Deviation | $\sigma_x = b\left[\Gamma\left(\frac{c+2}{c}\right) - \left[\Gamma\left(\frac{c+1}{c}\right)\right]^2\right]^{1/2}$ | $\sigma_z = \left[\Gamma\left(\frac{c+2}{c}\right) - \left[\Gamma\left(\frac{c+1}{c}\right)\right]^2\right]^{1/2}$ |

TABLE 16p

Chi-Square
$(b > 0)(v \geq 1)$

| | | |
|---|---|---|
| Range Of Non Zero Density | $x > a$ | $Z > 0$ |
| Density | $f(x) = \dfrac{\left[\dfrac{x-a}{b}\right]^{(v/2)-1}}{2^{v/2}b\Gamma(v/2)} \exp\left[-\dfrac{x-a}{2b}\right]$ | $f(Z) = \dfrac{Z^{(v/2)-1}}{2^{v/2}\Gamma(v/2)} \exp\left[-\dfrac{Z}{2}\right]$ |
| Mean | $x_m = a + vb$ | $Z_m = v$ |
| Standard Deviation | $\sigma_x = b\sqrt{2v}$ | $\sigma_z = \sqrt{2v}$ |

TABLE 16q

Student's T
$(b > 0)(v \text{ Is A Positive Integer})$

| | | |
|---|---|---|
| Range Of Non Zero Density | $-\infty < x < +28$ | $-\infty\ Z\ +\infty$ |
| Density | $f(x) = \dfrac{\Gamma[(v+1)/2]}{b\sqrt{\pi v} \cdot \Gamma(v/2)}\left(1 + \dfrac{\left[\dfrac{x-a}{b}\right]^2}{v}\right)^{-(v+1)/2}$ | $f(Z) = \dfrac{\Gamma[(v+1)/2]}{\sqrt{\pi v} \cdot \Gamma(v/2)}\left(1 + \dfrac{Z^2}{v}\right)^{-(v+1)/2}$ |
| Mean | $x_m = a$ | $Z_m = 0$ |
| Standard Deviation | $Z_m = \dfrac{v}{w-1}$ | $f(x) = \dfrac{1}{b}\dfrac{(x/b)^{v-1}}{B(v,w)(1+(x/b))^{v+w}}$ |

Mapping Functions for Risk, Safety and Efficiency

Mapping refers to the distillation of the concepts of investment risk, safety and efficiency into real numbers to serve as appropriate measures.

We first define, with respect to the probability density f(x), a variable $H_r$ in terms of a set benchmark or target $x_b$, the location parameter a and the scale parameter b. The benchmark $x_b$ establishes the division between the profit and loss sections of the probability density f(x).

$$H_r = \frac{(a - x_b)}{b} \tag{39}$$

To map the probability of loss $\alpha$, transform expression (9) in terms of the probability density f(Z) based on the definitions of Z in expression (26) and $H_r$ in expression (39), $$\alpha = \int_{+\infty}^{-Hr} f(z)\,dz \tag{40}$$

To map the probability of profit $\gamma$, transform similarly expression (10)

$$\gamma = \int_{-Hr}^{+\infty} f(z)\,dz \tag{41}$$

To map the Expected Shortfall $E_s$ in relation to the benchmark $x_b$, insert expression (26) for Z into expression (12) for $E_s$ and consider expressions (38) for b and (39) for $H_r$.

$$E_s - x_b = M_s \cdot b = \left(\frac{M_s}{\sigma_z}\right) \cdot \sigma_x \tag{42}$$

with $$M_s = H_r + \frac{1}{\alpha} \int_{-\infty}^{-H} Z \cdot f(z)\,dz \tag{43}$$

To map the Expected Profit $E_P$ in relation to the benchmark $x_b$, insert similarly expression (26) for Z into expression (13) for $E_P$ and consider expressions (38) for b and (39) for $H_r$.

$$E_p - x_b = M_p \cdot b = \int_{-Hr}^{+\infty} f(z)\,dz \tag{44}$$

with $$M_p = H_r + \frac{1}{\gamma} \int_{-Hr}^{+\infty} Z \cdot f(z)\,dz \tag{45}$$

To map the insurance against a shortfall in relation to the benchmark $x_b$, consider expressions (22) and (42)

$$I'_s = (Es - x_b)\alpha = (M_s \cdot \alpha) \cdot b = \left(\frac{M_s \cdot \alpha}{\sigma_z}\right) \cdot \sigma_x \tag{46}$$

To map the insurance against a profit in relation to the benchmark $x_b$, consider instead expressions (23) and (44)

$$I'_p = (E_p - x_b)\gamma = (M_p \cdot \gamma) \cdot b = \left(\frac{M_p \cdot \gamma}{\sigma_z}\right) \cdot \sigma_x \tag{47}$$

We now turn to efficiency. As discussed, efficiency can be measured in various ways. Four measures are illustrated here.

Define type 1 efficiency $E_1$ as the ratio of the probability of profit to that of a loss. Then $$E_1 = \frac{\gamma}{\alpha} = \frac{1-\alpha}{\alpha} \quad (48)$$

Define type 2 efficiency $E_2$ as the ratio of the expected profit to the expected shortfall. At any volatility level b we then have from expressions (42) and (44)

$$E_2 = -\left(\frac{E_P - x_b}{E_S - x_b}\right) = -\left(\frac{M_P}{M_S}\right) \quad (49)$$

where the minus sign compensates for that of shortfall.

Define type 3 efficiency $E_3$ as the ratio of the insurance against a profit to that against a loss. Similarly, at any volatility level b we then have from expressions (46), (47), (48) and (49)

$$E_3 = -\frac{I'_P}{I'_S} = -\left(\frac{M_P \cdot \gamma}{M_S \cdot \alpha}\right) = -\left(\frac{M_P \cdot (1-\alpha)}{M_S \cdot \alpha}\right) = E_1 \cdot E_2 \quad (50)$$

Consider now type 4 efficiency $E_4$ as the ratio of the difference between the mean and benchmark returns $(x_m - x_b)$ to the probability of loss $\alpha$ $$E_4 = \frac{(x_m - x_b)}{\alpha} \quad (51)$$

The fundamental nature of the parameter $H_r$ of expression (39) is now obvious: for any given probability density $f(Z)$ and volatility level b or $\sigma_x$, the mappings for $\alpha$, $\gamma$, $M_s$, $M_P$, $(E_s-x_b)$, $(E_P-x_b)$, $I'_s$, $I'_P$, $E_1$, $E_2$, $E_3$ and $E_4$ are strictly functions of $H_r$. The nature of $f(Z)$ is generally such however (Table 16) that these mappings can only be accomplished by computer based numerical algorithms.

Topography Along Contour Lines of Equal Value

We set out to establish topographical maps of the risk, safety and efficiency measures just discussed in relation to investment portfolios. These topographical maps, presented in an appropriate graphical reference and Cartesian coordinate framework, correspond to contour lines of equal value of the property being mapped out.

We first note that by subtracting the quantity $x_b$ from both sides of expression (37) for $x_m$, and in consideration of expression (39) for $H_r$, we arrive at $$(x_m - x_b) = (H_r + Z_m) \cdot b \quad (52)$$

Equivalently, on the basis of expression (38), expression (52) transforms to $$(x_m - x_b) = \left(\frac{H_r + Z_m}{\sigma_z}\right) \cdot \sigma_x \quad (53)$$

on the condition that $\sigma_x$ and $\sigma_z$ exist. Exceptionally, if they do not as for the Cauchy density in Table 16, expression (52) must be maintained.

Expression (53), or alternately expression (52), defines the appropriate presentation framework. Any portfolio provides, on the basis of historical performance, or can be attributed, on the basis of conjecture relative to future performance, a mean (return) value $x_m$ and standard deviation $\sigma_x$ over a given investment horizon. Its performance or premium in relation to the profit and loss benchmark $x_b$ can be evaluated simply by the difference $(x_m - x_b)$. Further, by plotting this difference along the ordinate against the standard deviation $\sigma_x$ along the abscissa, the slope of the line passing through this portfolio data point and the framework origin is equal to the ratio $[(H_r + Z_m)/\sigma_z]$, all components of which vary as a function of the applicable probability density, as in Table 16. In the case of the Normal probability density, for which $[x(R)=R]$ is generally assumed, this slope ratio reduces to the Sharpe ratio $S_r$ of expression (2), with the benchmark $x_b$ usually taken as short-term treasury bills. Further, based on the component $H_r$ of this slope and the volatility level b or $\sigma_x$ of the portfolio data point, mappings can be strictly assigned to the portfolio data point for $\alpha$, $\gamma$, $M_s$, $M_P$, $(E_s-x_b)$, $(E_P-x_b)$, $I'_s$, $I'_P$, $E_1$, $E_2$, $E_3$ and $E_4$ as highlighted in the previous section.

As the component $H_r$ that can be assigned to this line is unique, the following also holds:
a) based on expression (40), the probability of loss $\alpha$ remains constant as we travel along this line, or any other line;
b) based on expression (41), the probability of profit $\gamma$ is also constant along this line, or any other line;
c) based on expressions (43) and (45), the quantities $M_s$ and $M_p$ are also constant along this line, or any other line; and
d) based on expressions (48), (49) and (50), the efficiencies $E_1$, $E_2$ and $E_3$ all remain constant as we travel along this line, or any other line.

The topography then for $\alpha$, $\gamma$, $E_1$, $E_2$ and $E_3$, along which these properties take on constant values, are straight lines in the framework of $(x_m - x_b)$ versus $\sigma_x$ or, alternately, $(x_m - x_b)$ versus b. In more general terms, this framework corresponds to the plotting of the location parameter versus the scale parameter of the probability density that holds for a family of investments, with the origin centered at the ordinate value corresponding to the benchmark $x_b$. Other choices of ordinate values for the origin are obviously possible by simple translation of the abscissa axis but not necessarily practical. The required steps for topographical mapping, not strictly sequential or necessarily as ordered here, are then:
a) Establish a zone, precisely ranges of ordinate values and abscissa values in the reference framework to be mapped out, in order to accommodate the scatter plotting of the portfolio data points of interest;
b) Establish the family of probability densities to be applied to these investments (see Table 16 for example);
c) Calculate and assign constant values of the properties $\alpha$, $\gamma$, $E_1$, $E_2$ or $E_3$ based on expressions (40), (41), (48), (49) or (50) for a complete range of $H_r$ values using adequate computer based numerical algorithms;
d) Select $H_r$ values of interest corresponding for example to appropriate steps in constant values of the various properties to be mapped out;
e) For these $H_r$ values, complete the slopes of the corresponding lines based on expressions (52) or (53) and the applicable probability density;
f) Present the topographical map for a specific property highlighting lines and constant values of interest; and
g) Superimpose against this backdrop the portfolio data points in the reference framework.

Tables 17, 18 and 19 provide examples of steps relative to these operations. Other flow charts are obviously possible to arrive at the same results.

Table 17 is an example of the preliminary steps dealing with the stochastic nature of investment data that in effect apply to all mappings. Table 17 is made up of Tables 17a, 17b and 17c. Table 17a essentially deals with the choice of investments of interest and their association with benchmarks. Table 17b defines the stochastic nature of investment data of interest. Finally, Table 17c is concerned with associating a probability density and stochastic investment class to each investment data. Densities and classes may vary depending on the investment and nature of its data. Mean values and standard deviations can always be calculated without necessarily assigning a probability density and stochastic investment class to each investment case. If these assignments are forfeited, the preferred embodiment of the invention in the form of the semi-analytic approach whereby analytical developments are combined with computer based numerical methods to directly arrive at topographical maps is no longer possible. The data is then being treated empirically in essence. Important considerations then follow from paragraphs 0406 and 0407 in relation to paragraph 0347.

TABLE 17A

Table 17A - Basic investment data.

Collect or select the investment instruments or portfolios of interest.
Establish the unit or reference time period and investment horizon pertinent to data analysis.
Establish the various suitable benchmarks in relation to profit and loss.
Collect or select all corresponding investment price or return data for the instruments instruments and benchmarks.
Include projections or hypothetical investment cases as need be.

TABLE 17B

Table 17B - Stochastic nature of investment data.

1. Transform data to a compatible form as need be. See expression (5).
2. Consider the following options:
a. Systematically pair off investment instrument data and benchmark data at each sequential time period over the investment horizon, and treat their difference as being stochastic.
b. Only treat the investment instrument data as being stochastic, disregard the volatility of the benchmark, if any, and treat the mean value of the benchmark data over the investment horizon as a benchmark threshold.
3. For a same investment instrument, repeat step B.2 for various possible benchmarks as need be.

TABLE 17C

Table 17C - Stochastic investment classes versus empirical data.

1. Admit, assume, fit or best fit a probability density for each stochastic investment variable. Provide thereby, by also considering the transformed density in terms of the variable Z, expressions (26) to (33) or Table 16:
a. Location parameter a.
b. Scale parameter b.
c. Other shape parameters c, v, w, etc., as dictated by the probability density.
d. Mean values $x_m$ and $Z_m$, expressions (6) and (37), or Table 16.
e. Standard deviations $\sigma_x$ or $\sigma_z$, expressions (8) and (38), or Table 16.
2. Designate specific "stochastic investment classes" as corresponding to the same probability density with the same shape parameters c, v, w, etc. The location parameters a, mean values $x_m$ and $Z_m$, scale parameters b and standard deviations $\sigma_x$ or $\sigma_z$ will naturally vary.
3. If steps 1 and 2 above are forfeited, the data is being treated empirically. Calculate mean values and standard deviations.

Having completed Table 17c, the basic investment data can now be scatter plotted in the reference framework, if so chosen, as in Table 25.

Table 18 is an example of the numerical steps carried out for the preliminaries relative to topographical mapping.

TABLE 18

Numerical integration (quadrature) relative to topographical mapping

1. Based on expression (73), generate a set of $H_r$ values that include:
a. All those corresponding to the investment instruments.
b. A suitable range and suitable step values within this range that will properly span the reference framework.
2. Using a numerical algorithm for quadrature suitable for the stochastic investment classes, calculate and tabulate with respect to these $H_r$ values the following quantities:
a. The probability of loss $\alpha$, expression (40).
b. The probability of profit $\gamma$, expression (11) or (41).
c. The quantity $M_s$, expression (43).
d. The quantity $M_P$, expression (45), or (66) if applicable.
e. The efficiency $E_1$, expression (48).
f. The efficiency $E_2$, expression (49).
g. The efficiency $E_3$, expression (50).
h. The so-called slope component $(H_r + Z_m)$ from expression (52), or $(H_r + Z_m)/\sigma_z$ from expression (53), depending on the choice of the reference framework.

Figure 4:
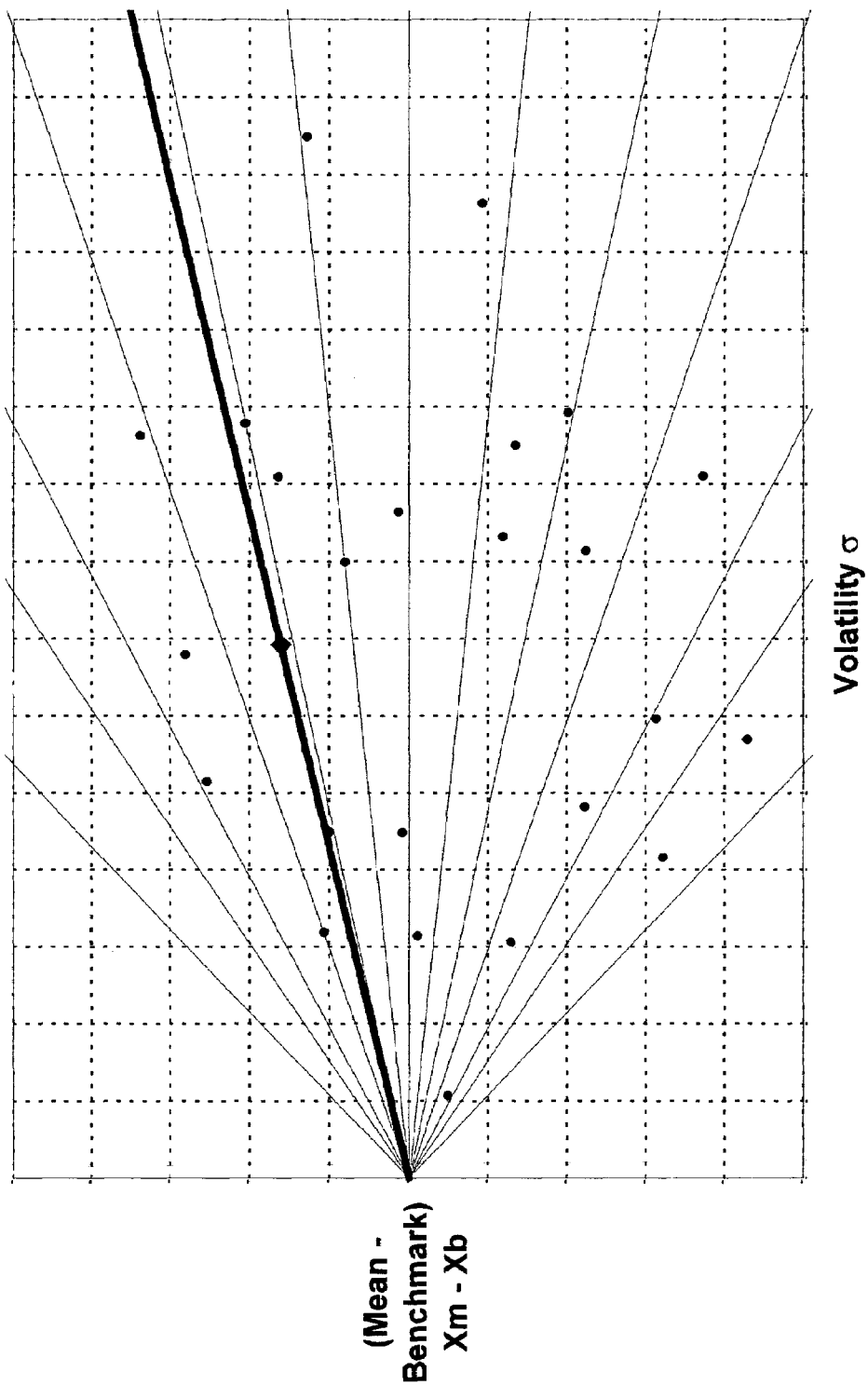
FIG. 4 is an illustration of the family of isometric probability of loss, probability of profit, and efficiencies $E_1$, $E_2$ and $E_3$.

Table 19 is an example of the steps carried out for the topographical mapping of $\alpha$, $\gamma$, $E_1$, $E_2$ and $E_3$. FIG. 4 exemplifies possible topography for $\alpha$, $\gamma$, $E_1$, $E_2$ and $E_3$. Table 19A establishes the general topography for a stochastic investment class.

TABLE 19A

Topographical mapping of $\alpha$, $\gamma$, $E_1$, $E_2$ or $E_3$, general topography for a stochastic investment class Establish sequential values C of interest, to be highlighted for this property and assigned to contour lines.
From Table 18, sequentially find, interpolate or otherwise solve for the corresponding $H_r$ values along with the relevant slope component for the contour lines, and plot these lines in the reference framework with proper slope.
Highlight property values C along these lines.

Table 19B establishes the specific topography for an investment instrument.

TABLE 19B

Topographical mapping of $\alpha$, $\gamma$, $E_1$, $E_2$ or $E_3$, specific topography for an investment instrument:

From Table 18, find its corresponding $H_r$ value, and the relevant slope component for the contour line, and plot this line in the reference framework with proper slope.
Highlight property value C along this line.

The topography of the four properties $(E_S-x_b)$, $(E_P-x_b)$, $I'_s$ and $I'_P$ can be established by another scheme. Based on expressions (42), (44), (46) and (47), these properties are all linear in the scale parameter b or equivalently $\sigma_x$. This implies that as we travel along a base line in the reference framework of $(x_m-x_b)$ versus $\sigma_x$ or, alternately, $(x_m-x_b)$ versus b, potentially passing through various data points for various portfolios, we travel in parallel along other lines corresponding to these four other linear properties in b or $\sigma_x$, with all these lines passing through the origin of the framework. The component $H_r$ of the slope of the base line dictates the slopes of the other four linear relationships. As we stop along the base line at a given level of volatility b or $\sigma_x$, and possibly at a portfolio data point, we simultaneously stop along these four other lines thereby establishing the levels and correspondence in these other properties. The topographical mapping scheme for any of the properties ($E_S$–$x_b$), ($E_P$–$x_b$), $I'_s$ and $I'_P$ corresponds generally to, and not strictly sequential or necessarily as ordered here:

1) Provide a constant value C for any given property to be mapped out;
2) Establish a base line in the reference framework;
3) Based on the component $H_r$ of the slope of this base line, establish the corresponding slope of the property line relationship using an adequate computer based algorithm;
4) Travel along this property line until the level of volatility b or $\sigma_x$ provides the value C;
5) For this level of volatility, determine the corresponding position on the base line;
6) Repeat steps 2 to 5 with a neighboring base line until the topographical curve C is mapped out completely over an appropriate zone corresponding to ordinate and abscissa values of interest in the reference framework;
7) Repeat steps 1 to 6 for a different C value until all C values of interest are mapped out;
8) Present the topographical map highlighting contour lines and constant values of interest for the specific property; and
9) Superimpose against this backdrop the portfolios of interest in the form of data points in the reference framework.

These steps can be expanded as follows. For the topography of the Expected Shortfall $E_s$ with respect to the benchmark $x_b$, establish a base line with slope component $H_r$ and set expression (42) equal to a constant ($C_S$<0)

$$E_s - x_b = M_s \cdot b = \left(\frac{M_s}{\sigma_z}\right) \cdot \sigma_x = C_s \qquad (54)$$

Figure 5:
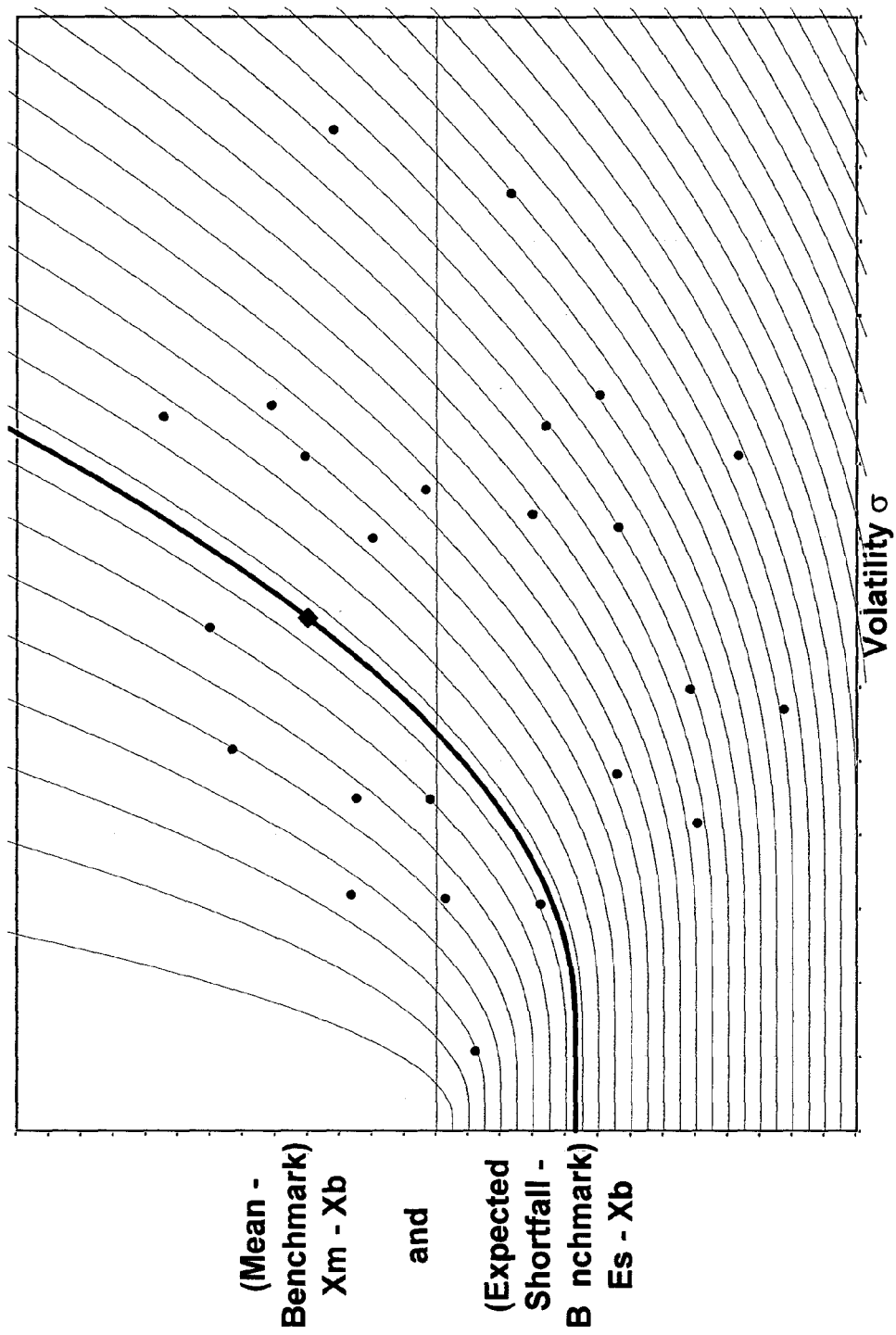
FIG. 5 is an illustration of the family of isometric expected shortfall $(E_s-x_b)$ assuming normal probability density.

Step 4 above then corresponds to $$b = \frac{C_s}{M_s} \qquad (55a)$$

or $$\sigma_x = \frac{C_s}{\left(\frac{M_s}{\sigma_z}\right)} \qquad (55b)$$

with $M_S$ strictly a function of $H_r$. Step 5 follows from expressions (52) or (53)

$$x_m - x_b = (H_r + Z_m) \cdot b = (H_r + Z_m) \cdot \left(\frac{C_s}{M_s}\right) \qquad (56a)$$

$$x_m - x_b = \left(\frac{H_r + Z_m}{\sigma_z}\right) \cdot \sigma_x = \left(\frac{H_r + Z_m}{\sigma_z}\right) \cdot \frac{C_s}{\left(\frac{M_s}{\sigma_z}\right)} = (H_r + Z_m) \cdot \left(\frac{C_s}{M_s}\right) \qquad (56b)$$

providing the same ordinate regardless of the framework b or $\sigma_x$. FIG. 5 exemplifies topography for the expected shortfall ($E_S$–$x_b$) assuming normal density.

Similarly, for the topography of the ($E_P$–$x_b$) based on expression (44) and for ($C_P$>0), steps 4 and 5 correspond to $$b = \frac{C_P}{M_P} \qquad (57a)$$

or $$\sigma_x = \frac{C_P}{\left(\frac{M_P}{\sigma_z}\right)} \qquad (57b)$$

and $$x_m - x_b = (H_r + Z_m) \cdot b \approx (H_r + Z_m) \cdot \left(\frac{C_P}{M_P}\right) \qquad (58)$$

Figure 6:
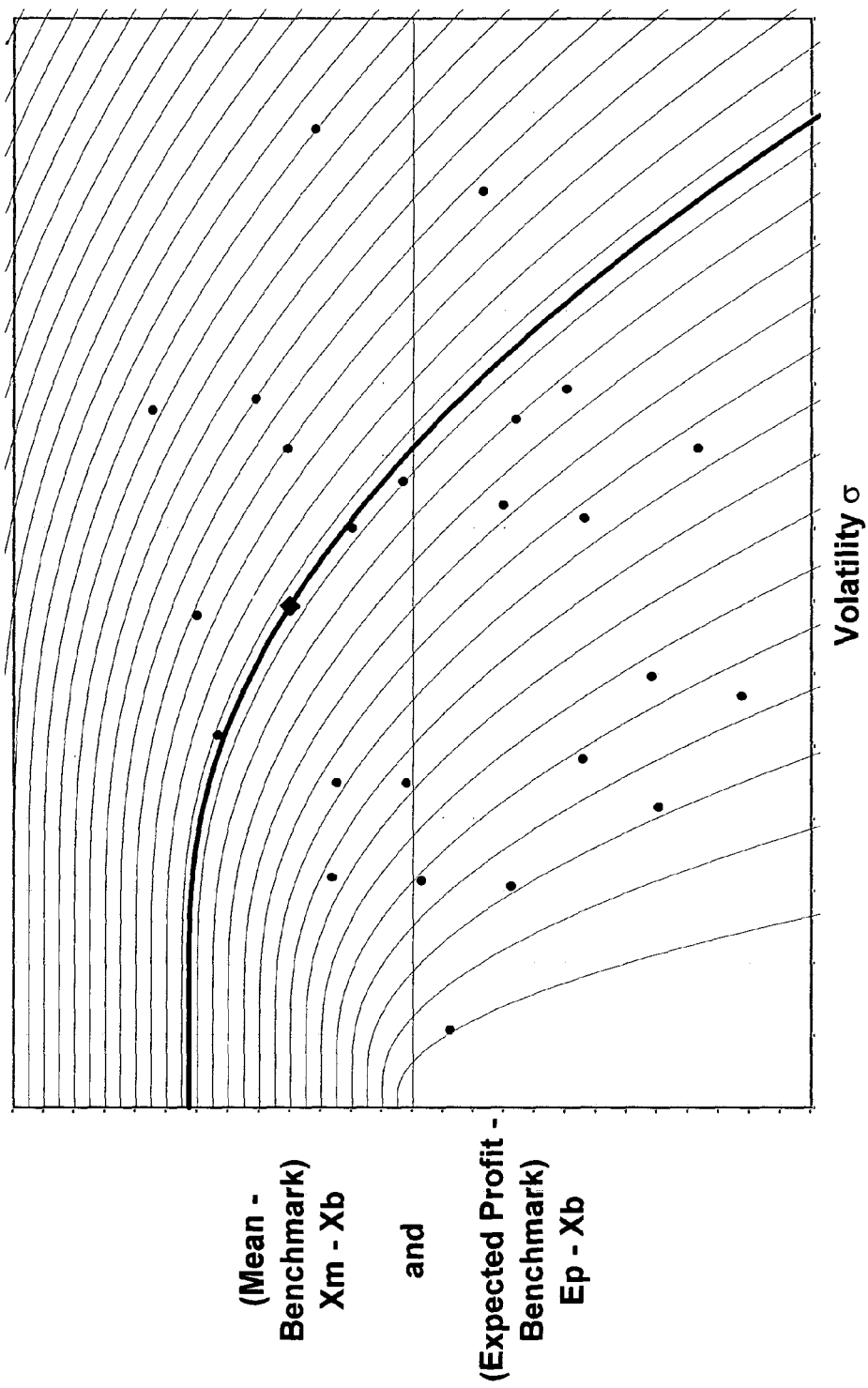
FIG. 6 is an illustration of the family of isometric expected profit $(E_P-x_b)$ assuming normal probability density.

FIG. 6 provides an example for the topography of expected profit ($E_P$–$x_b$) assuming normal density. The equivalent steps for the insurance against a loss $I'_s$ are from expression (46) and ($C_{IS}$<0)

$$b = \frac{C_{IS}}{M_s \cdot \alpha} \qquad (59a)$$

or $$\sigma_x = \frac{C_{IS}}{\left(\frac{M_s \cdot \alpha}{\sigma_z}\right)} \qquad (59b)$$

and $$x_m - x_b = (H_r + Z_m) \cdot b = (H_r + Z_m) \cdot \left(\frac{C_{IS}}{M_s \cdot \alpha}\right) \qquad (60)$$

Figure 7:
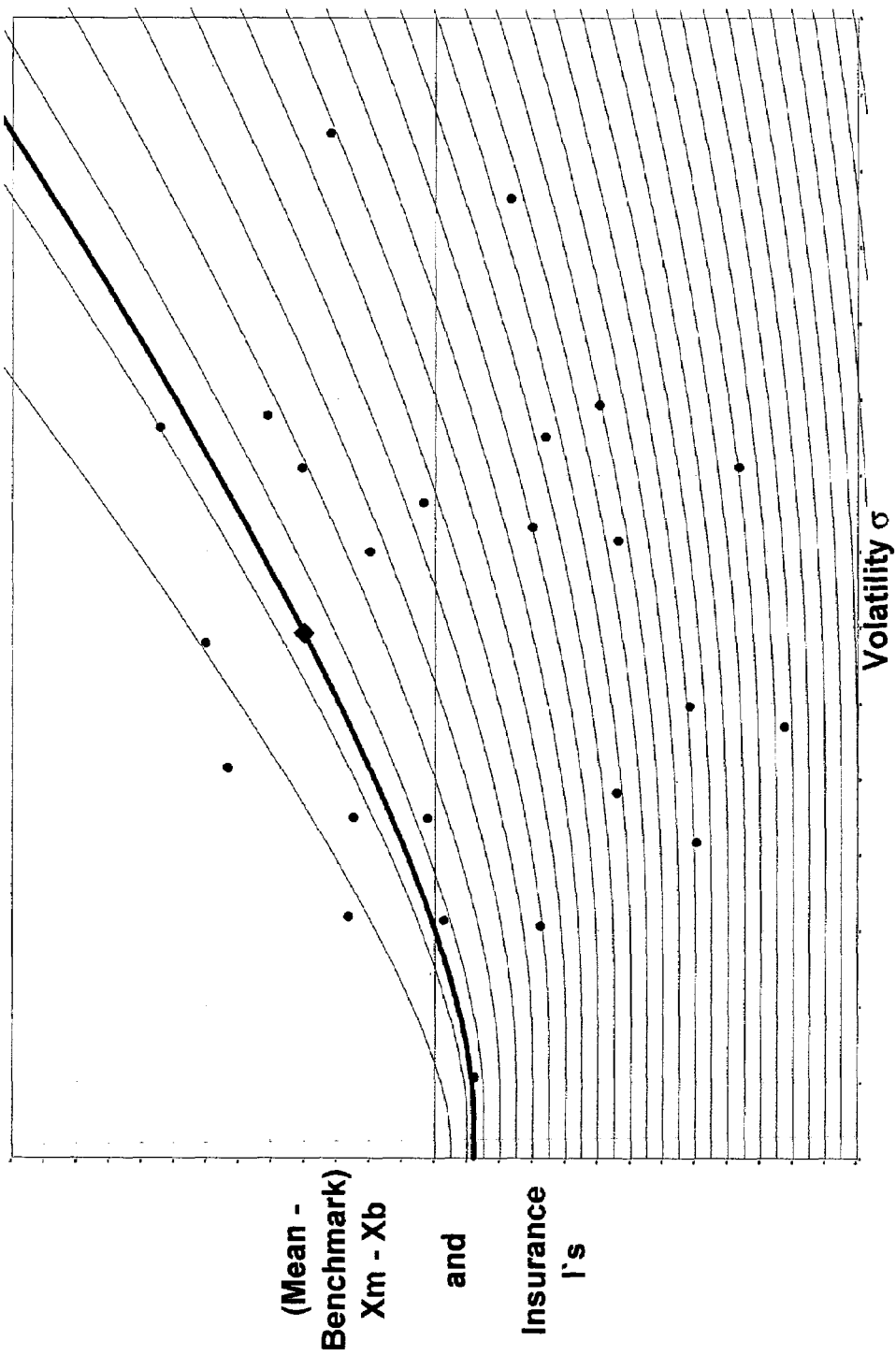
FIG. 7 is an illustration of the family of isometric shortfall insurance I'$_S$ assuming normal probability density.

FIG. 7 exemplifies topography for shortfall insurance $I'_s$ assuming normal density. Continuing for the insurance against a profit $I'_P$ and expression (47) for ($C_{IP}$>0)

$$b = \frac{C_{IP}}{M_P \cdot \gamma} \qquad (61a)$$

or $$\sigma_x = \frac{C_{IP}}{\left(\frac{M_P \cdot \gamma}{\sigma_z}\right)} \qquad (61b)$$

and $$x_m - x_b = (H_r + Z_m) \cdot b = (H_r + Z_m) \cdot \left(\frac{C_{IP}}{M_P \cdot \gamma}\right) \quad (62)$$

The topography for type 4 efficiency $E_4$ can be derived by yet another but similar scheme. A type 4 efficiency spectrum presents efficiency curves or contour lines in the framework $(x_m-x_b)$ versus the volatility b or $\sigma_x$ along which the efficiency $E_4$ is constant. Denoting $(C_{E4} \geq 0)$ as this constant, we restrict this measure to non-negative $(x_m-x_b)$ values in order to avoid discussing negative efficiency, i.e. inefficiency. We then have from expression (51)

$$E_4 = \frac{(x_m - x_b)}{\alpha} = C_{E4} \quad (63)$$

Solutions to expression (63) are obtained by sweeping the reference framework established for an appropriate family of probability densities with base lines of constant ratio $H_r$. Recalling expression (40), solved by an adequate computer based numerical algorithm, the $H_r$ component of the slope of a given line fixes the probability of loss $\alpha$. The first coordinate of a solution then follows directly from expression (63) as $$x_m - x_b = C_{E4} \cdot \alpha \quad (64)$$

whereas the second coordinate is based on the latter as well as the definition of $(x_m - x_b)$ given in expression (52), $$b = \frac{C_{E4} \cdot \alpha}{H_r + Z_m} \quad (65a)$$

or in expression (53) as $$\sigma_x = \frac{C_{E4} \cdot \alpha}{\left(\frac{H_r + Z_m}{\sigma_z}\right)} \quad (65b)$$

All investments simultaneously satisfying expressions (64) and (65) generate a type $E_4$ efficiency curve of efficiency $C_{E4}$. The efficiency spectrum gives all such families for various values of efficiency $C_{E4}$ of interest, as exemplified in FIG. 8 (solid curves).

Table 20 provides an example of the steps carried out to obtain the topographical mapping of expected shortfall $(E_S-x_b)$, expected profit $(E_P-x_b)$, insurance against a shortfall $I'_s$, insurance against a profit $I'_P$ or efficiency E4. This flow chart is obviously not exclusive of all others possible. Table 20A deals with general topography for a stochastic investment class whereas Table 20B deals with the specific topography for an investment instrument.

TABLE 20A

Topographical mapping of expected shortfall $(E_s - x_b)$, expected profit $(E_P - x_b)$, insurance against a shortfall $I'_s$, insurance against a profit $I'_P$ and efficiency $E_4$, general topography for a stochastic investment class 1. Establish a constant value C of interest, to be highlighted for this property and assigned to a contour line.
2. For each value of $H_r$ in Table 18, or a subset of values, use other corresponding values derived in Table 18 and solve for a point along this contour line based on the coordinate values provided by the set of expressions:
   a. (55) and (56), for expected shortfall.
   b. (57) and (58), for expected profit.
   c. (59) and (60), for shortfall insurance.
   d. (61) and (62), for profit insurance.
   e. (64) and (65), for $E_4$ efficiency.
3. Plot a line or a curve through all these points to establish the final contour line of value C.
4. Repeat steps A.1 to A.3 for other C values of interest in order to arrive at the complete topographical map.

TABLE 20B

Topographical mapping of expected shortfall $(E_s - x_b)$, expected profit $(E_P - x_b)$, insurance against a shortfall $I'_s$, insurance against a profit $I'_P$ and efficiency $E_4$, specific topography for an investment instrument:

1. Isolate from Table 18 the value of $H_r$ applicable to this investment, as well as other corresponding tabulated values.
2. Determine the value of the property of interest, in effect, the value of the constant C to be assigned to the contour line, based on expression:
   a. (42), for expected shortfall.
   b. (44), for expected profit.
   c. (46), for shortfall insurance.
   d. (47), for profit insurance.
   e. (63), for $E_4$ efficiency.
3. Repeat steps A.1 to A.3 from Table 20A above for this C value.

The Topographical Mapping of Insurance in Relation to Options

An important observation is that the topographical maps for the insurance against a loss $I'_s$ and the insurance against a profit $I'_P$ correspond, in principle, to the complete set of solutions for the option valuation formula of F. Black and M. Scholes (see "The Pricing of Options and Corporate Liabilities", Journal of Political Economy, Vol. 81, No. 3, May/June 1973, pp. 637-654) for put and call options. The correspondence is exact if (1) the probability density is taken as the Log-Normal probability density, (2) the options are not exercised until their expiry date at time t (the so called European options), (3) the insurance is taken in the Black and Scholes theory as the ratio of the current value of the option to the current value of the portfolio, (4) the exercise price of the option at time t corresponds to a mean return $x_m$ in our notation assuming a continuously compounded rate of return in the Black and Scholes theory (see, for example, "Option Pricing Theory", E. J. Elton and M. J. Gruber, Chapter 22 in Modern Portfolio Theory and Investment Analysis, Fifth Edition, John Wiley & Sons, 715 pp. 1995), and (5) the cost for multiple period options are adjusted to an average insurance rate over unit periods. The technique of topographically mapping insurance then corresponds to a powerful and general technique for extending complete sets of solutions for option valuation to other families of probability densities.

Other Observations

Important characteristics of the isometric contour lines for Expected Shortfall, Expected Profit, insurance against a shortfall and insurance against a profit are that they join the ordinate of the reference framework at the fixed value $C_S$, $C_P$, $C_{IS}$ or $C_{IP}$ for which they have been derived.

It is important to note the general evolution of the Expected Shortfall contour lines with volatility, for these trajectories touch on the essence of risk. For low volatility levels, the curves follow a more horizontal trajectory providing similar expected shortfall with volatility. As volatility levels increase, the curves deviate more or less sharply upwards, sweeping into positive $(x_m-x_b)$ territory. Investors' fears are now seemingly justified as expected shortfalls are shown to always loom irregardless of positive investment performance. The greater the levels of volatility taken on to provide a same return level, the greater the expected shortfall. The topographical mapping of expected shortfall rationalizes these fears (see FIG. 5).

The evolution of the insurance against a shortfall contour lines are similar to those for Expected Shortfall only with generally reduced curvature (see FIG. 7).

For the evolution of the Expected Profit contour lines with volatility: as volatility levels increase, the standard Expected Profit curves deviate more or less sharply downwards, sweeping into negative $(x_m-x_b)$ territory. Expected Profits are thus associated even with the worst performing investments which can be dangerously misleading (see FIG. 6).

The evolution of the insurance against a profit contour lines are similar to those for Expected Profit only with generally reduced curvature.

If the family or class of probability densities applicable to the investments and the reference framework is symmetrical about its mean, the following relationship between $M_S$ of expression (43) and $M_P$ of expression (45) will generally hold $$M_P(H_r) = -M_S(-H_r) \tag{66}$$

The contour lines for the Expected Profit will then form mirror images with those quantifying Expected Shortfall, as will those for the insurance against a profit and those for the insurance against a loss.

Figure 9:
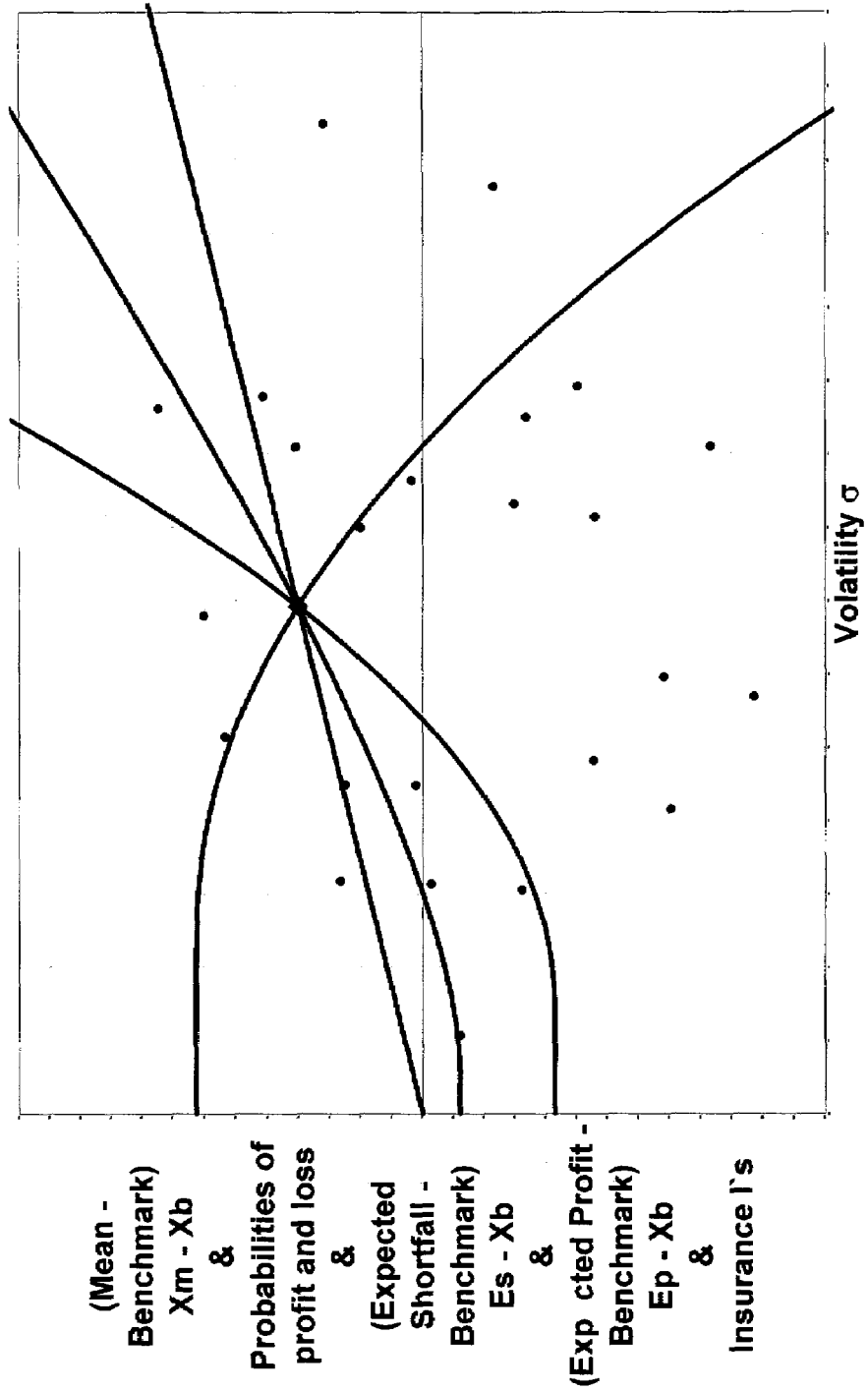
FIG. 9 is an illustration of the isometrics in the probability of loss, the probability of profit, the efficiencies $E_1$, $E_2$ and $E_3$, the expected shortfall, the expected profit and the expected shortfall insurance.

Finally, in order to enhance investment decision making for any portfolio data point, a great increase in information content can be brought about by simultaneously highlighting all, or a selective few, of the isometric contour lines that pass through it, relative to the various properties just discussed of $\alpha$, $\gamma$, $M_S$, $M_P$, $(E_s-x_b)$, $(E_P-x_b)$, $I'_s$, $I'_P$, $E_1$, $E_2$, $E_3$ and $E_4$. FIG. 9 provides an example.

The Topographical Mapping of Orthogonal Trajectories

Consider a portfolio data point plotted in the reference framework of $(x_m-x_b)$ along the ordinate with the scale parameter b along the abscissa. Alternately, as expression (38) or (53) suggests, the standard deviation $\sigma_x$, if it exists, can be set along the abscissa. A contour line passes through the portfolio data point thereby establishing a constant value in a given property P of interest, as previously discussed. As we move away from this data point, we establish a variation in the value of the said property P unless we travel along the contour line. Moving to one side of the contour line, the variation will be positive, and to the other side, negative. Infinity of paths are possible. The path that maximizes the variation in the given property P is unique and corresponds to the orthogonal trajectory through that data point. The orthogonal trajectory, which is necessarily perpendicular to the contour line at the data point, in effect maximizes locally the gradient in whatever property P is topographically mapped out. We set out to establish these orthogonal trajectories in order to complement any previously discussed topographical map as they provide an extremely powerful, simple and visual means of optimally increasing or decreasing the value of the property P for any portfolio characterized by current levels of risk premium $(x_m-x_b)$ and volatility b: the prescribed trajectory is one that is parallel to the orthogonal trajectories drawn.

Consider a set of contour lines for property P that have been drawn in the reference framework. We denote by P:C the specific contour line for which the property P takes on a constant value C. The slope of this contour line may or may not vary as we travel along it, depending on the property P. We denote this slope as $[d(x_m-x_b)/db]_{P:C}$. Orthogonal trajectories to this contour line also cross it as we travel along it, and take on slope values denoted $[d(x_m-x_b)/db]_{OT:P:C}$.

The mathematical condition to satisfy at intersections between contour lines and orthogonal trajectories is $$\left(\frac{d(x_m-x_b)}{db}\right)_{P:C} \cdot \left(\frac{d(x_m-x_b)}{db}\right)_{OT:P:C} = -1 \tag{67}$$

The slopes of the orthogonal trajectories are then $$\left(\frac{d(x_m-x_b)}{db}\right)_{OT:P:C} = \frac{-1}{\left(\frac{d(x_m-x_b)}{db}\right)_{P:C}} \tag{68}$$

By first obtaining slope values $[d(x_m-x_b)/db]_{P:C}$ for any contour line of value C for property P, expression (68) provides the differential equation to solve to establish the complete path of any orthogonal trajectory as we travel across any and all sets of contour lines.

In the case of the properties of the probability of loss $\alpha$, the probability of profit $\gamma$, and the efficiencies $E_1$, $E_2$ and $E_3$, for which the network of contour lines correspond to a network of straight lines of constant slope passing through the origin in the reference framework, solutions to expression (68) for the orthogonal trajectories consist in a network of circular arcs concentric about the origin.

Table 21 exemplifies a series of steps to arrive at these trajectories. Table 21 shows the steps carried out to obtain the orthogonal trajectories to the topographical mappings of $\alpha$, $\gamma$, $E_1$, $E_2$ and $E_3$.

TABLE 21

Orthogonal trajectories to the topographical mappings
of $\alpha$, $\gamma$, $E_1$, $E_2$ or $E_3$ Trajectories correspond to concentric circular arcs about the origin of the reference framework. To simplify notation, denote y as the ordinate, and x, as the abscissa.
Establish spacing S of the orthogonal trajectories possibly in terms of units along the ordinate axis of the reference framework.
Establish maximum range R to cover in the reference framework based possibly on $x_{max}$, the maximum x coordinate, and $y_{max}$, the maximum y coordinate.
Establish the number n of orthogonal trajectories.
Establish path and plot the orthogonal trajectories in a proper format.

For the other properties of expected shortfall $(E_s-x_b)$, expected profit $(E_P-x_b)$, insurance against a loss $I'_s$, insurance against a profit $I'_P$, and efficiency $E_4$, for which the contour lines present curvature in the reference framework, expression (68) is best solved repeatedly by a well established computer based numerical algorithm. The required input $[d(x_m-x_b)/db]_{P \cdot C}$ to this or any other algorithm is now defined for these various properties.

Based on expression (64) for the $E_4$ efficiency with ($C_{E4}>0$), $$\frac{d(x_m - x_b)}{db} = \frac{d(C_{E4} \cdot \alpha)}{db} = C_{E4} \cdot \frac{d\alpha}{db} \quad (69)$$

The derivative on the right side may now be decomposed into $$\frac{d\alpha}{db} = \frac{d\alpha}{dH_r} \cdot \frac{dH_r}{db} \quad (70)$$

and taking into account the definition of $\alpha$ in expression (40), we have for a component of expression (70)

$$\frac{d\alpha}{dH_r} = \frac{d\left[\int_{-\infty}^{H_r} f(Z) dZ\right]}{dH_r} \quad (71)$$

the solution of which is $$\frac{d\alpha}{dH_r} = -[f_z(-H_r)] \quad (72)$$

where the notation $f_z(-H_r)$ refers to the value of f(Z) at (Z=−$H_r$) (see Table 16 for examples of f(Z)). Based on expression (52), $H_r$ can be written as $$H_r = \frac{(x_m - x_b)}{b} - Z_m \quad (73)$$

and the second component in expression (70) now gives $$\frac{dH_r}{db} = \frac{d((x_m - x_b)/b)}{db} - \frac{dZ_m}{db} = \left[\frac{1}{b} \cdot \frac{d(x_m - x_b)}{db}\right] - \quad (74)$$
$$\frac{(x_m - x_b)}{b^2} = \left[\frac{1}{b} \cdot \frac{d(x_m - x_b)}{db}\right] - \frac{(H_r + Z_m)}{b}$$

with $[dZ_m/db=0]$. Inserting expressions (72) and (74) into expression (70) and thereafter into expression (69) and rearranging, we finally obtain for the slope of the $E_4$ efficiency contour lines $$\frac{d(x_m - x_b)}{db} = \frac{C_{E4} \cdot f_z(-H_r) \cdot (H_r + Z_m)}{b + [C_{E4} \cdot f_z(-H_r)]} \quad (75)$$

Expression (75) can be generalized somewhat by substituting for the quantity $C_{E4}$ previously isolated from expression (65a):

$$\frac{d(x_m - x_b)}{db} = \frac{f_z(-H_r) \cdot (H_r + Z_m)^2}{\alpha + [f_z(-H_r) \cdot (H_r + Z_m)]} \quad (76)$$

Expression (76) provides the slope of the $E_4$ efficiency contour line passing through a data point characterized by $(x_m-x_b)$, b and hence $H_r$ without first knowing the value $C_{E4}$ of the efficiency $E_4$ at that point. As the probability of loss $\alpha$ is solely a function of $H_r$ for a given probability density, the same is true of expression (76). We thus come to an important conclusion: all type $E_4$ efficiency contour lines crossing a straight line of constant slope component $H_r$ that passes through the origin of the reference framework cross it at a same angle $\theta$.

Figure 8:
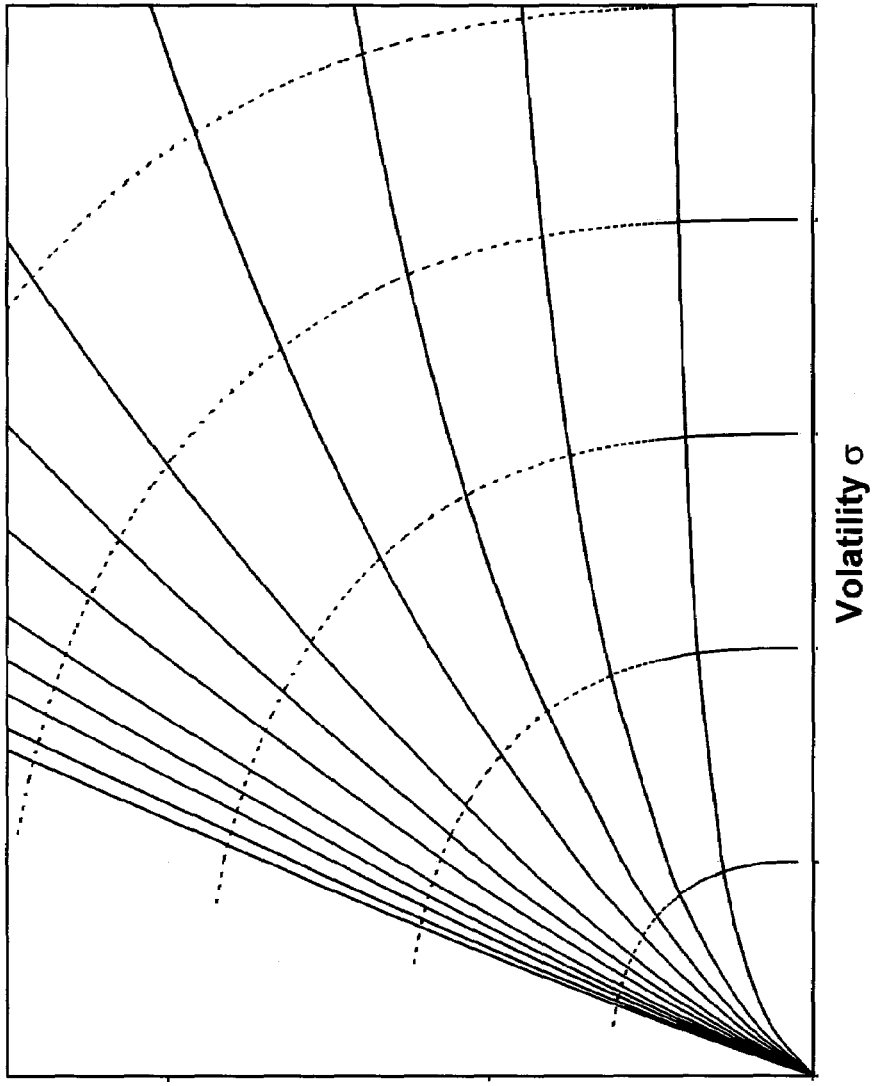
FIG. 8 is an illustration of the type $E_4$ efficiency spectrum assuming normal probability density and including the orthogonal trajectories (dashed curves)

The dashed lines of FIG. 8 constitute an example of a computer generated solution of expression (68) in order to arrive at orthogonal trajectories for type $E_4$ efficiency based on the input of expression (76) and the fourth order Runge-Kutta method with adaptive step control which limits errors to sixth order functions of the step size (see "Numerical Recipes: The Art of Scientific Computing", W.H. Press, B. P. Flannery, S. A. Teukolsky and W. T. Vetterling, Cambridge University Press, 818 pp.1986).

Considering now the expected shortfall ($E_s-x_b$), we can write from expression (56a) for the slope of the contour lines of constant value ($C_s<0$)

$$\frac{d(x_m - x_b)}{db} = \quad (77a)$$

$$\frac{d\left[(H_r + Z_m) \cdot \left(\frac{C_s}{M_s}\right)\right]}{db} = C_s \left[\frac{1}{M_s} \frac{dH_r}{db} - \left(\frac{H_r + Z_m}{M_s^2}\right) \frac{dM_s}{db}\right]$$

$$\frac{d(x_m - x_b)}{db} = C_s \left[\frac{1}{M_s} \frac{dH_r}{db} - \left(\frac{H_r + Z_m}{M_s^2}\right)\left(\frac{dM_s}{dH_r} \frac{dH_r}{db}\right)\right] = \quad (77b)$$
$$\frac{C_s}{M_s} \frac{dH_r}{db} \left[1 - \left(\frac{H_r + Z_m}{M_s}\right)\left(\frac{dM_s}{dH_r}\right)\right]$$

From expression (43), the far right component of expression (77b) is $$\frac{dM_s}{dH_r} = \frac{d\left(H_r + \frac{1}{\alpha} \int_{-\infty}^{-H_r} Z \cdot f(z) dz\right)}{dH_r} = \quad (78a)$$

$$1 + \frac{1}{\alpha} \frac{d\left(\int_{-\infty}^{-H_r} Z \cdot f(z) dz\right)}{dH_r} - \frac{1}{\alpha^2} \frac{d\alpha}{dH_r}\left(\int_{-\infty}^{-H_r} Z \cdot f(z) dz\right)$$

and, making use of expression (72), $$\frac{dM_s}{dH_r} = 1 + \frac{[H_r \cdot f_z(-H_r)]}{\alpha} + \frac{f_z(-H_r)}{\alpha^2}\left(\int_{-\infty}^{-H_r} Z \cdot f(z) dz\right) \quad (78b)$$

and then again of expression (43), $$\frac{dM_s}{dH_r} = 1 + \frac{[H_r \cdot f_z(-H_r)]}{\alpha} + \frac{(M_s - H_r)}{\alpha} f_z(-H_r) = 1 + \frac{M_s}{\alpha} f_z(-H_r) \quad (78c)$$

Inserting expressions (74) and (78c) into (77b) and rearranging, we obtain for the slopes of the expected shortfall $(E_s-x_b)$ contour lines $$\frac{d(x_m - x_b)}{db} = (H_r + Z_m)\left(\frac{J}{J-1}\right) \quad (79)$$

with $$J = 1 - \frac{(H_r + Z_m)}{M_s} - \frac{(H_r + Z_m)f_z(-H_r)}{\alpha} \quad (80)$$

Considering now the insurance against a shortfall $I'_s$, we can write from expression (60) for the slope of the contour lines of constant value $(C_{IS}<0)$ $$\frac{d(x_m - x_b)}{db} = \frac{d\left[(H_{r+}Z_m)\cdot\left(\frac{C_{IS}}{M_s\alpha}\right)\right]}{db} = \frac{1}{\alpha}\frac{d\left[(H_{r+}Z_m)\cdot\left(\frac{C_{IS}}{M_s\alpha}\right)\right]}{db} - \frac{(H_{r+}Z_m)}{\alpha^2}\cdot\left(\frac{C_{IS}}{M_s}\right)\frac{d\alpha}{db} \quad (81)$$

The first derivative on the right side of expression (81) resembles that in (77a) whereas the last derivative on the right side follows from expressions (70) to (74). Thus, similar but lengthier calculations finally lead to $$\frac{d(x_m - x_b)}{db} = H_r + Z_m - M_s \quad (82)$$

Considering now the expected profit $(E_P-x_b)$, we can write from expression (58) for the slope of the contour lines of constant value $(C_P>0)$ $$\frac{d(x_m - x_b)}{db} = \frac{d\left[(H_{r+}Z_m)\cdot\left(\frac{C_P}{M_P}\right)\right]}{db} \quad (83)$$

the solution of which mirrors that for expression (77a). Thus $$\frac{d(x_m - x_b)}{db} = (H_r + Z_m)\left(\frac{K}{K-1}\right) \quad (84)$$

with $$K = 1 - \frac{(H_r + Z_m)}{M_P} + \frac{(H_r + Z_m)f_z(-H_r)}{\gamma} \quad (85)$$

Considering now the insurance against a profit $I'_P$, we can write from expression (62) for the slope of the contour lines of constant value $(C_{IP}>0)$ $$\frac{d(x_m - x_b)}{db} = \frac{d\left[(H_{r+}Z_m)\cdot\left(\frac{C_{IP}}{M_P\gamma}\right)\right]}{db} \quad (86)$$

and in a similar fashion for the contour lines of the insurance against a shortfall $$\frac{d(x_m - x_b)}{db} = H_r + Z_m - M_P \quad (87)$$

Inspection of the expressions for the slope values of the contour lines for expected shortfall, expected profit, insurance against a shortfall and insurance against a profit indicate they are all independent of the constants corresponding to the contour lines. In fact, the slope values of expressions (79), (82), (84) and (87) are only functions of $H_r$. We thus reiterate the important conclusion established for type $E_4$ efficiency contour lines: all contour lines for $(E_s-x_b)$, $(E_P-x_b)$, $I'_s$ or $I'_P$ cross, at the same angle θ, a straight line passing through the origin of the reference framework and having a constant slope component $H_r$.

Table 22 provides an example of the steps dedicated to obtaining these trajectories. Other flow charts can obviously be devised. Table 22 shows how to obtain orthogonal trajectories to the topographical mappings of expected shortfall $(E_s-x_b)$, expected profit $(E_P-x_b)$, insurance against a shortfall $I'_s$, insurance against a profit $I'_P$ and efficiency $E_4$.

TABLE 22

Orthogonal trajectories to the topographical mappings of expected shortfall ($E_s - x_b$), expected profit ($E_P - x_b$), insurance against a shortfall $I'_s$, insurance against a profit $I'_P$ or efficiency $E_4$.

1. Choose a numerical algorithm for solving a differential equation.
2. Define a location in the reference framework to start an orthogonal trajectory.
Choose the location corresponding to a data point to draw out the orthogonal trajectory passing through it, if need be.
3. Depending on the property mapped out along contour lines, establish the corresponding differential equation to solve for the orthogonal trajectories by inserting into expression (68):
a. Expression (76), for E4 efficiency.
b. Expression (79), for expected shortfall.
c. Expression (82), for shortfall insurance.
d. Expression (84), for expected profit.
e. Expression (87), for profit insurance.
4. Based on the coordinates of the start location, typically solve this differential equation for a sufficiently small step taken along the abscissa.
The solution provides the corresponding step along the ordinate.
5. Establish the full coordinates of this new point on the orthogonal trajectory which also constitutes a new start location.
6. Repeat steps 4 to 5 until the orthogonal trajectory is sufficiently defined, and draw a curve in a proper format through all the points just solved for.

TABLE 22-continued

Orthogonal trajectories to the topographical mappings of expected shortfall ($E_s - x_b$), expected profit ($E_P - x_b$), insurance against a shortfall $I'_s$, insurance against a profit $I'_P$ or efficiency $E_4$.

7. Repeat steps 2 to 7 for other orthogonal trajectories sufficiently spaced until the reference framework is sufficiently covered.

Discussion of the Log-Normal Probability Density

A common assumption in finance is that over a unit time period the log-returns or continuously compounded returns r follow a Normal distribution of mean μ and standard deviation σ. By definition, r corresponds to the natural logarithm of the gross return (1+R)

$$r = \ln(1+R) \tag{88}$$

The gross returns (1+R) then follow a Log-Normal distribution of mean $\mu_{LN}$ and standard deviation $\sigma_{LN}$ given by (see Table 16)

$$\mu_{LN} = \exp\left(\mu + \frac{\sigma^2}{2}\right) \tag{89}$$

$$\sigma_{LN} = \sqrt{\exp(2\mu+\sigma^2)\cdot(\exp(\sigma^2)-1)} \tag{90}$$

with the Log-Normal probability density for the gross returns [(1+R)>0] provided by $$f(1+R) = \frac{1}{\sigma\sqrt{2\pi}} \frac{\exp\left[-\frac{(\ln(1+R)-\mu)^2}{2\sigma^2}\right]}{(1+R)} \tag{91}$$

The mappings for the Normal probability density then apply to the Log-Normal if log-returns r are considered along the ordinate of the topographical map, and specifically for investments qualified by a mean log-return $r_m$ and volatility a relative to a benchmark log-return $r_b$. From expression (88), we can always establish simple associations of the form $$r_m = \ln(1+R_m) \tag{92}$$

$$r_b = \ln(1+R_b) \tag{93}$$

where $R_m$ denotes the mean return and $R_b$, the benchmark return, such that $$r_m - r_b = \ln\left(\frac{1+R_m}{1+R_b}\right) \tag{94}$$

We then have, for example, from expressions (42), (44) and (52)

$$r_m - r_b = \ln\left(\frac{1+R_m}{1+R_b}\right) = (H_r + Z_m)\cdot b = S_r \cdot \sigma \tag{95}$$

$$e_s - r_b = \ln\left(\frac{1+E_s}{1+R_b}\right) = M_s \cdot b = M_s \cdot \sigma \tag{96}$$

$$e_P - r_b = \ln\left(\frac{1+E_P}{1+R_b}\right) = M_P \cdot b = M_P \cdot \sigma \tag{97}$$

The above can then direct mapping of the log-returns as for the Normal probability density. We can also map out components of the gross returns. For example, to map out the quantity ($E_s - R_b$) in the framework of ($R_m - R_b$) versus σ, it must first be isolated from expression (96) and then set equal to a constant C qualifying a given contour line $$E_S - R_b = (1+R_b)(e^{M_s\cdot\sigma} - 1) = C \tag{98}$$

from which the first coordinate for the mapping is given by $$\sigma = -\frac{\ln\left(\frac{C}{1+R_b}+1\right)}{M_s} \tag{99}$$

and the second from a transformation of expression (95) into $$R_m - R_b = (1+R_b)(e^{S_r\cdot\sigma} - 1) \tag{100}$$

Hence various mappings are obtainable depending on the framework chosen.

Fallback Mapping Technique

A fallback mapping technique, feasible here especially for empirical distributions, is one commonly used for the topographical mapping of geographical terrain for which no intrinsic relationships exist or are sought out. In such cases, data points corresponding to terrain elevation are set on a grid of latitude versus longitude and isometric contour lines established based on polynomial or other interpolation amongst the elevation data. Refinement of the input data grid will generally control the precision of the generated topography. This prior art technique can be applied here by regularly generating, at the locations in the reference framework corresponding to investments, third dimensional data points for whatever property is of interest. The previous methods based on the intrinsic relationships for the properties are preferred however, when possible, as they void the additional computer based step of interpolation thereby enhancing numerical efficiency and precision. Further, the generation of orthogonal trajectories may be hindered by discarding these intrinsic relationships. However, this fallback mapping technique will lead to independent topographical maps of the structural properties mapped out that may thereafter be compared to the topographical maps generated by the semi-analytical approach valid for a given or known stochastic investment family or class as in Table 16. This fallback mapping technique may then be seen as a useful "finger printing" approach to assigning or confirming the assignment of a stochastic class to the investments.

Extension to Multiple or Fractional Time Periods

Investment returns are not without units as they are always defined relative to a specific time or investment horizon, i.e. day, week, month, year, etc. Perceptions of risk, and the preoccupation with the uncertainty of investment return, naturally vary with investment horizon. A common workable assumption is that the data behaves similarly regardless of time stamping or the frequency of data collection: the underlying probability densities are identically distributed over these horizons. These densities are also termed stable, self-similar or self-affine. If such is the case, time scale factors exist mapping one density into the other. The family of all possible stable laws coincides, for continuous variables, with the Lévy probability densities definable in terms of an exponent μ, which include the Normal (Gaussian) as a special case (μ=2) (see "Basic Notions in Probability", J.-P. Bouchaud and M. Potters, Chapter 1 in Theory of Financial Risks: From Statistical Physics to Risk Management, Cambridge University Press, October, 2000, 232 pp.).

A first time scale factor $S_{C1}$ deals with the translation of reference values assignable to the random variable behaving under the unit time period probability density in order to obtain equivalent values for the multiple T periods probability density. Consider the mean $x_m$ and benchmark $x_b$ as reference values. For the translation of reference values, $$S_{C1}=T \tag{101}$$

For example, in passing from month to year, ($S_{C1}$=12), and mean yearly returns correspond to 12 times mean monthly returns.

A second time scale factor $S_{C2}$ determines the expansion or contraction and scaling of volatility about the mean in passing from the unit period to the multiple T. It takes on a value of $$S_{C2} = T^{\frac{1}{\mu}} \tag{102}$$

where μ corresponds to the exponent of the Lévy distribution. The case (μ=1) is special and involves extra logarithmic factors not shown in expression (102) (see "Basic Notions in Probability", J.-P. Bouchaud and M. Potters, Chapter 1 in Theory of Financial Risks: From Statistical Physics to Risk Management, Cambridge University Press, October, 2000, 232 pp.). For the Normal probability density, we then have ($S_{C2}=\sqrt{T}$).

Figure 10:
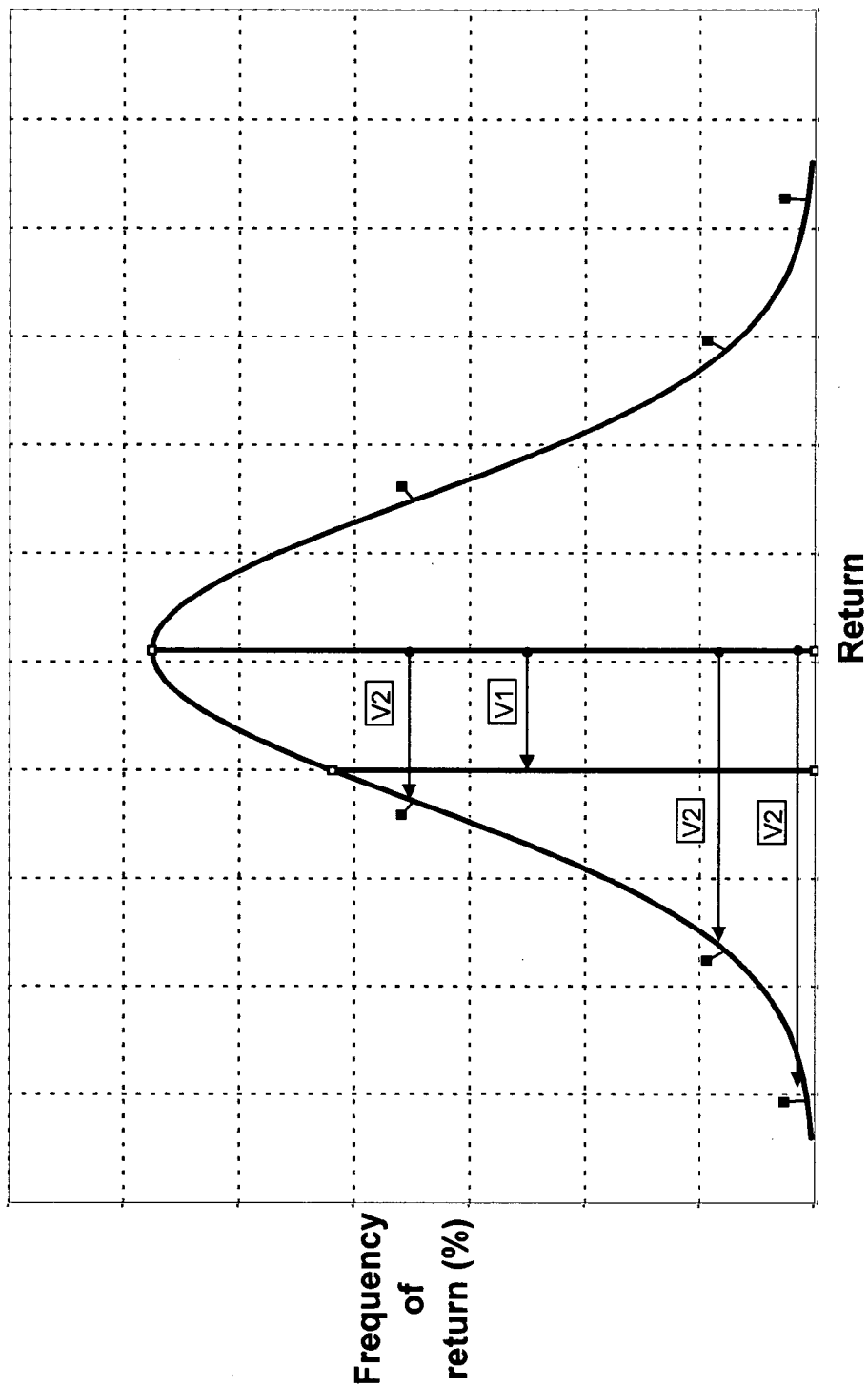
FIG. 10 is an illustration of the impact of resealing for multiple time periods.

The consequences are further illustrated in FIG. 10 for the Normal probability density. A mean return $R_m$ is highlighted at the center of the density. On the downside, a benchmark $R_b$ delimiting the profit and loss threshold is set off. Also shown on the probability density are pins marking off measures of one, two and three units of volatility σ about the mean. The effects of time rescaling are that $R_b$ distances itself from $R_m$ at a rate of (V1=$S_{C1}$=T) whereas the volatility markers in the form of pins only separate from $R_m$ at a rate (V2=$S_{C2}=\sqrt{T}$). The net effect, for the case shown, is a compression of the loss section of the probability density with an increase in the multiple T, accompanied by a reduction in risk and the values of the parameters quantifying frequency and severity of loss relative to the benchmark $R_b$. For a mean return $R_m$ lesser than the benchmark $R_b$, the effects are inversed resulting in an expansion of the loss section with an increase of the multiple T, and an increase in risk and the values of the parameters quantifying frequency and severity of loss relative to the benchmark.

The evolution of risk, safety and efficiency with multiple periods T then depends on the relative play of the scaling factors $S_{C1}$ and $S_{C2}$. If the exponent μ of the applicable identically distributed probability density tends to the value 1, the scaling factors Sci and $S_{C2}$ tend to equality thereby freezing the portrayal of risk, safety and efficiency in time: the investor searching out an investment with positive risk premium ($R_m-R_b$) cannot benefit from a decrease in risk with the investment horizon, nor can the risk of an investment with negative risk premium increase with time.

The topographical mappings previously discussed for the structural properties of identically distributed probability densities can thus be extended to multiple time periods T by proper time resealing of the reference framework. Time resealing of the fundamental expression (52) leads to $$(x_m-x_b) \cdot S_{C1} = (H_r+Z_m) \cdot (b \cdot S_{C2}) \tag{103}$$

which in effect simply directs the translation of all the portfolio data points established in the reference framework under the unit time period to their new coordinate values now valid for the multiple period T. From expression (103), the time rescaled form for $H_r$, to be compared to expression (73), is then $$H_r = \frac{(x_m - x_b)}{b \cdot S_{C3}} - Z_m \tag{104}$$

where $$S_{C3} = \frac{S_{C2}}{S_{C1}} = \frac{T^{\frac{1}{\mu}}}{T} = T^{\frac{1-\mu}{\mu}} \tag{105}$$

This value for $H_r$ can then be used to derive the probability of loss α and profit γ based on expressions (40) and (41), respectively. The values for $M_s$ in expression (43) and $M_P$ in expression (45) are affected similarly. It automatically follows that the efficiencies $E_1$, $E_2$ and $E_3$ of expressions (48) to (50) will be properly rescaled. Time rescaling for efficiency $E_4$ of expression (51) leads to $$E_4 = \frac{(x_m - x_b) \cdot S_{C1}}{\alpha} \tag{106}$$

whereas the time rescaled forms for the expected shortfall and expected profit are from expressions (42) and (44)

$$(E_s-x_b) \cdot S_{C1} = M_s \cdot (b \cdot S_{C2}) \tag{107}$$

$$(E_P-x_b) \cdot S_{C1} = M_P \cdot (b \cdot S_{C2}) \tag{108}$$

Also, the insurance against a shortfall or a profit, based on expressions (46) and (47), turn into $$I'_S=(E_S-x_b) \cdot S_{C1} \cdot \alpha = (M_s \cdot \alpha) \cdot (b \cdot S_{C2}) \tag{109}$$

$$I'_P=(E_P-x_b) \cdot S_{C1} \cdot \gamma = (M_P \cdot \gamma) \cdot (b \cdot S_{C2}) \tag{110}$$

Expressions (106) to (110) are consistent in form to expression (103) such that the topographical maps obtained previously for the unit time period can be applied directly and without change to the multiple periods T if the investment data points undergo a simple translation according to expression (103).

A second method for time resealing is arrived at by proportionally reducing the time rescaled form of expression (103) to the unit time period through $$\frac{(x_m - x_b) \cdot S_{C1}}{T} = \frac{(H_r+Z_m) \cdot (b \cdot S_{C2})}{T} \tag{111}$$

which simplifies to $$(x_m-x_b) = (H_r+Z_m) \cdot (b \cdot S_{C3}) \tag{112}$$

Whereas expression (103) translates the original portfolio data points in the reference framework in both directions parallel to the ordinate and abscissa axis, expression (112) only shifts data points horizontally or parallel to the abscissa axis. The fundamental difference between both methods should be emphasized by means of an example. Consider an investment providing a mean yearly return of 9% and yearly volatility of 15%, and assume that the Normal probability density applies. For this density, ($\mu$=2) and ($S_{C1}$=T), ($S_{C2}$=$\sqrt{T}$), ($S_{C3}$=1/$\sqrt{T}$). Over a ten year period (T=10), expression (103) assumes that the overall mean return transforms to (9%×$S_{C1}$=90%) with overall volatility of (15%×$S_{C2}$=47.4%). On the other hand, expression (112) considers that this 10 year investment behaves in a fashion equivalent to a yearly investment with mean return of 9% and volatility of (15%×$S_{C3}$=4.7%). Both methods are shown to be of interest.

Based on expression (112), expression (104) still holds for evaluating $\alpha$, $\gamma$, $M_s$, $M_P$, E1, E2 and E3 whereas forms consistent with expression (112) can readily be obtained for expressions (106) to (110). The results are similar then in that the topographical maps obtained previously for the unit time period can be applied directly and without change to the multiple periods T if the investment data points undergo a simple horizontal shift or translation according to expression (112).

Hence, the extension of the invention to multiple time periods T consists in the appropriate translation of the investment data points against a constant topographical backdrop established basically for the unit time period in order to quantify multiple period risk, safety and efficiency. The translation is directed either by expression (103) or (112) depending on the choice of method. Inverse operations are obviously equally feasible, based on the same technique, in going from longer to shorter or fractional time periods. Table 23 synthesizes these considerations in the form of a plausible series of steps.

TABLE 23

Time rescaling for multiple or fractional time periods to quantify and qualify risk, safety and efficiency for other time periods.

Input the multiple or fraction T of the base time period to consider for rescaling.
Establish the scaling factors $S_{C1}$, $S_{C2}$ and $S_{C3}$ based on expressions (101), (102) and (105), respectively, for the various stochastic investment classes.
Establish the time rescaling method of interest, either expression (103) or (112).
Establish the new coordinates of all investment data points originally plotted in the reference framework for the unit time period based on this method of interest.
Scatter plot the investment data points based on their new coordinates against a constant topographical backdrop of contour lines and orthogonal trajectories.
Complete the contour lines and orthogonal trajectories drawn out in the reference framework for the unit time period to accommodate the translation of these investment data points, if need be.

Other Components of the Preferred Embodiment of the Invention

Tables 24 to 27 present feasible flowcharts, not exclusive of all others possible, of important components of the preferred embodiment of the invention.

Table 24 highlights the capacity, to satisfy utility, of choosing a structural property to highlight along contour lines, be it in relation to general or specific topography, as defined. Table 24A applies to investment cases of known or given stochastic investment class.

TABLE 24A

Topographical mapping controller if the stochastic investment class is known

Choose structural property to highlight.
Choose to establish general topography for certain stochastic investment classes:
a. For the structural properties of $\alpha$, $\gamma$, $E_1$, $E_2$ or $E_3$: Table 19A.
b. For the structural properties of ($E_s$ – $x_b$), ($E_P$ – $x_b$), $I'_s$, $I'_P$ or $E_4$: Table 20A.
Choose to establish specific topography for certain investment instruments:
a. For the structural properties of $\alpha$, $\gamma$, $E_1$, $E_2$ or $E_3$: Table 19B.
b. For the structural properties of ($E_s$ – $x_b$), ($E_P$ – $x_b$), $I'_s$, $I'_P$ or $E_4$: Table 20B.
Choose combinations thereof.
Apply proper control and formatting for differentiation.

Table 24B applies to empirical distributions.

TABLE 24B

Topographical mapping controller if the stochastic investment class is unknown: empirical data Choose structural property to highlight.
Group the investments into plausibly similar empirical classes.
For these investments, calculate the structural property of interest from the basic definitions and the historical or projected investment data.
Assign these third dimensional values to the locations in the reference framework corresponding to the investment data.
Interpolate between these third dimensional values to obtain the topographical map (prior art).

Table 25 deals with the essentially independent scatter plotting in the reference framework of the basic investment data.

TABLE 25

Scatter plot controller

Choose to scatter plot in the reference framework the position of certain investment instruments in relation to their benchmark.
As a default, scatter plot:
a. No investment instruments, or
b. All investment instruments, or
c. Only investment instruments for which a general topographical mapping of any structural property corresponding to their stochastic investment class is shown, or
d. Only investment instruments for which, similarly, a specific topography is shown, or
e. Investment instruments for which c and d above apply.

Table 26 considers another essentially independent aspect in relation to the topographical mapping of the complementary orthogonal trajectories.

TABLE 26

Orthogonal trajectory controller if the stochastic investment class is known

A structural property may or may not be topographically mapped out in the reference framework. Choose to establish its complementary orthogonal trajectory, or not.
To establish the orthogonal trajectory for:
a. The structural properties of $\alpha$, $\gamma$, $E_1$, $E_2$ or $E_3$: Table 21.
b. The structural properties of ($E_s$ – $x_b$), ($E_P$ – $x_b$), $I'_s$, $I'_P$ or $E_4$: Table 22.

Finally, Table 27 is dedicated to properly and efficiently managing all of the information content in order to enhance investment decision making.

TABLE 27

Investment decision enhancement controller

Prompt for or direct user feedback for enhancing investment decision making by satisfying multiple numerical constraints relative to risk, safety and efficiency based
on the mapping or related topography, and of the form, for example:
a. Ordering.
b. Filtering.
c. Retaining.
d. Graphically illustrating these in the reference framework (for example, delimiting inclusion and exclusion zones that satisfy concurrently the multiple constraints).
Provide quantitative and qualitative results on screen or in printer format, be it directly in the reference framework or in tabulated or text formats, relative to risk, safety and efficiency.
Provide for personalized client reporting capability.

Figure 11:
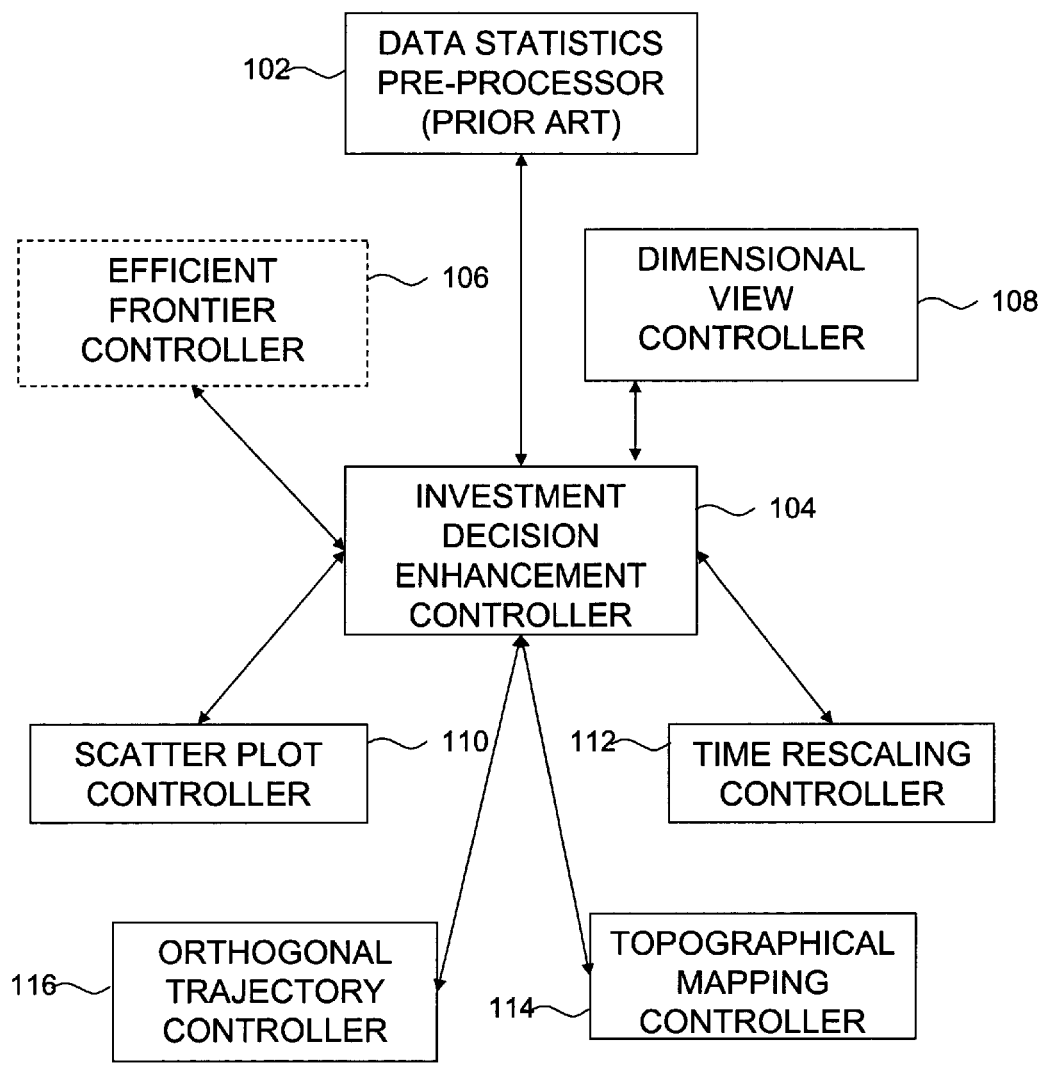
FIG. 11 is a block diagram of the main components of the preferred embodiment.

FIG. 11 illustrates a typical computer configuration. Eight functional units or modules are shown. The configuration is such that the user has essentially access to any module concurrently to any other module. This configuration minimizes restrictions, promotes user feedback and allows for the subjective nature of investment decision making. The modules are thus all connected to the investment decision enhancement controller through feedback loops. The process starts with the data statistics pre-processor 102 which is comprised of an investment data base along with statistical data treatment capabilities that are essentially prior art and state of the art but adequately tuned to the tasks at hand. The investment decision enhancement controller 104 provides the user with a multitude of options, as indicated by the feedback loops, to arrive at his investment decisions, along with tools to properly and efficiently manage all of the information and satisfy multiple numerical constraints, and other tools for personalized reporting capability. The efficient frontier controller 106 is optional but useful for establishing an efficient frontier based on prior art and state of the art calculations. The dimensional view controller 108 allows the user to establish the graphical reference framework, to establish the zoom aspect, and to view plots in 2D or 3D. The scatter plot controller 110 is dedicated to adequately plotting the basic investment data in the reference framework basic to portfolio theory. The time resealing controller 112 allows for properly shifting the basic investment data points in the reference framework, against a constant topographical backdrop established for a base time period, in order to qualify and quantify multiple or fractional time period investment events. The topographical mapping controller 114 deals with establishing the topographical maps for the structural properties of interest of the probability densities or distributions. Finally, the orthogonal trajectory controller 116 is dedicated to establishing the complementary orthogonal trajectories to the topographical maps.

FIG. 12 provide plausible flowcharts for the basic units set out in FIG. 11 with regards to the preferred embodiment of the invention. These flowcharts are not exclusive of all others possible. FIG. 12 is comprised of seven FIGS. 12a to 12g each dealing with a basic unit of FIG. 11.

Figure 12A:
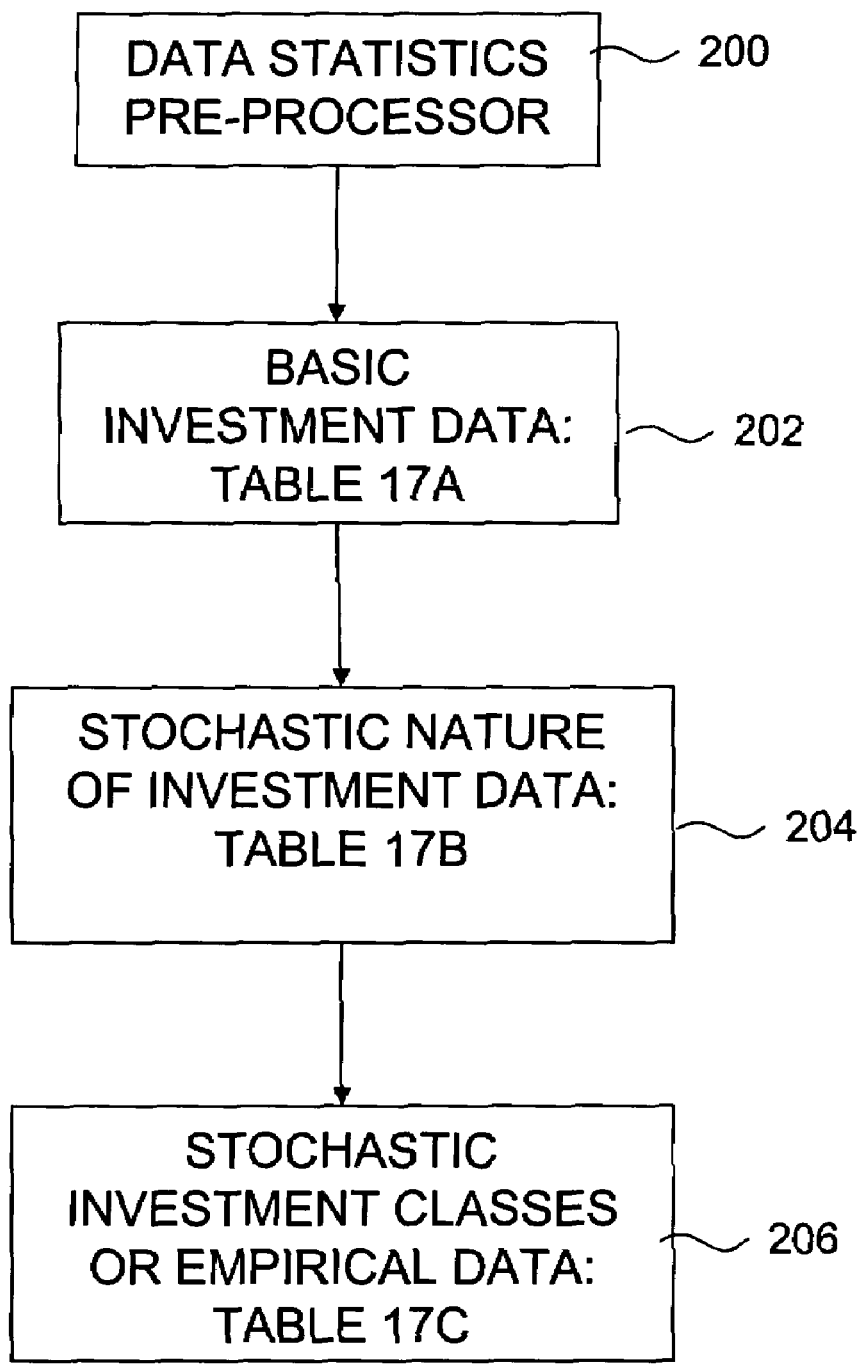
FIG. 12 comprises FIG. 12A to FIG. 12G which collectively form a flow chart of the main steps of the preferred embodiment.

FIG. 12a relates to the data statistics pre-processor 200. The basic investment data 202 is set out in a data base and treated as in Table 17a. The stochastic nature of the investment data 204 should also be defined as in Table 17b. Finally, stochastic investment classes or empirical classes 206 are assigned to the data as in Table 17c.

Figure 12B:
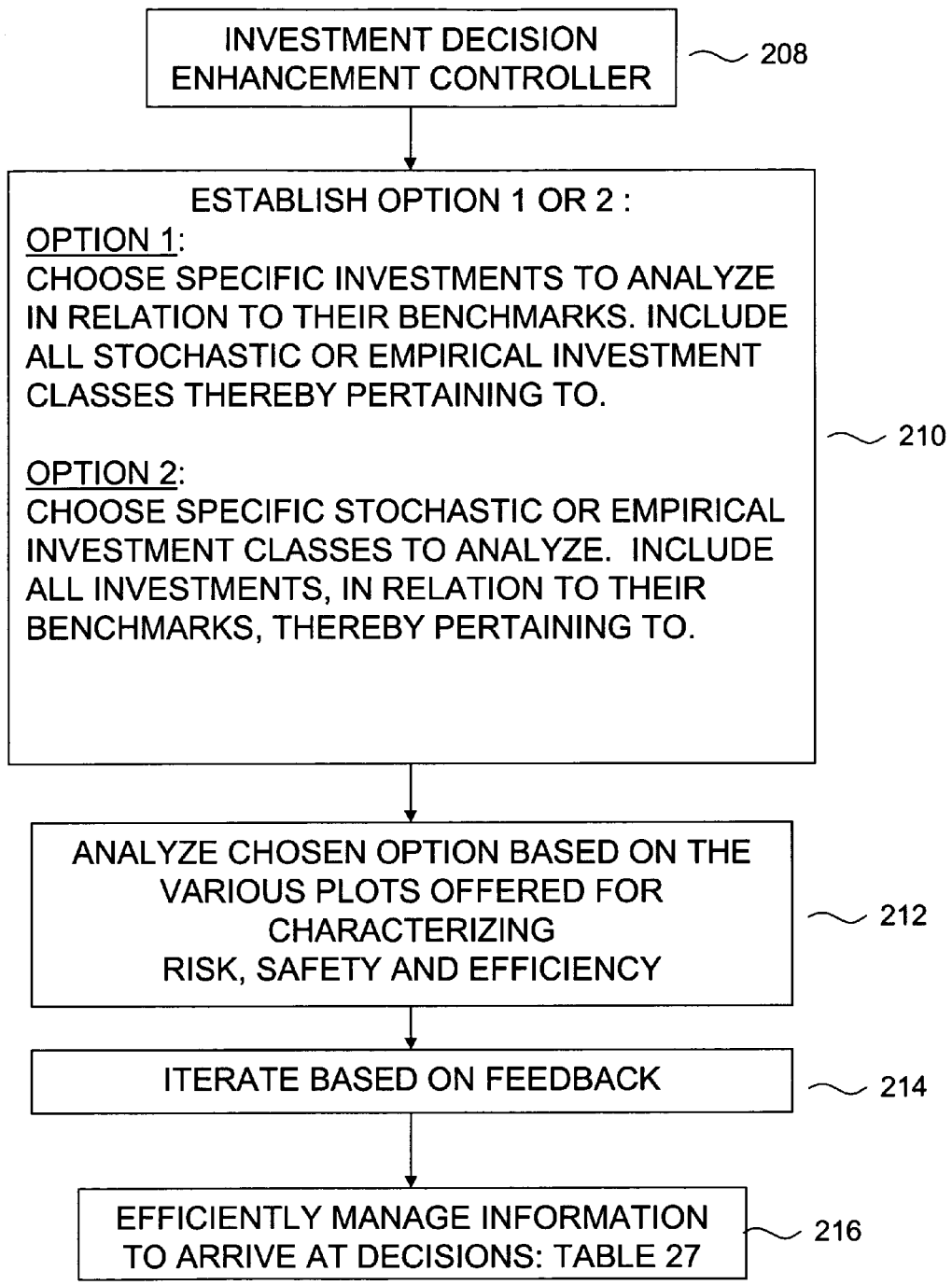

FIG. 12b describes the investment decision enhancement controller 208. Two options are set out 210 to initiate the process, namely concentrating on specific investments or investment classes of interest, as described. The user proceeds with the analysis by viewing and examining the various analytical plots offered with regards to risk, safety or efficiency, as in 212. The subjective nature of investing is reflected in 214 whereby the user iterates amongst these plots to gather information to compare investments and arrive at a decision. If the results are unsatisfactory, the user may decide to restart the whole process with other investment data or, for satisfactory results, converge to a decision. To assist the decision making and efficiently manage the information 216, analytical tools in the form of a processor for multiple numerical constraints to satisfy, possibly delimiting inclusion and exclusion zones on the computer screen in the basic graphical reference framework, are offered along with personalized reporting capability, as in table 27.

Figure 12C:
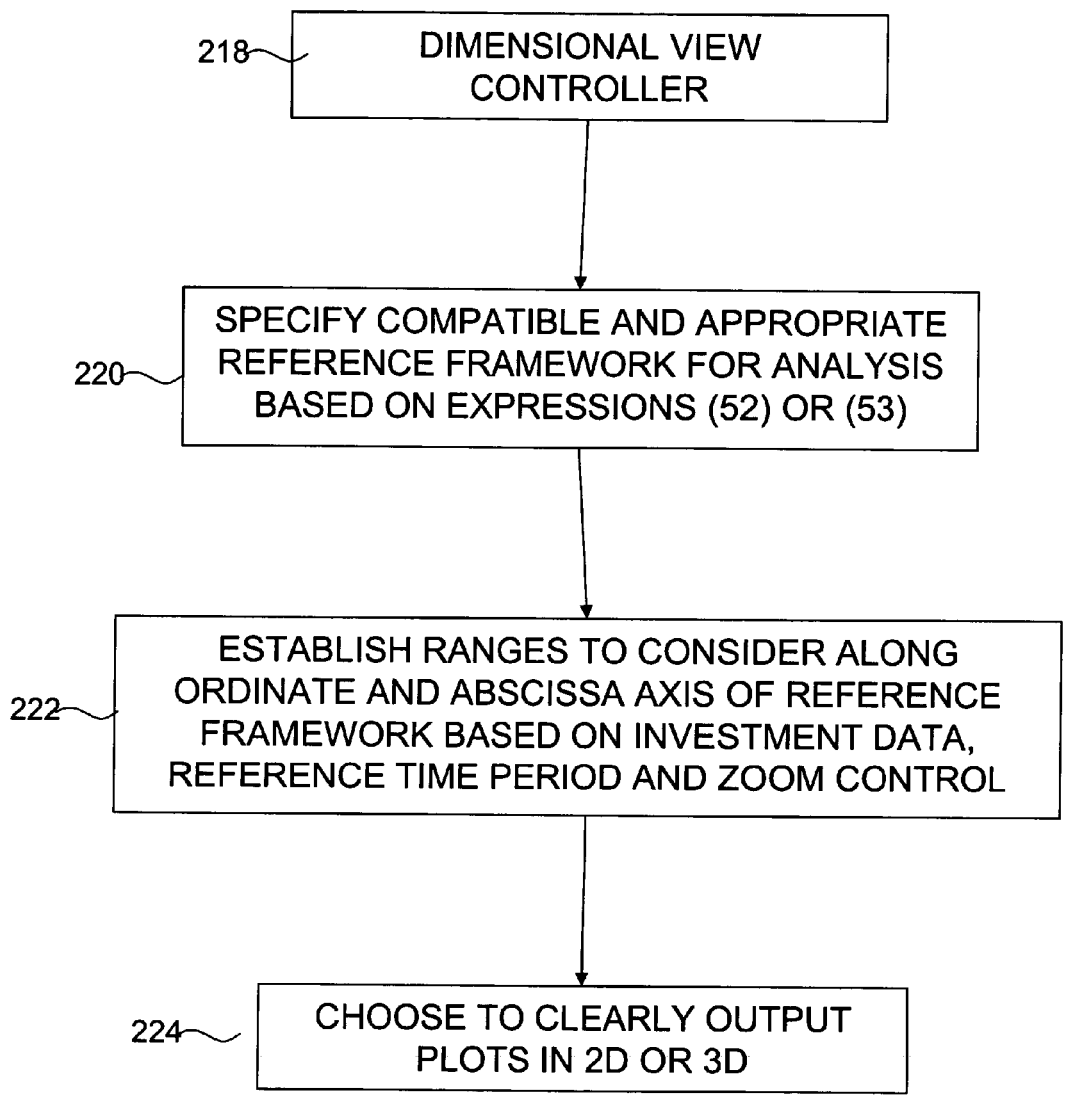

FIG. 12c illustrates aspects of the dimensional view controller 218. The basic reference framework is first confirmed and specified 220. The physical ranges of the reference framework are then established by considering the basic data, the reference time period and the zoom control 222, and plots and topography are highlighted in 2D or 3D 224.

Figure 12D:
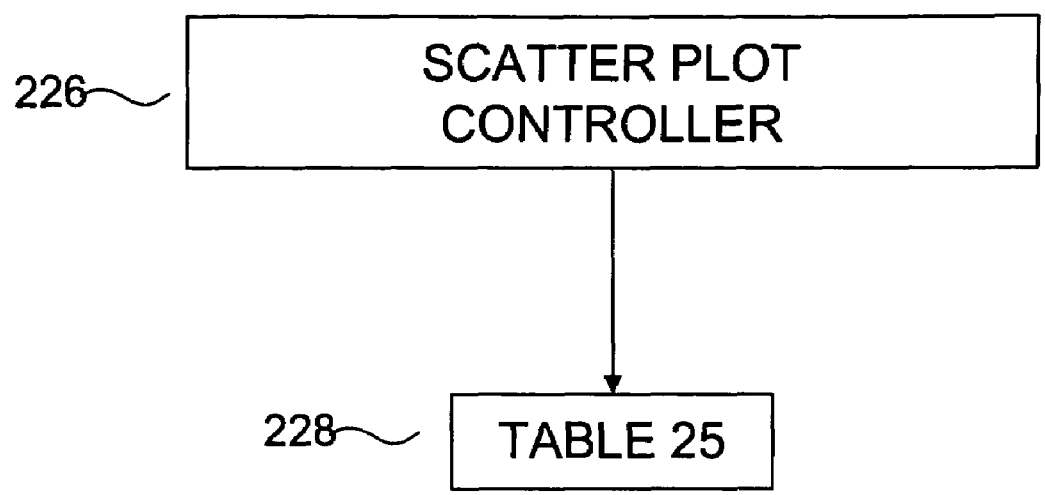
Figure 12E:
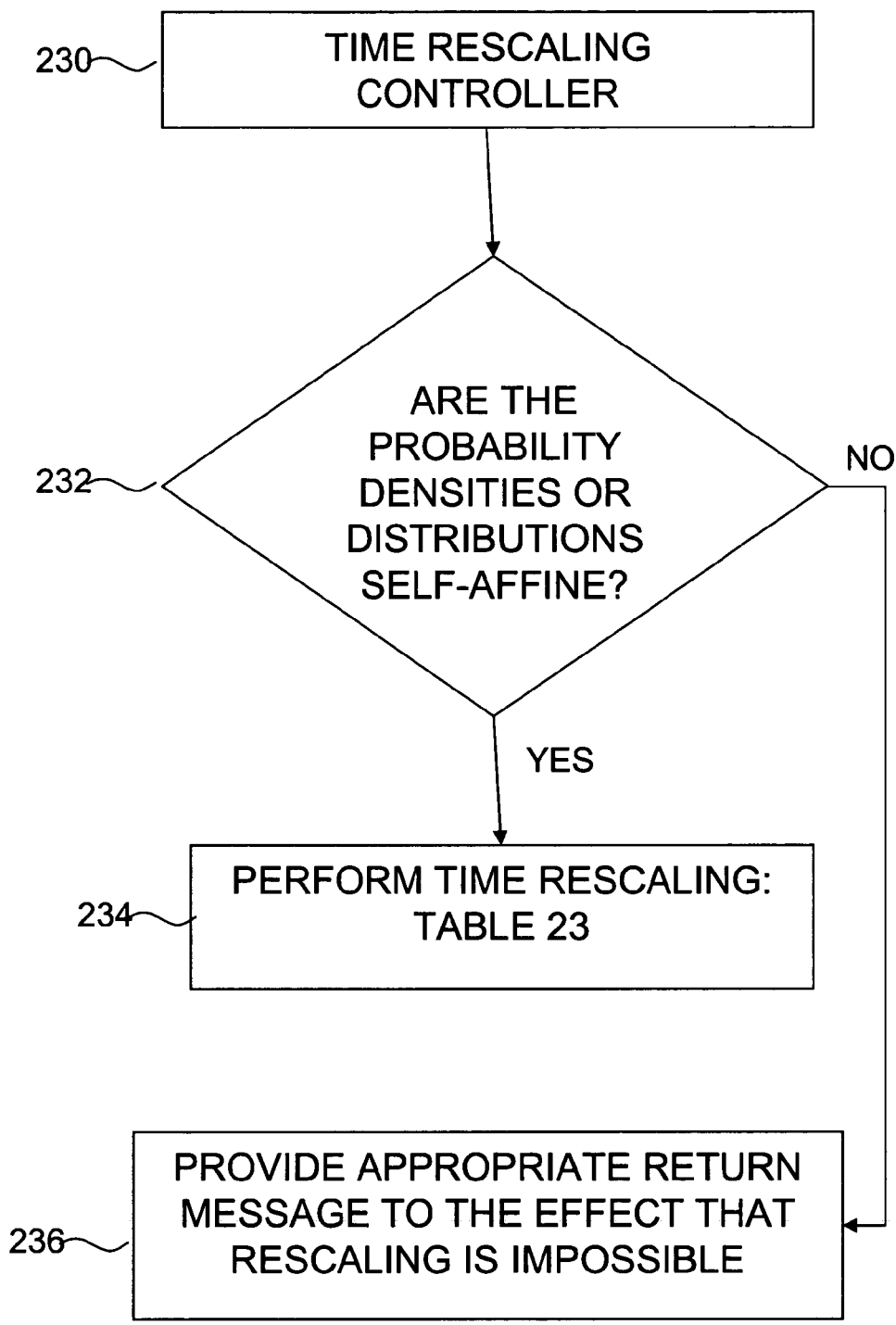

The scatter plot controller 226 of FIG. 12d provides essentially independent control of what investment data to view and plot in the reference framework, as in 228 and Table 25.

The user may also wish to analyze the data by projecting it into another investment time period for which no data may physically have been collected or exist. The time resealing controller 230 of FIG. 12E conditionally allows for this. If the stochastic process is self-affined 232, time rescaling is feasible and carried out 234 as in Table 23. If the stochastic process is not self-affined 232, time resealing is not attempted and the user is informed so 236.

Figure 12F:
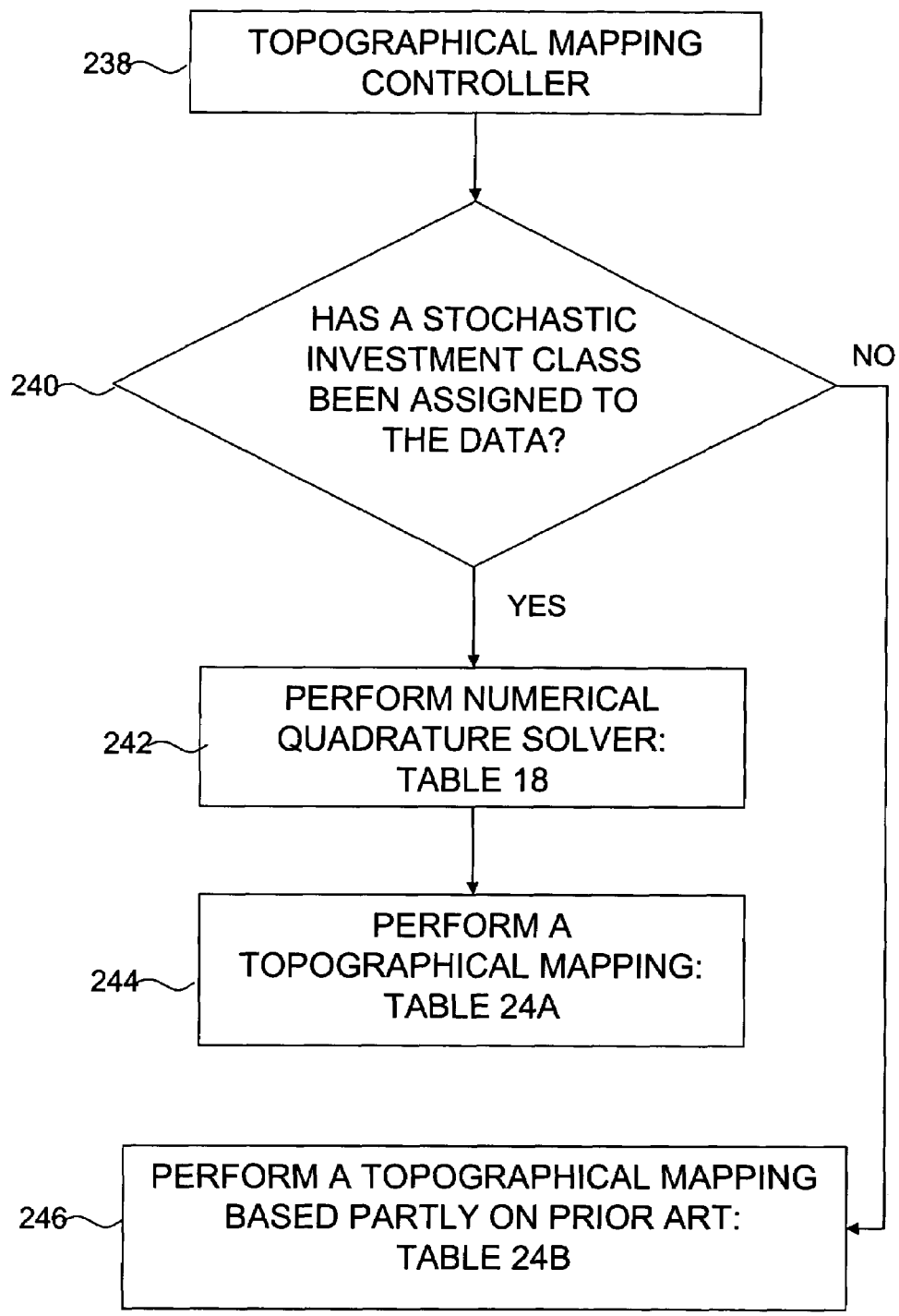

FIG. 12f is dedicated to the topographical mapping of the structural properties of the probability densities or distributions corresponding to the investment data. The topographical mapping controller 238 operates conditionally in two modes. If a stochastic investment class has been assigned to the data 240, a semi-analytical approach is feasible whereby numerical quadrature 242 is first carried out for that class as a prelude to topographical mapping 244. Otherwise, if the data is being treated empirically 240, the semi-analytical approach is abandoned in favor of another approach specified in the prior art 246. The user may also choose to analyze the same investment data in both modes by assigning to it a stochastic investment class as well as an empirical class. Two essentially independent topographical maps or fingerprints can thus be arrived at and compared, possibly confirming or infirming the choice or assignment of the stochastic class to the data.

Figure 12G:
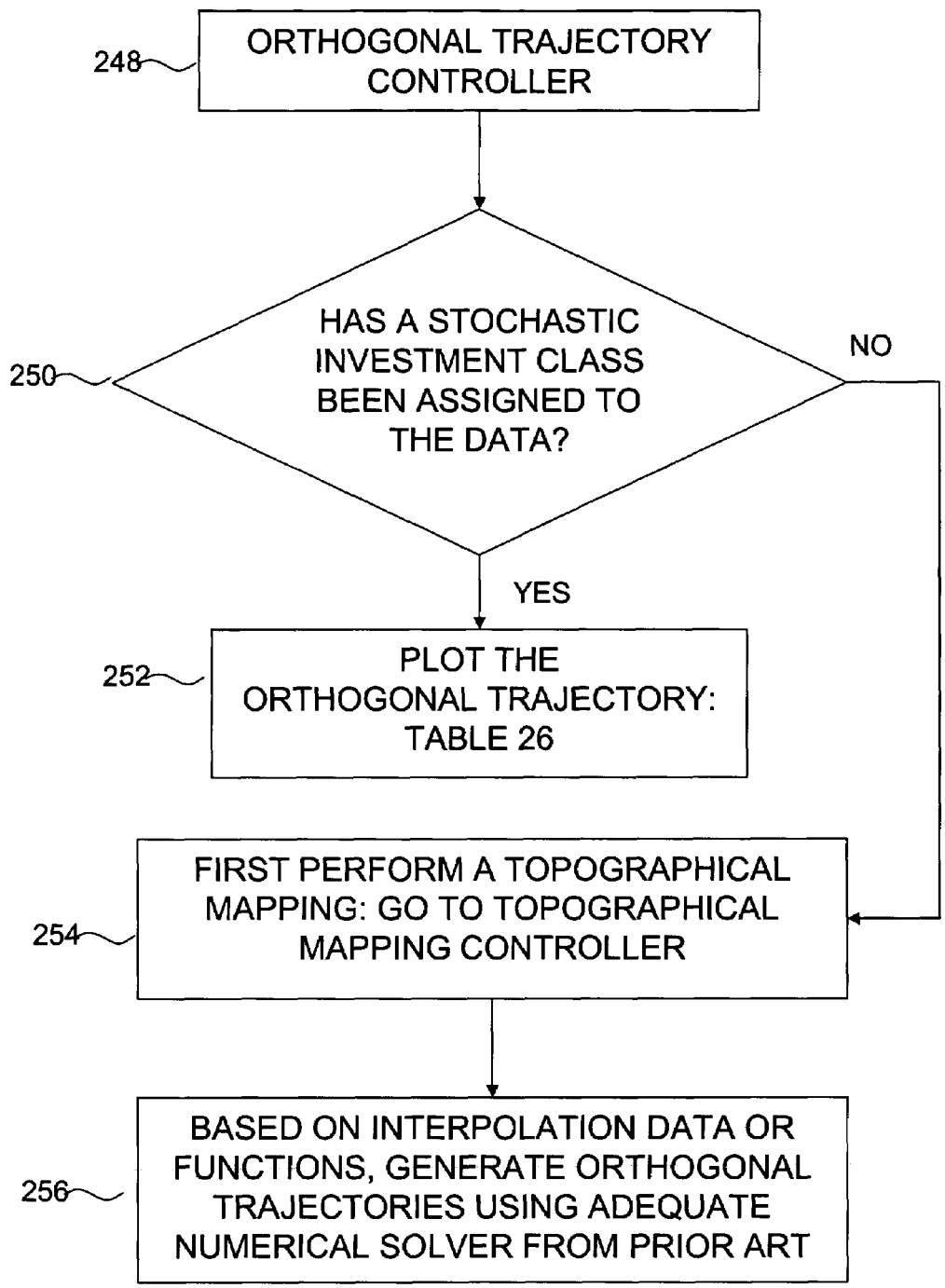

Finally, FIG. 12g deals with the plotting of the orthogonal trajectories to the topographical maps. The orthogonal trajectory controller 248 also operates conditionally based on the same restriction set out in FIG. 12f. If a stochastic investment class has been assigned to the data 250, the semi-analytical approach is taken leading to the plotting of the orthogonal trajectory 252 according to Table 26. Otherwise 250, the investment data is being treated empirically and must first be topographically mapped out as in 254 before proceeding to establishing the orthogonal trajectories as in 256.

Figure 13:
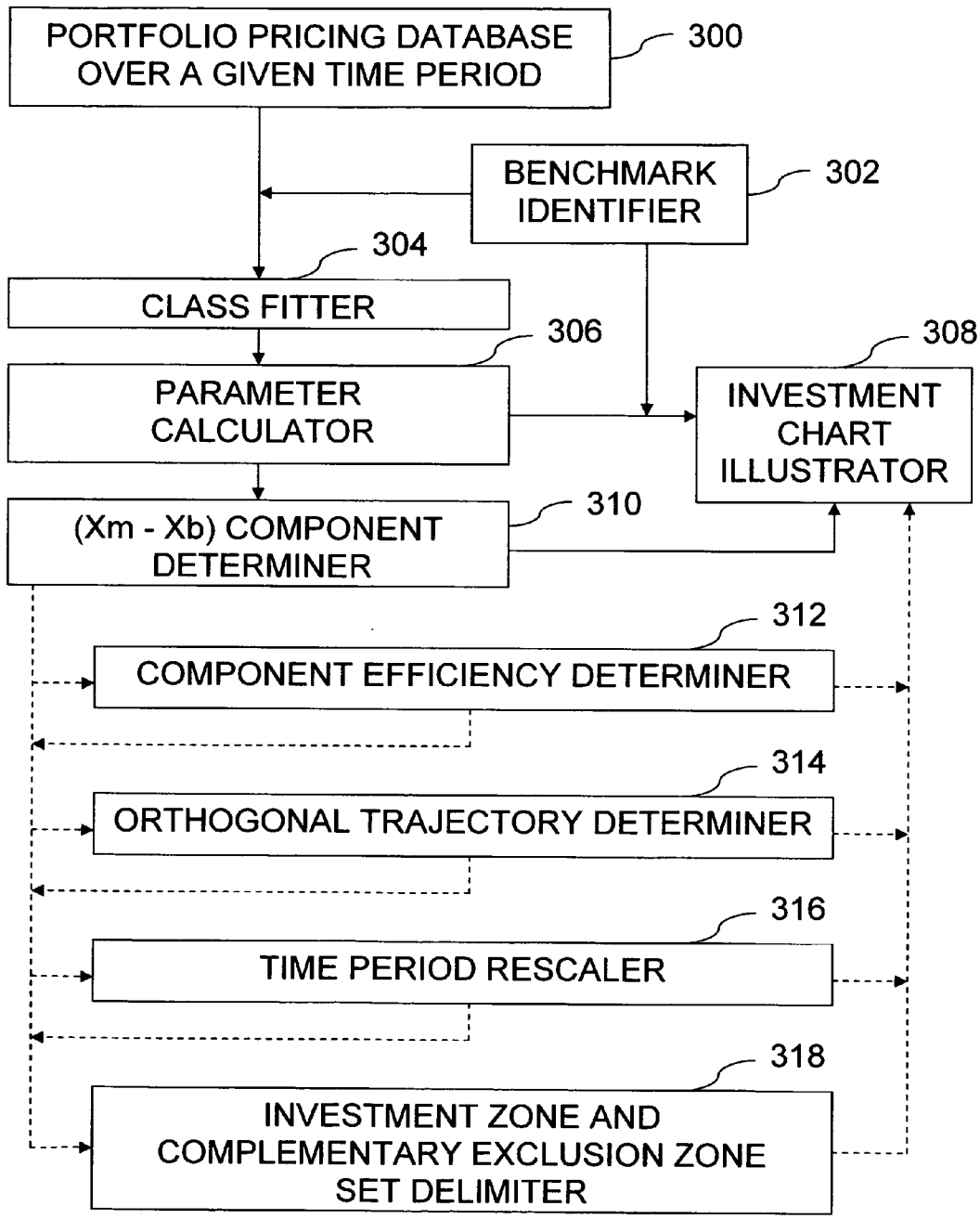
FIG. 13 is a block diagram of the preferred system.

Shown in FIG. 13 is a system for evaluating at least at least one of a risk, safety and efficiency property of a portfolio belonging to a class of one of a probability density and a probability distribution, for a given time frame, according to the preferred embodiment. The system comprises a portfolio pricing database 300 containing pricing information of the portfolios; a benchmark identifier 302 for obtaining at least one benchmark $X_b$ having benchmark profit, benchmark loss and benchmark return values; with respect to investment returns, a class fitter 304 for filling one of a stochastic investment class over said given time frame in relation to said benchmark $X_b$ by obtaining a location parameter a, a scale parameter b and other corresponding shape parameters; and an empirical investment class over said given time frame in relation to said benchmark $X_b$; a parameter calculator 306 for determining a mean return value $X_m$ and a standard deviation $\sigma_x$ using said class; an investment chart illustrator 308 for graphically illustrating said portfolio in relation to said benchmark $X_b$ using said return value $X_m$ and said standard deviation $\sigma_x$ on an investment chart; a $(X_m-X_b)$ component determiner 310 for determining for said portfolio by using properties of said class a solution to $(X_m-X_b)=[(E_S-X_b)\cdot\alpha]+[(E_P-X_b)\cdot\gamma]=I'_S+I'_P$ with $I'_S=[(E_S-X_b)\cdot\alpha]$ and $I'_P=[(E_P-X_b)\cdot\gamma]$, wherein $(E_S-X_b)$ is a component of $(X_m-X_b)$ and $I'_S$ representing an Expected Shortfall, $(E_P-X_b)$ is a component of $(X_m-X_b)$ and $I'_P$ representing an Expected Profit, $\gamma$ is a component of $(X_m-X_b)$ and $I'_P$ representing a probability of profit, $\alpha$ is a component of $(X_m-X_b)$ and $I'_S$ representing a probability of loss, $I'_S$ is a component of $(X_m-X_b)$ representing an insurance against an Expected Shortfall and $I'_P$ is a component of $(X_m-X_b)$ representing an insurance against an Expected Profit; said investment chart illustrator 308 for graphically illustrating at least one said component of said expression $(X_m-X_b)$, in the form of a topographical map on said investment chart using said benchmark $X_b$; whereby said portfolio can be evaluated in terms of at least one of risk, safety and efficiency.

Optionally, the system can comprise a component efficiency determiner 312 for determining at least one of E1 efficiency as the ratio of the probability of profit $\gamma$ to the probability of loss $\alpha$, E2 efficiency as the negative value of the ratio of Expected Profit (EP-Xb) to Expected Shortfall (ES-Xb), E3 efficiency as the negative value of the ratio of the insurance against an Expected Profit $I'_P$ to the insurance against an Expected Shortfall $I'_S$ and E4 efficiency as the ratio of the risk premium (Xm-Xb) to the probability of loss $\alpha$; said investment chart illustrator 308 graphically illustrating at least one of said efficiencies, in the form of a topographical map on said investment chart using said benchmark Xb.

The system may also optionally have an orthogonal trajectory determiner 314 for determining complementary orthogonal trajectories to the topographical map, and said investment chart illustrator 308 graphically illustrating the same.

A time period rescaler 316 may also be provided for determining the rescaling of said given time frame for self affine probability densities or distributions, and said investment chart illustrator 308 graphically illustrating the same. An investment zone and complementary exclusion zone delimiter 318 may also be provided for delimiting at least one set as first preference made up of an investment zone and a complementary exclusion zone for said evaluation based on at least one of an investor's perception of desirability or tolerance to risk, safety and efficiency, and said investment chart illustrator 308 graphically illustrating the same.

Figure 14A:
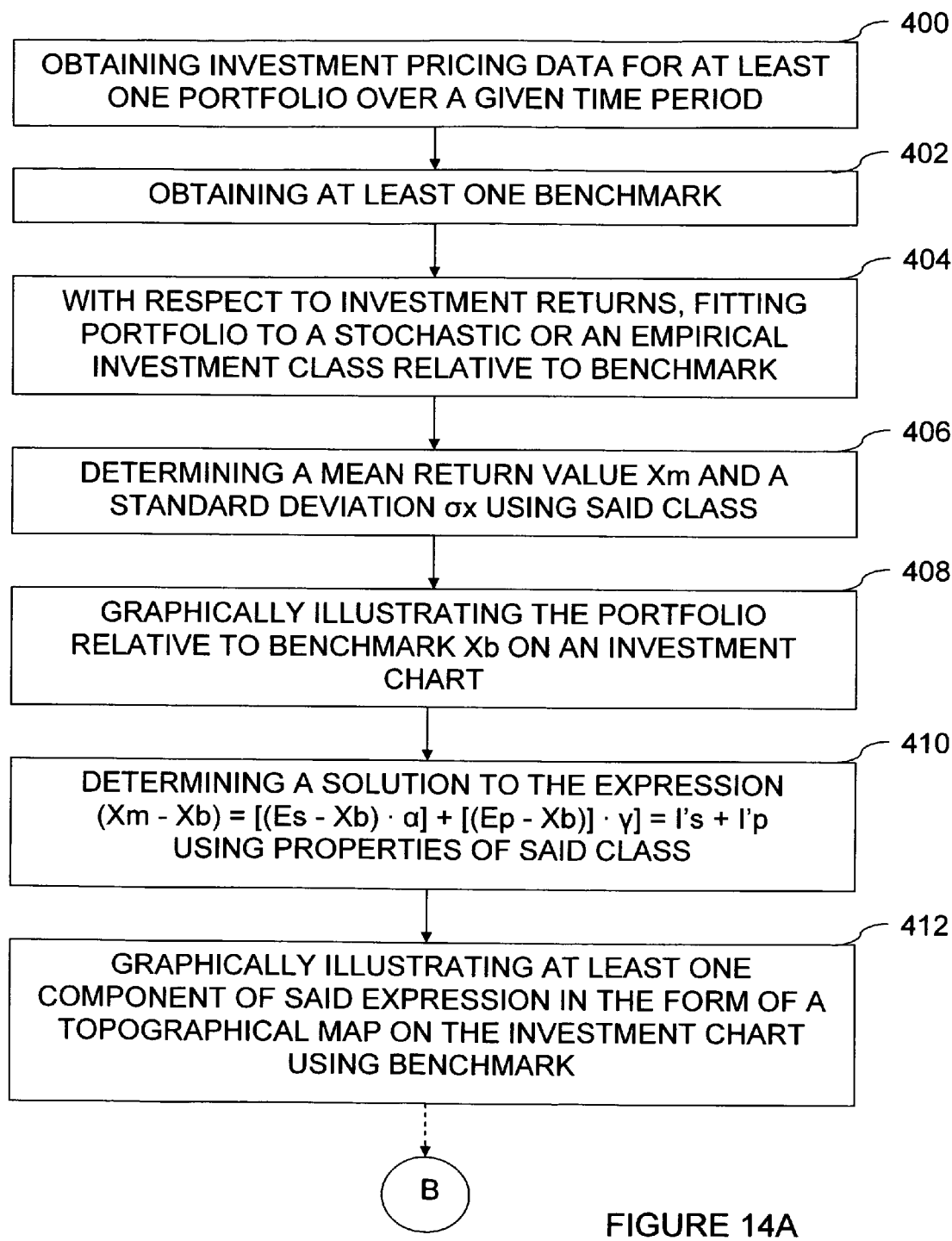
FIG. 14 comprises FIG. 14A and FIG. 14B which collectively form a flow chart of the preferred method.
Figure 14B:
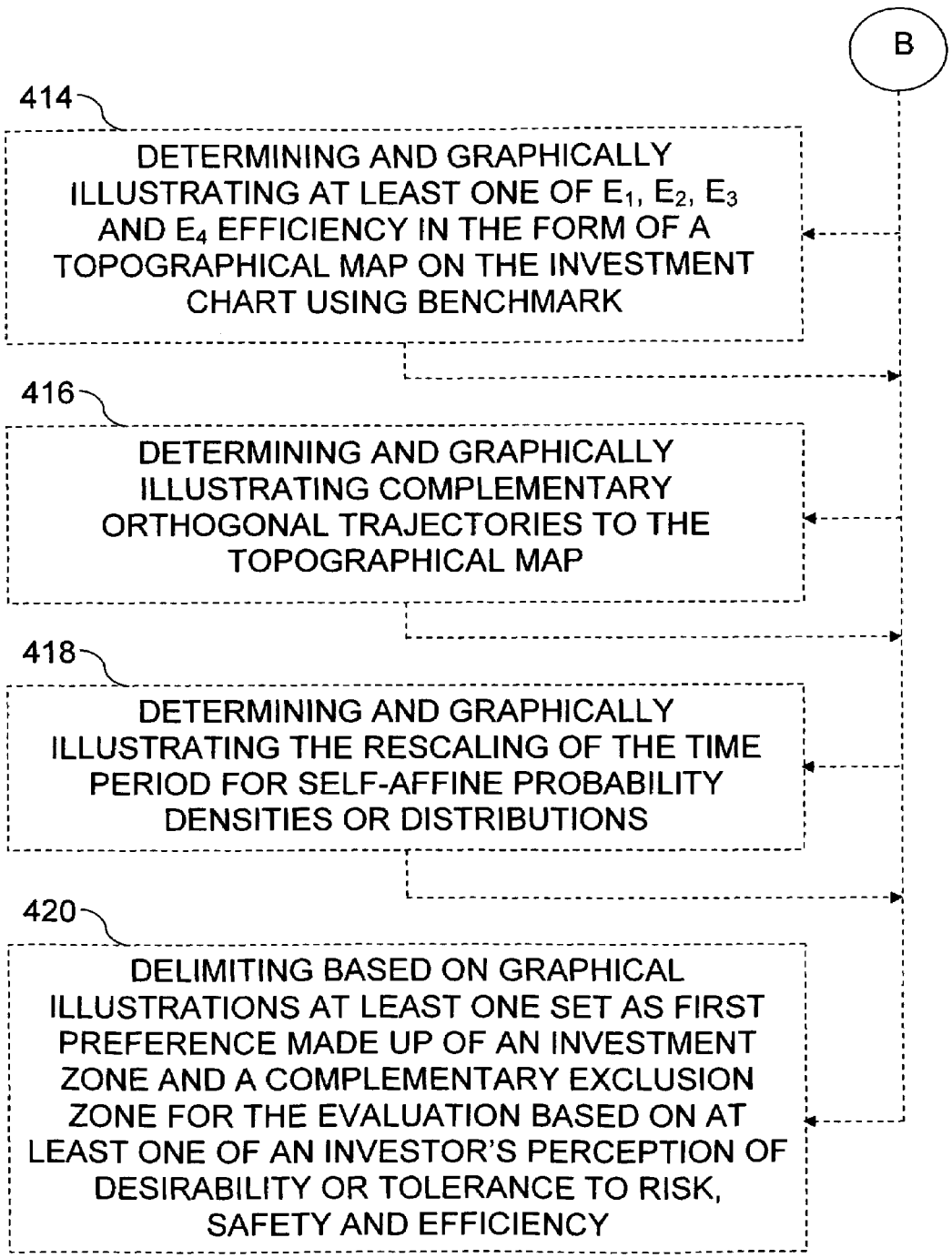

FIG. 14 comprises FIG. 14A and FIG. 14B. FIG. 14A lists the minimum set of steps of the method for evaluating at least one of a risk, safety and efficiency property of a portfolio belonging to a class of one of a probability density and a probability distribution, for a given time frame, of the preferred embodiment of the present invention. The method comprises obtaining investment pricing data for a least one portfolio over a given time period 400; obtaining at least one benchmark $X_b$ having benchmark profit, benchmark loss and benchmark return values 402; with respect to investment returns 404, fitting one of a stochastic investment class over said given time frame in relation to said benchmark $X_b$ by obtaining a location parameter a, a scale parameter b and other corresponding shape parameters; and an empirical investment class over said given time frame in relation to said benchmark $X_b$; determining a mean return value $X_m$ and a standard deviation $\sigma_x$ using said class 406; graphically illustrating said portfolio in relation to said benchmark $X_b$ using said return value $X_m$ and said standard deviation $\sigma_x$ on an investment chart 408; determining for said portfolio by using properties of said class 410 a solution to $(X_m-X_b)=[(E_S-X_b)\cdot\alpha]+[(E_P-X_b)\cdot\gamma]=I'_S+I'_P$ with $I'_S=[(E_S-X_b)\cdot\alpha]$ and $I'_P=[(E_P-X_b)\cdot\gamma]$, wherein $(E_S-X_b)$ is a component of $(X_m-X_b)$ and $I'_S$ representing an Expected Shortfall, $(E_P-X_b)$ is a component of $(X_m-X_b)$ and $I'_P$ representing an Expected Profit, $\gamma$ is a component of $(X_m-X_b)$ and $I'_P$ representing a probability of profit, $\alpha$ is a component of $(X_m-X_b)$ and $I'_S$ representing a probability of loss, $I'_S$ is a component of $(X_m-X_b)$ representing an insurance against an Expected Shortfall and $I'_P$ is a component of $(X_m-X_b)$ representing an insurance against an Expected Profit; graphically illustrating at least one said component of said expression $(X_m-X_b)$, in the form of a topographical map on said investment chart using said benchmark $X_b$ 412.

Optionally 414, the method can further comprise determining at least one of $E_1$ efficiency as the ratio of the probability of profit $\gamma$ to the probability of loss $\alpha$, E2 efficiency as the negative value of the ratio of Expected Profit $(E_P-X_b)$ to Expected Shortfall $(E_S-X_b)$, E3 efficiency as the negative value of the ratio of the insurance against an Expected Profit $I'_P$ to the insurance against an Expected Shortfall $I'_S$ and E4 efficiency as the ratio of the risk premium $(X_m-X_b)$ to the probability of loss; and graphically illustrating at least one of said efficiencies, in the form of a topographical map on said investment chart using said benchmark $X_b$.

Optionally, it can further comprise determining and graphically illustrating complementary orthogonal trajectories to the topographical map 416.

Optionally, the method can further comprise determining and graphically illustrating the rescaling of the time period for self affine probability densities or distributions 418.

Optionally, the method can further comprise, based on said graphically illustrating, delimiting at least one set as first preference made up of an investment zone and a complementary exclusion zone for said evaluation based on at least one of an investor's perception of desirability or tolerance to risk, safety and efficiency 420.

Extension to Historical, Empirical and Discrete Data

Historical data for an investment may first be grouped about certain discrete classes of values, and then continuity restored by interpolation amongst the classes, without necessarily fitting a known probability density of the form shown in Table 16. The historical data is thus treated empirically. The probability density thus obtained will provide a unique set of values for its structural properties, punctual in nature. The plotting of any single data point in the reference framework is of limited interest with regards to topographical mapping unless a location, scale and other shape parameters can conceivably be fitted to the density, and then justifiably varied somewhat to arrive at the topographical mappings. The importance of fitting a density cannot be underestimated. Otherwise, the danger lurks of artificially drawing contour lines between data points belonging to different investment stochastic classes which would be totally incoherent. These contour lines would seemingly establish continuity where no continuity in fact exists. By first assuming that empirical distributions conceivably belong to a same investment class, although possibly unbeknown, contour lines can thereafter be established by the method discussed in paragraph 0347.

Discrete probability distributions apply to random variables that are restricted to finitely many or a countable infinity of values. The basic definitions of expressions (3) to (17) have to be completed by those applicable to discrete distributions using natural estimators in the form of sums over established ranges to evaluate mean, volatility, etc. Further, data is first ordered from the least to the greatest value to carry out the calculations. The topographical mappings of interest here implicitly rely on location, scale and other shape parameters that must then conceivably be fitted to the distribution and then varied in the reference framework in order to qualify other investments of similar nature or carry out a sensitivity analysis. As the topographical mapping by means of contour lines also implicitly infer a continuum of possible values, techniques elaborated previously will not generally apply unless additional steps are taken to restrict calculations to possible discrete values. Artificial lines or splines between the discrete values are then required to obtain equivalent contour lines.

Extension to 3D

Contour lines and orthogonal trajectories implicitly refer to a given property being mapped out in a third dimension relative to the base plot. These mappings can be visualized in 2D, as previously shown, or optionally in 3D to gain another perspective. The contour lines may be color coded, or grey scale encoded, or use made of some other artifice to enhance the perspective.

In Relation to Decision Making

Investment decision making can and should be based on investor perception of acceptable risk, safety and efficiency, and on acceptable values of related measures. The ordering and filtering of investments on this basis, as well as the potential definition of multiple investment inclusion or exclusion zones (constraints), delimited by the various mappings of the stochastic structural properties deemed most pertinent, are then of interest. The plotting of the complementary orthogonal trajectories will also efficiently guide the investor in comparing and rating various investment alternatives.

Computer based tools as in Table 27 can hence accompany the mappings to carry out these and other related decision making tasks.

Extension to Other Disciplines and Applications

The importance and relevance of generating topographical maps for the various structural properties of probability distributions has been demonstrated in relation to investing. However, probability distributions are applied in numerous disciplines and obviously not restricted solely to investing. Indeed, specific probability densities of Table 16 may be more appropriate to these other disciplines than to investing. The system, methods and notions developed here are completely general in nature and will apply directly by analogy to these other disciplines just as long as a threshold exists or can be justified within the probability density that is analogous to the profit and loss threshold herein. In particular, the extension to the general field of insurance is of interest.

It should be noted that the present invention can be carried out as a method, can be embodied in a system, a computer readable medium or an electrical or electro-magnetical signal.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for evaluating at least one of a risk, safety and efficiency property of a portfolio belonging to a class of one of a probability density and a probability distribution, for a given time frame, comprising:
    obtaining portfolio pricing data over said given time frame;
    obtaining at least one benchmark $X_b$ having benchmark profit, benchmark loss and benchmark return values;
    with respect to investment returns, fitting one of
        a stochastic investment class over said given time frame in relation to said benchmark $X_b$ by obtaining a location parameter a, a scale parameter b and other corresponding shape parameters; and
        an empirical investment class over said given time frame in relation to said benchmark $X_b$;
    determining a mean return value $X_m$ and a standard deviation $\sigma_x$ using said class;
    graphically illustrating said portfolio in relation to said benchmark $X_b$ using said return value $X_m$ and said standard deviation $\sigma_x$ on an investment chart;
    determining for said portfolio by using properties of said class a solution to $(X_m-X_b)=[(E_S-X_b)\cdot\alpha]+[(E_P-X_b)\cdot\gamma]=I'_S+I'_P$ with $I'_S=[(E_S-X_b)\cdot\alpha]$ and $I'_P=[(E_P-X_b)\cdot\gamma]$, wherein $(E_S-X_b)$ is a component of $(X_m-X_b)$ and $I'_S$ representing an Expected Shortfall, $(E_P-X_b)$ is a component of $(X_m-X_b)$ and $I'_P$ representing an Expected Profit, $\gamma$ is a component of $(X_m-X_b)$ and $I'_P$ representing a probability of profit, $\alpha$ is a component of $(X_m-X_b)$ and $I'_S$ representing a probability of loss, $I'_S$ is a component of $(X_m-X_b)$ representing an insurance against an Expected Shortfall and $I'_P$ is a component of $(X_m-X_b)$ representing an insurance against an Expected Profit;
    graphically illustrating at least one said component of said expression $(X_m-X_b)$, in the form of a topographical map on said investment chart using said benchmark $X_b$;
    whereby said portfolio can be evaluated in terms of at least one of risk, safety and efficiency.

2. A method as claimed in claim 1, further comprising:
    determining at least one of $E_1$ efficiency as the ratio of the probability of profit $\gamma$ to the probability of loss $\alpha$, E2 efficiency as the negative value of the ratio of Expected Profit $(E_P-X_b)$ to Expected Shortfall $(E_S-X_b)$, E3 efficiency as the negative value of the ratio of the insurance against an Expected Profit $I'_P$ to the insurance against an Expected Shortfall $I'_S$ and E4 efficiency as the ratio of the risk premium $(X_m-X_b)$ to the probability of loss $\alpha$;
    graphically illustrating at least one of said efficiencies, in the form of a topographical map on said investment chart using said benchmark $X_b$.

3. A method as claimed in claim 1, further comprising:
    determining and graphically illustrating complementary orthogonal trajectories to the topographical map.

4. A method as claimed in claim 2, further comprising:
    determining and graphically illustrating complementary orthogonal trajectories to the topographical map.

5. A method as claimed in claim 1, further comprising:
determining and graphically illustrating the rescaling of said given time frame for self affine probability densities or distributions.

6. A method as claimed in anyone of claims 1 to 5, wherein said graphically illustrating further comprises delimiting at least one set as first preference made up of an investment zone and a complementary exclusion zone for said evaluation based on at least one of an investors perception of desirability or tolerance to risk, safety and efficiency.

7. A system for evaluating at least one of a risk, safety and efficiency property of a portfolio belonging to a class of one of a probability density and a probability distribution, for a given time frame, comprising:
a portfolio pricing database over said given time frame;
a benchmark identifier for obtaining at least one benchmark $X_b$ having benchmark profit, benchmark loss and benchmark return values;
with respect to investment returns, a class fitter for fitting one of
a stochastic investment class over said given time frame in relation to said benchmark $X_b$ by obtaining a location parameter a, a scale parameter b and other corresponding shape parameters; and
an empirical investment class over said given time frame in relation to said benchmark $X_b$;
a parameter calculator for determining a mean return value $X_m$ and a standard deviation $\sigma_x$ using said class;
an illustrator for graphically illustrating said portfolio in relation to said benchmark $X_b$ using said return value $X_m$ and said standard deviation $\sigma_x$ on an investment chart;
a component determiner for determining for said portfolio by using properties of said class a solution to $(X_m - X_b) = [(E_S - X_b) \cdot \alpha] + [(E_P - X_b) \cdot \gamma] = I'_S + I'_P$ with $I'_S = [(E_S - X_b) \cdot \alpha]$ and $I'_P = [(E_P - X_b) \cdot \gamma]$, wherein $(E_S - X_b)$ is a component of $(X_m - X_b)$ and $I'_S$ representing an Expected Shortfall, $(E_P - X_b)$ is a component of $(X_m - X_b)$ and $I'_P$ representing an Expected Profit, $\gamma$ is a component of $(X_m - X_b)$ and $I'_P$ representing a probability of profit, $\alpha$ is a component of $(X_m - X_b)$ and $I'_S$ representing a probability of loss, $I'_S$ is a component of $(X_m - X_b)$ representing an insurance against an Expected Shortfall and $I'_P$ is a component of $(X_m - X_b)$ representing an insurance against an Expected Profit;
said illustrator for graphically illustrating at least one said component of said expression $(X_m - X_b)$, in the form of a topographical map on said investment chart using said benchmark $X_b$;
whereby said portfolio can be evaluated in terms of at least one of risk, safety and efficiency.

8. A system as claimed in claim 7, further comprising:
a component efficiency determiner for determining at least one of $E_1$ efficiency as the ratio of the probability of profit $\gamma$ to the probability of loss $\alpha$, E2 efficiency as the negative value of the ratio of Expected Profit $(E_P - X_b)$ to Expected Shortfall $(E_S - X_b)$, E3 efficiency as the negative value of the ratio of the insurance against an Expected Profit $I'_P$ to the insurance against an Expected Shortfall $I'_S$ and E4 efficiency as the ratio of the risk premium $(X_m - X_b)$ to the probability of loss $\alpha$;
said illustrator graphically illustrating at least one of said efficiencies, in the form of a topographical map on said investment chart using said benchmark $X_b$.

9. A system as claimed in claim 7, further comprising:
an orthogonal trajectory determiner for determining complementary orthogonal trajectories to the topographical map, and said illustrator graphically illustrating the same.

10. A system as claimed in claim 8, further comprising:
an orthogonal trajectory determiner for determining complementary orthogonal trajectories to the topographical map, and said illustrator graphically illustrating the same.

11. A system as claimed in claim 7, further comprising:
a time rescaler for determining the rescaling of said given time frame for self affine probability densities or distributions, and said illustrator graphically illustrating the same.

12. A system as claimed in anyone of claims 7 to 11, further comprising a set delimiter for delimiting at least one set as first preference made up of an investment zone and a complementary exclusion zone for said evaluation based on at least one of an investor's perception of desirability or tolerance to risk, safety and efficiency.

* * * * *